US010630999B2

(12) United States Patent
Yamamoto et al.

(10) Patent No.: US 10,630,999 B2
(45) Date of Patent: Apr. 21, 2020

(54) IMAGE DECODING DEVICE, IMAGE DECODING METHOD, AND IMAGE ENCODING DEVICE

(71) Applicant: SHARP KABUSHIKI KAISHA, Sakai, Osaka (JP)

(72) Inventors: Tomoyuki Yamamoto, Sakai (JP); Tomohiro Ikai, Sakai (JP); Yukinobu Yasugi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/118,820

(22) Filed: Aug. 31, 2018

(65) Prior Publication Data

US 2018/0376155 A1 Dec. 27, 2018

Related U.S. Application Data

(63) Continuation of application No. 14/348,499, filed as application No. PCT/JP2012/075191 on Sep. 28, 2012, now Pat. No. 10,110,891.

(30) Foreign Application Priority Data

Sep. 29, 2011 (JP) .................. 2011-215475

(51) Int. Cl.
*H04N 19/50* (2014.01)
*H04N 19/70* (2014.01)
(Continued)

(52) U.S. Cl.
CPC ........... *H04N 19/463* (2014.11); *H04N 19/44* (2014.11); *H04N 19/91* (2014.11); *H04N 19/96* (2014.11)

(58) Field of Classification Search
CPC ....... H04N 19/463; H04N 19/91; H04N 19/44
See application file for complete search history.

(56) References Cited

U.S. PATENT DOCUMENTS

| 7,215,818 | B2* | 5/2007 | Naito | ................... | H04N 19/176 |
| | | | | | 375/E7.139 |
| 7,292,731 | B2* | 11/2007 | Sekiguchi | .............. | H04N 19/56 |
| | | | | | 375/240.24 |

(Continued)

FOREIGN PATENT DOCUMENTS

| CN | 101001373 A | 7/2007 |
| EP | 2 744 204 A2 | 6/2014 |

(Continued)

OTHER PUBLICATIONS

Bross et al., "WD4: Working Draft 4 of High-Efficiency Video Coding", (JCTVC-F803_d1), Joint Collaborative Team on Video Coding (JCT-VC) of ITU-T SG16 WP3 and ISO/IEC JTC1/SC29/WG11, 6th Meeting:, Jul. 14-22, 2011, pp. 1-222.

(Continued)

*Primary Examiner* — Philip P. Dang
(74) *Attorney, Agent, or Firm* — Birch, Stewart, Kolasch & Birch, LLP

(57) ABSTRACT

To achieve a reduction in the amount of coding taken in the use of an asymmetric partition and to implement efficient encoding/decoding processes exploiting the characteristics of the asymmetric partition. In a case that a CU information decoding unit decodes information for specifying an asymmetric partition (AMP; Asymmetric Motion Partition) as a partition type, an arithmetic decoding unit is configured to decode binary values by switching between arithmetic decoding that uses contexts and arithmetic decoding that does not use contexts in accordance with the position of the binary values.

3 Claims, 29 Drawing Sheets

(51) Int. Cl.
  *H04N 19/463* (2014.01)
  *H04N 19/91* (2014.01)
  *H04N 19/44* (2014.01)
  *H04N 19/96* (2014.01)

(56) References Cited

U.S. PATENT DOCUMENTS

| | | | |
|---|---|---|---|
| 7,365,659 B1* | 4/2008 | Hoffmann | H03M 7/4006 |
| | | | 341/106 |
| 7,468,745 B2 | 12/2008 | Xin et al. | |
| 7,577,198 B2 | 8/2009 | Holcomb | |
| 7,599,438 B2 | 10/2009 | Holcomb et al. | |
| 7,616,692 B2 | 11/2009 | Holcomb et al. | |
| 7,620,106 B2 | 11/2009 | Holcomb et al. | |
| 7,671,894 B2 | 3/2010 | Yea et al. | |
| 7,728,878 B2 | 6/2010 | Yea et al. | |
| 7,761,238 B2* | 7/2010 | Moser | G06F 19/22 |
| | | | 702/19 |
| 8,009,739 B2 | 8/2011 | Holcomb et al. | |
| 8,400,336 B2* | 3/2013 | He | H03M 7/40 |
| | | | 341/78 |
| 8,823,821 B2 | 9/2014 | Tian et al. | |
| 9,866,859 B2 | 1/2018 | Zhou | |
| 2002/0080874 A1 | 6/2002 | Wilson | |
| 2005/0123207 A1* | 6/2005 | Marpe | H04N 19/196 |
| | | | 382/239 |
| 2006/0023795 A1 | 2/2006 | Kim | |
| 2006/0268166 A1 | 11/2006 | Bossen et al. | |
| 2007/0025442 A1 | 2/2007 | Okada et al. | |
| 2007/0183491 A1 | 8/2007 | Pearson et al. | |
| 2007/0217512 A1 | 9/2007 | Matsuda et al. | |
| 2007/0237240 A1* | 10/2007 | Lee | H04N 19/33 |
| | | | 375/240.24 |
| 2008/0025398 A1 | 1/2008 | Molloy et al. | |
| 2008/0123972 A1 | 5/2008 | Sekiguchi et al. | |
| 2008/0231483 A1* | 9/2008 | He | H04N 19/50 |
| | | | 341/107 |
| 2008/0304561 A1 | 12/2008 | Vanderheijden et al. | |
| 2008/0310503 A1* | 12/2008 | Lee | H04N 19/91 |
| | | | 375/240.2 |
| 2009/0002379 A1 | 1/2009 | Baeza et al. | |
| 2009/0028427 A1 | 1/2009 | Yamada et al. | |
| 2009/0141811 A1 | 6/2009 | Mohan | |
| 2009/0175331 A1* | 7/2009 | Karczewicz | H04N 19/176 |
| | | | 375/240.03 |
| 2009/0175332 A1* | 7/2009 | Karczewicz | H04N 19/176 |
| | | | 375/240.03 |
| 2009/0296812 A1 | 12/2009 | Kim et al. | |
| 2010/0074332 A1 | 3/2010 | Karczewicz et al. | |
| 2010/0086032 A1* | 4/2010 | Chen | H04N 19/176 |
| | | | 375/240.12 |
| 2010/0127904 A1* | 5/2010 | Oxman | H03M 7/40 |
| | | | 341/107 |
| 2010/0208818 A1 | 8/2010 | Yin et al. | |
| 2010/0329341 A1 | 12/2010 | Kam et al. | |
| 2011/0016388 A1* | 1/2011 | Tang | G06F 17/2294 |
| | | | 715/256 |
| 2011/0038414 A1* | 2/2011 | Song | H04N 19/105 |
| | | | 375/240.12 |
| 2011/0090960 A1 | 4/2011 | Leontaris et al. | |
| 2011/0096826 A1* | 4/2011 | Han | H04N 19/52 |
| | | | 375/240.01 |
| 2011/0096834 A1* | 4/2011 | Cheon | H04N 19/119 |
| | | | 375/240.12 |
| 2011/0134998 A1* | 6/2011 | Lee | H04N 19/50 |
| | | | 375/240.12 |
| 2011/0135000 A1* | 6/2011 | Alshina | H04N 19/105 |
| | | | 375/240.13 |
| 2011/0150075 A1 | 6/2011 | Pearson et al. | |
| 2011/0206289 A1 | 8/2011 | Dikbas et al. | |
| 2011/0228858 A1* | 9/2011 | Budagavi | H04N 19/70 |
| | | | 375/240.25 |
| 2012/0027089 A1 | 2/2012 | Chien et al. | |
| 2012/0075436 A1 | 3/2012 | Chen et al. | |
| 2012/0189056 A1 | 7/2012 | Li et al. | |
| 2012/0230397 A1 | 9/2012 | Ouedraogo et al. | |
| 2012/0230421 A1 | 9/2012 | Chen et al. | |
| 2012/0320984 A1 | 12/2012 | Zhou | |
| 2013/0034157 A1 | 2/2013 | Helle et al. | |
| 2013/0034171 A1 | 2/2013 | Winken et al. | |
| 2013/0058410 A1 | 3/2013 | Yasugi et al. | |
| 2013/0114671 A1 | 5/2013 | Chien et al. | |
| 2013/0202037 A1 | 8/2013 | Wang et al. | |
| 2013/0259130 A1 | 10/2013 | Coban et al. | |
| 2014/0016701 A1 | 1/2014 | Chen et al. | |
| 2014/0092978 A1 | 4/2014 | Bugdayci et al. | |
| 2014/0198846 A1 | 7/2014 | Guo et al. | |
| 2014/0210652 A1 | 7/2014 | Bartnik et al. | |
| 2014/0247868 A1 | 9/2014 | Oh et al. | |
| 2014/0269908 A1 | 9/2014 | Oh et al. | |

FOREIGN PATENT DOCUMENTS

| | | |
|---|---|---|
| JP | 2006-054865 A | 2/2006 |
| WO | 2006/082690 A1 | 8/2006 |

OTHER PUBLICATIONS

Bross et al., "WD4: Working Draft 4 of High-Efficiency Video Coding", (JCTVC-F803_d5), Joint Collaborative Team on Video Coding (JCT-VC) of ITU-T SG16 WP3 and ISO/IEC JTC1/SC29/WG11, 6th Meeting: Jul. 14-22, 2011, pp. 1-6.

Chien et al., "Context modeling for asymmetric partitioning on partition mode," Joint Collaborative Team on Video Coding (JCT-VC) of ITU-T SG16 WP3 and ISO/IEC JTC1/SC29/WG11, 8th Meeting, Document: JCTVC-H0545, Feb. 1-10, 2012, pp. 1-2, XP30051951.

Chien et al., "Context reduction for CABAC," Joint Collaborative Team on Video Coding (JCT-VC) of ITU-T SG16 WP3 and ISO/IEC JTC1/SC29/WG11, 7th Meeting, Document: JCTVC-G718, Nov. 21-30, 2011, pp. 1-8, XP30110702.

European Search Report dated Jan. 5, 2015 for corresponding European Application No. EP 12 83 5063.

Ikai (Sharp) T: "Bi-prediction restriction in small PU", 7.JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/, No. JCTVC-G307 Nov. 8, 2011 XP030110291.

Kim et al., "CE2: Test results of asymmetric motion partition (AMP)", (JCTVC-F379), Joint Collaborative Team on Video Coding (JCT-VC) of ITU-T SG16 WP3 and ISO/IEC JTC1/SC29/WG11, 6th Meeting: Jul. 14-22, 2011, pp. 1-10.

MacInnis, "Complexity Limitations for High Definition", (JVT-D134r1), Joint Video Team(JVT) of ISO/IEC MPEG & ITU-T VCEG (ISO/IEC JTC1/SC29/WG11 and ITU-T SG16 Q.6) , 4th Meeting:, Jul. 22-26, 2002, pp. 1-3.

Seregin et al., "Binarisation modification for last position coding," Joint Collaborative Team on Video Coding (JCT-VC) of ITU-T SG16 WP3 and ISO/IEC JTC1/SC29/WG11, 6th Meeting, Document: JCTVC-F375, Jul. 14-22, 2011, pp. 1-3, XP30009398.

Yamamoto, "On CABAC context for partition mode," Joint Collaborative Team on Video Coding (JCT-VC) of ITU-T SG16 WP3 and ISO/IEC JTC1/SC29/WG11, 8th Meeting, Document: JCTVC-Hxxx, Feb. 1-10, 2012, pp. 1-3, XP30111126.

Yuan et al., "CE2: Non-Square Quadtree Transform for symmetric and asymmetric motion partition", (JCTVC-F412), Joint Collaborative Team on Video Coding (JCT-VC) of ITU-T SG16 WP3 and ISO/IEC JTC1/SC29/WG11, 6th Meeting:, Jul. 14-22, 2011, pp. 1-7.

Advisory Action issued in corresponding U.S. Appl. No. 14/347,523 dated Apr. 13, 2018.

Advisory Action issued in corresponding U.S. Appl. No. 14/347,523 dated Feb. 3, 2017.

Corrected Notice of Allowability issued in copending U.S. Appl. No. 14/348,499 dated Jul. 9, 2018.

(56) References Cited

OTHER PUBLICATIONS

Final Office Action issued in copending U.S. Appl. No. 14/348,499 dated Jul. 10, 2017.
Non-Final Office Action issued in copending U.S. Appl. No. 14/348,499 dated Feb. 2, 2017.
Non-Final Office Action issued in copending U.S. Appl. No. 14/348,499 dated Feb. 6, 2018.
Notice of Allowance issued in copending U.S. Appl. No. 14/348,499 dated Jun. 25, 2018.
Office Action issued in corresponding U.S. Appl. No. 14/347,523 dated Oct. 13, 2016.
U.S. Office Action for U.S. Appl. No. 14/347,523 dated Jan. 2, 2018.
U.S. Office Action for U.S. Appl. No. 15/642,574 dated Jan. 16, 2018.
U.S. Office Action issued in corresponding U.S. Appl. No. 14/347,523 dated Aug. 18, 2017.
U.S. Office Action issued in the copending U.S. Appl. No. 15/642,574, dated May 24, 2018.
United States Office Action for co-pending U.S. Appl. No. 14/347,523.
Wang et al, "Hard-decision Quantization with Adaptive Reconstruction Levels for High Efficiency Video Coding," IEEE, (Year: 2011).
Winger: "Reduced Decoder Peak Bus Bandwidth", 3. JVT Meeting; 60. MPEG Meeting; May 6, 2002-May 10, 2002; Fairfax,US; (Joint Video Team of ISO/IEC JTC1/SC29/WG11 and ITU-T SG.16 ), No. JVT-C115, (May 10, 2002), XP030005225.
Kim (Etri) H Y et al.: "Motion compensation complexity reduction for bi-predition", 6. JCT-VC Meeting; 97. MPEG Meeting; Torino; (Joint Collaborative Team on Video Coding of ISO/IECJTC1/SC29/WF11 and ITU-T SG. 16); URL: http://wftp3.itu.int/av-arch/jctvc-site/, No. JCTVC-F356, Jul. 1, 2011.
Ezhilarasan et al, "An Improved Transformation Technique for H.264/Advanced Video Coding," International Conference on Computational Intelligence and Multimedia Applications 2007, 2007, pp. 123-127.
Ho et al., "Content-Based Scalable H.263 Video Coding for Road Traffic Monitoring," IEEE Transactions on Multimedia, vol. 7, No. 4, Aug. 2005, pp. 615-623.
Lee et al., "Spatio-temporal Model-assisted Compatible Coding for Low and Very Low Bitrate Videotelephony," IEEE, 1996, pp. 429-432.

\* cited by examiner

| | | CU > 8x8 | | CU==8x8 | |
|---|---|---|---|---|---|
| | | prefix | suffix | prefix | suffix |
| Intra | 2Nx2N | 000 | – | 000 | 0 |
| | NxN | – | – | 000 | 1 |
| Inter | 2Nx2N | 1 | – | 1 | – |
| | 2NxN | 01 | 1 | 01 | – |
| | 2NxnU | 01 | 00 | – | – |
| | 2NxnD | 01 | 01 | – | – |
| | Nx2N | 001 | 1 | 001 | – |
| | nLx2N | 001 | 00 | – | – |
| | nRx2N | 001 | 01 | – | – |
| | NxN | – | – | – | – |

|       |       | CU==8x8 |        |
|-------|-------|---------|--------|
|       |       | prefix  | suffix |
| Intra | 2Nx2N | 1       | 0      |
|       | NxN   | 1       | 1      |
| Inter | 2Nx2N | 01      | –      |
|       | 2NxN  | 000     | –      |
|       | 2NxnU | –       | –      |
|       | 2NxnD | –       | –      |
|       | Nx2N  | 001     | –      |
|       | nLx2N | –       | –      |
|       | nRx2N | –       | –      |
|       | NxN   | –       | –      |

|       |       | CU==8x8 |        |        |
|-------|-------|---------|--------|--------|
|       |       | flag    | prefix | suffix |
| Intra | 2Nx2N | 1       | –      | 0      |
|       | NxN   | 1       | –      | 1      |
| Inter | 2Nx2N | 0       | 1      | –      |
|       | 2NxN  | 0       | 01     | –      |
|       | 2NxnU | –       | –      | –      |
|       | 2NxnD | –       | –      | –      |
|       | Nx2N  | 0       | 00     | –      |
|       | nLx2N | –       | –      | –      |
|       | nRx2N | –       | –      | –      |
|       | NxN   | –       | –      | –      |

FIG. 10

| | | CU > 8x8 | | CU==8x8 (IN A CASE WHERE AT LEAST ONE OF NEIGHBORING CUs IS INTER CU) | | CU==8x8 (IN A CASE WHERE BOTH NEIGHBORING CUs ARE INTRA CUs) | |
|---|---|---|---|---|---|---|---|
| | | prefix | suffix | prefix | suffix | prefix | suffix |
| Intra | 2Nx2N | 000 | – | 000 | 0 | 1 | 0 |
| | NxN | – | – | 000 | 1 | 1 | 1 |
| Inter | 2Nx2N | 1 | – | 1 | – | 000 | |
| | 2NxN | 01 | 1 | 01 | – | 01 | – |
| | 2NxnU | 01 | 00 | – | – | – | – |
| | 2NxnD | 01 | 01 | – | – | – | – |
| | Nx2N | 001 | 1 | 001 | – | 001 | – |
| | nLx2N | 001 | 00 | – | – | – | – |
| | nRx2N | 001 | 01 | – | – | – | – |
| | NxN | – | – | – | – | – | – |

| | | CU > 8x8 (SIZE OF UPPER CU IS GREATER THAN OR EQUAL TO THAT OF TARGET CU) | | CU > 8x8 (SIZE OF UPPER CU IS LESS THAN THAT OF TARGET CU) | | CU==8x8 | |
|---|---|---|---|---|---|---|---|
| | | prefix | suffix | prefix | suffix | prefix | suffix |
| Intra | 2Nx2N | 000 | – | 000 | – | 1 | 0 |
| | NxN | – | – | – | – | 1 | 1 |
| Inter | 2Nx2N | 1 | – | 1 | – | 000 | |
| | 2NxN | 01 | 1 | 001 | 1 | 01 | – |
| | 2NxnU | 01 | 00 | 001 | 00 | – | – |
| | 2NxnD | 01 | 01 | 001 | 01 | – | – |
| | Nx2N | 001 | 1 | 01 | 1 | 001 | – |
| | nLx2N | 001 | 00 | 01 | 00 | – | – |
| | nRx2N | 001 | 01 | 01 | 01 | – | – |

1012B_1  1012B_2

| CU | | PU | TU depth | | |
|---|---|---|---|---|---|
| size | d | type | 0 | 1 | 2 |
| 64x64 | 0 | 2Nx2N | – (*1) | 32x32 | 16x16 |
| | | 2NxN, 2NxnU, 2NxnD Nx2N, nLx2N, nRx2N | – (*1) | 32x32 | 32x8 8x32 |
| 32x32 | 1 | 2Nx2N | 32x32 | 16x16 | 8x8 |
| | | 2NxN, 2NxnU, 2NxnD Nx2N, nLx2N, nRx2N | 32x32 | 32x8 8x32 | 16x4 4x16 |
| 16x16 | 2 | 2Nx2N | 16x16 | 8x8 | 4x4 |
| | | 2NxN, 2NxnU, 2NxnD Nx2N, nLx2N, nRx2N | 16x16 | 16x4 4x16 | 4x4 |
| 8x8 | 3 | 2Nx2N 2NxN Nx2N | 8x8 | 4x4 | – (*2) |

PU PARTITIONING TYPE: 2N×2N

FIG. 31

| prediction_unit( x0, y0 ) { | Descriptor |
|---|---|
|   if( skip_flag[ x0 ][ y0 ] ) { | |
|     merge_idx[ x0 ][ y0 ] | ue(v) \| ae(v) |
|   } else if( PredMode == MODE_INTRA ) { | |
|     ... | |
|   } else { /* MODE_INTER */ | |
|     if( entropy_coding_mode_flag \|\| PartMode != PART_2Nx2N ) | |
|       merge_flag[ x0 ][ y0 ] | u(1) \| ae(v) |
|     if( merge_flag[ x0 ][ y0 ] ) { | |
|       merge_idx[ x0 ][ y0 ] | ue(v) \| ae(v) |
|     } else { | |
|       if( slice_type == B ) { | |
|         inter_pred_flag[ x0 ][ y0 ] | ue(v) \| ae(v) |
|       } | |
|       if( inter_pred_flag[ x0 ][ y0 ] == Pred_LC ) { | |
|         if( num_ref_idx_lc_active_minus1 > 0 ) { | |
|           ref_idx_lc[ x0 ][ y0 ] | ae(v) |
|         } | |
|         mvd_lc[ x0 ][ y0 ][ 0 ] | se(v)  ae(v) |
|         mvd_lc[ x0 ][ y0 ][ 1 ] | se(v)  ae(v) |
|         mvp_idx_lc[ x0 ][ y0 ] | ue(v)  ae(v) |
|       } | |
|       else { /* Pred_L0 or Pred_BI */ | |
|         if( num_ref_idx_l0_active_minus1 > 0 ) { | |
|           ref_idx_l0_minusX[ x0 ][ y0 ] | ue(v) \| ae(v) |
|         } | |
|         mvd_l0[ x0 ][ y0 ][ 0 ] | se(v) \| ae(v) |
|         mvd_l0[ x0 ][ y0 ][ 1 ] | se(v) \| ae(v) |
|         mvp_idx_l0[ x0 ][ y0 ] | ue(v) \| ae(v) |
|       } | |
|       if( inter_pred_flag[ x0 ][ y0 ] == Pred_BI ) { | |
|         if( num_ref_idx_l1_active_minus1 > 0 ) { | |
|           ref_idx_l1[ x0 ][ y0 ] | ue(v) \| ae(v) |
|         } | |
|         mvd_l1[ x0 ][ y0 ][ 0 ] | se(v) \| ae(v) |
|         mvd_l1[ x0 ][ y0 ][ 1 ] | se(v) \| ae(v) |
|         mvp_idx_l1[ x0 ][ y0 ] | ue(v) \| ae(v) |
|       } | |
|     } | |
|   } | |
| } | |

| slice_type | inter_pred_flag | Name of inter_pred_flag |
|---|---|---|
| P | inferred | Pred_L0 |
| B | 0 | Pred_LC |
|   | 1 | Pred_BI |

(b)

| slice_type | inter_pred_flag | Name of inter_pred_flag | |
|---|---|---|---|
|   |   | IN THE CASE OF USING A COMBINED LIST | OTHER CASES |
| P | inferred | Pred_L0 | Pred_L0 |
| B | 0 | Pred_LC | Pred_L0 |
|   | 1 | – | Pred_L1 |
|   | 2 | Pred_BI | Pred_BI |

| prediction_unit( x0, y0 ) { | Descriptor |
|---|---|
| ... | |
| if( slice_type == B ) { | |
| if (!DisableBiPred) { | |
| inter_pred_flag0[ x0 ][ y0 ] | ue(1) \| ae(1) |
| } | |
| else if (!UsePredRefLC && !NoBackPredFlag) { | |
| inter_pred_flag1[ x0 ][ y0 ] | ue(1) \| ae(1) |
| } | |
| } | |
| ... | |
| } | |

(b)

| prediction_unit( x0, y0 ) { | Descriptor |
|---|---|
| ... | |
| if( slice_type == B ) { | |
| if (!DisableBiPred) { | |
| inter_pred_flag0[ x0 ][ y0 ] | ue(1) \| ae(1) |
| } | |
| } | |
| ... | |
| } | |

| sequence_parameter_set(){ | Descriptor |
|---|---|
| | |
| disable_inter4x4 | u(1) |
| disable_bipred_in_small_PU | u(1) |
| | |
| | |
| } | |

(b)

| sequence_parameter_set(){ | Descriptor |
|---|---|
| | |
| use_restricted_prediction | u(1) |
| | |
| | |
| | |
| } | |

(c)

| sequence_parameter_set(){ | Descriptor |
|---|---|
| | |
| disable_bipred_size | u(v) |
| | |
| | |
| | |
| } | |

|  | BI-PREDICTION RESTRICTION ONLY ON BASIC INTER PU | BI-PREDICTION RESTRICTION ON ALL PUs |
|---|---|---|
| SKIP CU | NO RESTRICTION OF BI-PREDICTION ON SMALL SIZE PU | RESTRICTION OF BI-PREDICTION ON SMALL SIZE PU |
| MERGE PU | | |
| BASIC INTER PU (PU OTHER THAN SKIP OR MERGE PU) | RESTRICTION OF BI-PREDICTION ON SMALL SIZE PU | |

(b)

|  | BI-PREDICTION RESTRICTION METHOD |
|---|---|
| SKIP CU | METHOD OF DERIVING MOTION COMPENSATION PARAMETERS OF SKIP CANDIDATE AND MERGE CANDIDATE |
| MERGE PU | |
| BASIC INTER PU (PU OTHER THAN SKIP OR MERGE PU) | DECODING OF INTER PREDICTION FLAG IN ACCORDANCE WITH PU SIZE |

IMAGE DECODING DEVICE, IMAGE DECODING METHOD, AND IMAGE ENCODING DEVICE

CROSS-REFERENCE TO RELATED APPLICATIONS

This application is a Continuation of copending application Ser. No. 14/348,499, filed on Mar. 28, 2014, which is the National Phase under 35 U.S.C. § 371 of International Application No. PCT/JP2012/075191, filed on Sep. 28, 2012, which claims the benefit under 35 U.S.C. § 119(a) to Patent Application No. 2011-215475, filed in Japan on Sep. 29, 2011, all of which are hereby expressly incorporated by reference into the present application.

TECHNICAL FIELD

The present invention relates to an image decoding device and an image method for decoding encoded data representing an image, and an image encoding device for encoding an image to generate encoded data.

BACKGROUND ART

Video encoding devices for encoding moving images to generate encoded data, and video decoding devices for decoding the encoded data to generate decoded images are used for efficient transmission or recording of moving images.

Specifically, video coding standards are available, such as H.264/MPEG-4.AVC, the standard implemented in KTA software, which is a codec for joint development in VCEG (Video Coding Expert Group), the standard implemented in TMuC (Test Model under Consideration) software, and the standard proposed in HEVC (High-Efficiency Video Coding), which is a codec successor to H.264/MPEG-4.AVC (NPLs 1).

In such video coding standards, images (pictures) forming a moving image are managed using a hierarchical structure that is composed of slices obtained by partitioning each image, coding units obtained by splitting each slice, and blocks and partitions obtained by splitting each coding unit. The images (pictures) are generally encoded/decoded on a block-by-block basis.

In such video coding standards, generally, a prediction image is generated based on a locally decoded image obtained by encoding/decoding an input image, and the prediction image is subtracted from the input image (original image) to obtain a prediction residual (also referred to as a "differential image" or a "residual image") which is then encoded. Methods of generating prediction images include inter-frame prediction (inter prediction) and intra-frame prediction (intra prediction).

In intra prediction, a prediction image in a frame is sequentially generated based on a locally decoded image in this frame.

In inter prediction, on the other hand, a prediction image in a frame to be predicted is generated in units of prediction units (for example, blocks) by applying motion compensation using motion vectors to a reference image in a reference frame (decoded image) the entirety of which has been decoded.

As for inter prediction, a technique of splitting a coding unit, which is the unit of a coding process, into asymmetric partitions (PUs) when using inter prediction was adopted (AMP; Asymmetric Motion Partition, NPLs 2 and 3) at the sixth meeting of the JCT-VC, which was recently held (Torino, IT, 14-22 Jul. 2011).

It has also been proposed that non-square quadtree transform (NSQT) be used if the type of partition is an asymmetric partition (NPL 2).

CITATION LIST

Non Patent Literature

NPL 1: "WD4: Working Draft 4 of High-Efficiency Video Coding (JCTVC-F803_d1)", Joint Collaborative Team on Video Coding (JCT-VC) of ITU-T SG16 WP3 and ISO/IEC JTC1/SC29/WG11 6th Meeting: Torino, IT, 14-22 Jul. 2011 (published on Sep. 8, 2011)

NPL 2: "CE2: Non-Square Quadtree Transform for symmetric and asymmetric motion partition (JCTVC-F412)", Joint Collaborative Team on Video Coding (JCT-VC) of ITU-T SG16 WP3 and ISO/IEC JTC1/SC29/WG116th Meeting: Torino, IT, 14-22 Jul. 2011 (published on Jul. 2, 2011)

NPL 3: "CE2: Test results of asymmetric motion partition (AMP) (JCTVC-F379)", Joint Collaborative Team on Video Coding (JCT-VC) of ITU-T SG16 WP3 and ISO/IEC JTC1/SC29/WG116th Meeting: Torino, 14-22 Jul. 2011 (published on Jul. 2, 2011)

SUMMARY OF INVENTION

Technical Problem

In inter prediction, however, new addition of an asymmetric partition, described above, causes an increase in the amount of coding of side information. There is another problem in that although a newly added asymmetric partition has different characteristics from an existing symmetric partition, the characteristics of the asymmetric partition are not fully exploited in coding processes.

The present invention has been made in view of the foregoing problems, and it is an object of the present invention to provide an image decoding device, an image decoding method, and an image encoding device that may achieve a reduction in the amount of coding taken in the use of an asymmetric partition and that may implement efficient encoding/decoding processes exploiting the characteristics of the asymmetric partition.

Solution to Problem

In order to overcome the foregoing problems, an image decoding device according to an aspect of the present invention is an image decoding device for decoding encoded image data for each coding unit to generate a decoded image, including a CU information decoding unit configured to decode information for specifying a partition type in which the coding unit is split; and an arithmetic decoding unit configured to decode binary values from the encoded image data using arithmetic decoding that uses contexts or arithmetic decoding that does not use contexts, wherein in a case that the CU information decoding unit decodes information for specifying an asymmetric partition (AMP; Asymmetric Motion Partition) as the partition type, the arithmetic decoding unit is configured to decode the binary values by switching between the arithmetic decoding that uses contexts and the arithmetic decoding that does not use contexts in accordance with a position of the binary values.

In order to overcome the foregoing problems, an image decoding device according to an aspect of the present invention is an image decoding device for decoding encoded image data for each coding unit to generate a decoded image, including a CU information decoding unit configured to decode information for specifying a partition type in which the coding unit is split; and an arithmetic decoding unit configured to decode binary values from the encoded image data using arithmetic decoding that uses contexts or arithmetic decoding that does not use contexts, wherein in a case that the CU information decoding unit decodes information for specifying a type of rectangular partition as the partition type, the arithmetic decoding unit is configured to decode the binary values by switching between the arithmetic decoding that uses contexts and the arithmetic decoding that does not use contexts in accordance with a position of the binary values.

In order to overcome the foregoing problems, an image decoding method according to an aspect of the present invention is an image decoding method for decoding encoded image data for each coding unit to generate a decoded image, including the steps of decoding information for specifying a partition type in which the coding unit is split; and decoding binary values from the encoded image data using arithmetic decoding that uses contexts or arithmetic decoding that does not use contexts, wherein in a case that information for specifying an asymmetric partition (AMP; Asymmetric Motion Partition) as the partition type is to be decoded, the binary values are decoded by switching between the arithmetic decoding that uses contexts and the arithmetic decoding that does not use contexts in accordance with a position of the binary values.

In order to overcome the foregoing problems, an image encoding device according to an aspect of the present invention is an image encoding device for encoding information for restoring an image for each coding unit to generate encoded image data, including an encoding setting unit configured to encode information for specifying a partition type in which the coding unit is split; and an encoded data generation unit configured to generate the encoded image data using an encoding process that uses contexts or an encoding process that does not use contexts, wherein in a case that information for specifying an asymmetric partition (AMP; Asymmetric Motion Partition) as the partition type is to be encoded, the encoded data generation unit is configured to generate the encoded image data by switching between the encoding process that uses contexts and the encoding process that does not use contexts.

In order to overcome the foregoing problems, an image decoding device according to an aspect of the present invention is an image decoding device for decoding an image in a prediction unit using, as an inter-frame prediction scheme, a uni-prediction scheme in which one reference image is referred to or a bi-prediction scheme in which two reference images are referred to, the image decoding device including bi-prediction restriction means for imposing restriction of bi-prediction on the prediction unit in a case that the prediction unit is a prediction unit having a size less than or equal to a predetermined value.

Advantageous Effects of Invention

According to an aspect of the present invention, a reduction in the amount of coding taken in the use of an asymmetric partition may be achieved. In addition, efficient encoding/decoding processes exploiting the characteristics of the asymmetric partition may be implemented.

BRIEF DESCRIPTION OF DRAWINGS

FIG. 8 is a diagram illustrating an example of the binarization information that defines a CU having an 8×8 size.

FIG. 9 is a diagram illustrating another example of the binarization information that defines a CU having an 8×8 size.

FIG. 10 is a table illustrating another example of the binarization information that defines associations between combinations of CU prediction types and PU partition types and bin sequences.

FIG. 11 is a table illustrating another example of the binarization information that defines associations between combinations of CU prediction types and PU partition types and bin sequences.

FIG. 31 illustrates an example of a PU syntax table in the related art, and is a diagram illustrating the configuration of encoded data in a case that no restriction of bi-prediction is performed.

FIG. 32 includes diagrams illustrating the meaning of an inter prediction flag. Part (a) of FIG. 32 illustrates the meaning of an inter prediction flag in a case that the inter prediction flag is a binary flag, and part (b) of FIG. 32 illustrates the meaning of an inter prediction flag in a case that the inter prediction flag is a ternary flag.

FIG. 33 includes diagrams illustrating an example of a PU syntax table, in which (a) and (b) illustrate the configuration of encoded data in a case that restriction of bi-prediction is performed, and specifically illustrate the portion of an inter prediction flag inter_pred_flag.

FIG. 34 includes diagrams illustrating an example of a syntax table for bi-prediction restriction. Part (a) of FIG. 34 illustrates the case that the sequence parameter set includes a flag disable_bipred_in_small_PU restricting whether or not to impose the restriction of bi-prediction. Part (b) of FIG. 34 illustrates an example in which a prediction restriction flag use_restricted_prediction is used as a common flag. Part (c) of FIG. 34 illustrates an example in which disable_bipred_size indicating the size of a PU for which bi-prediction is prohibited is included in encoded data.

FIG. 35 includes diagrams illustrating correspondences between ranges over which the restriction of bi-prediction applies and bi-prediction restriction methods.

DESCRIPTION OF EMBODIMENTS

Figure 1:
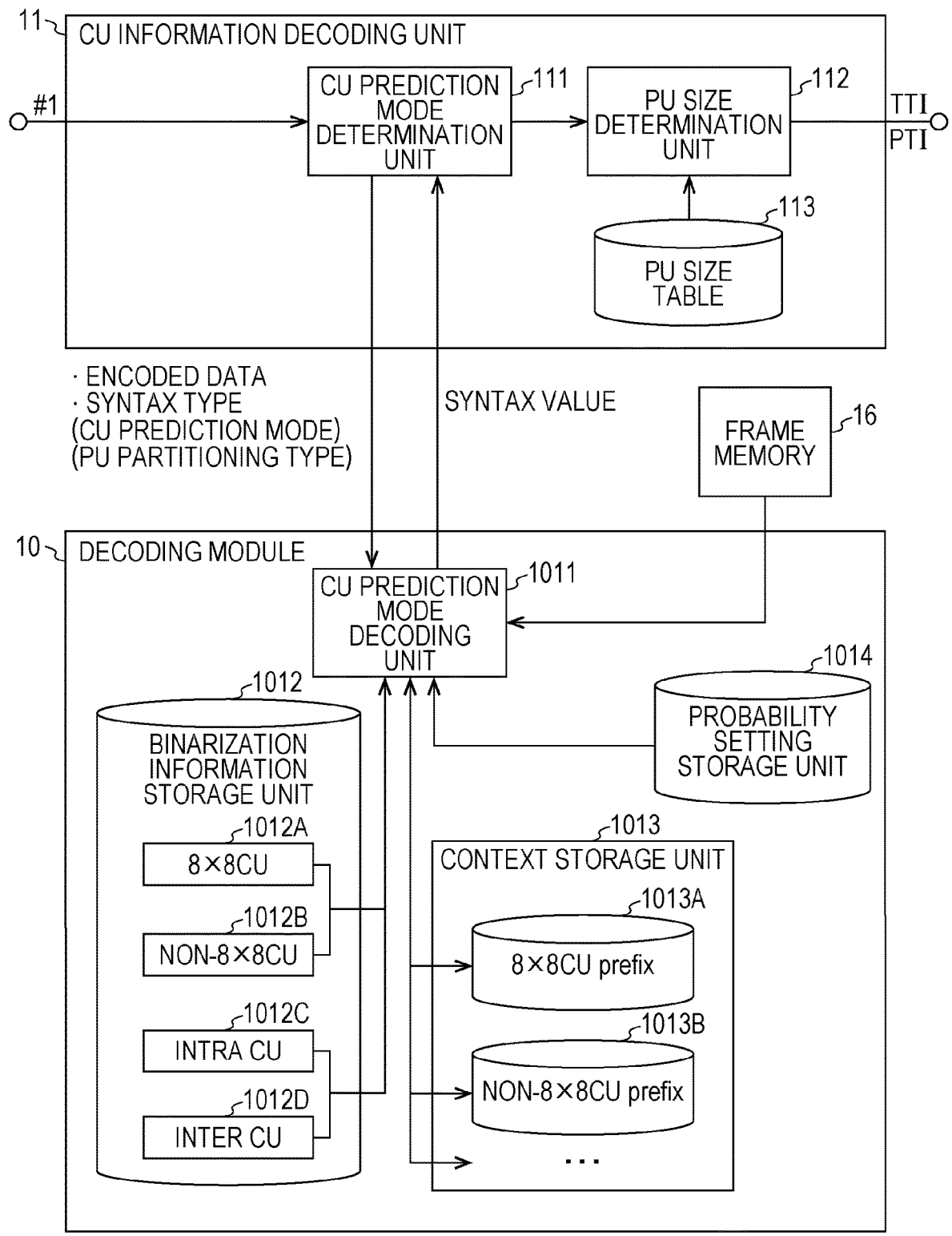
FIG. 1 is a functional block diagram illustrating an example configuration of a CU information decoding unit and a decoding module in a video decoding device according to an embodiment of the present invention.
Figure 2:
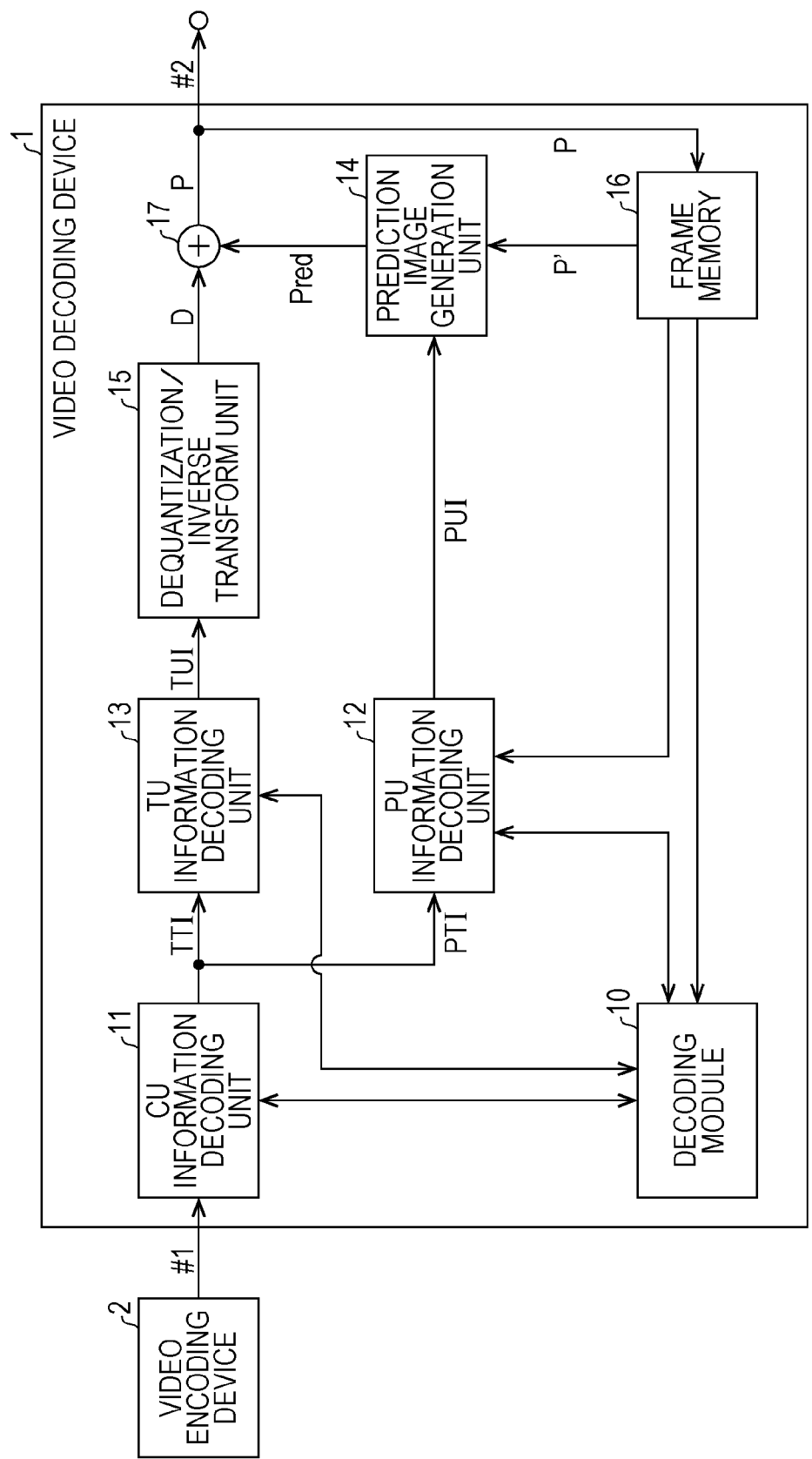
FIG. 2 is a functional block diagram illustrating a schematic configuration of the video decoding device.

An embodiment of the present invention will be described with reference to FIG. 1 to FIG. 24. First, an overview of a video decoding device (image decoding device) 1 and a video encoding device (image encoding device) 2 will be described with reference to FIG. 2. FIG. 2 is a functional block diagram illustrating a schematic configuration of the video decoding device 1.

The video decoding device 1 and the video encoding device 2 illustrated in FIG. 2 implement technologies adopted in the H.264/MPEG-4 AVC specifications, technologies adopted in KTA software, which is a codec for joint development in VCEG (Video Coding Expert Group), technologies adopted in TMuC (Test Model under Consideration) software, and technologies proposed in HEVC (High-Efficiency Video Coding), which is a codec successor to H.264/MPEG-4 AVC.

The video encoding device 2 generates encoded data #1 by entropy encoding the syntax values specified in the above-described video coding standards to be transmitted from an encoder to a decoder.

Context-based adaptive variable length coding (CAVLC) and context-based adaptive binary arithmetic coding (CABAC) are known as entropy coding schemes.

CAVLC- and CABAC-based encoding/decoding is based on context-adaptive processing. The term "context" refers to a state (context) of encoding/decoding. A context is determined using the previous encoded/decoded results of relevant syntax. The relevant syntax includes, for example, various syntax structures related to intra prediction and inter prediction, various syntax structures related to luminance (Luma) and color difference (Chroma), and various syntax structures related to CU (coding unit) sizes. In CABAC, furthermore, the position of the binary to be encoded/decoded in binary data (binary sequence) corresponding to a syntax structure may be used as a context.

In CAVLC, various syntax elements are coded by adaptively changing a VLC table to be used for coding. In CABAC, on the other hand, syntax elements that may take multiple values, such as prediction modes and transform coefficients, are binarized, and binary data obtained by the binarization procedure is adaptively arithmetically coded in accordance with the probability of occurrence. Specifically, a plurality of buffers each holding the probability of occurrence of a binary value (0 or 1) are prepared. One of the buffers is selected in accordance with the context, and arithmetic coding is performed based on the probability of occurrence recorded on the selected buffer. The probability of occurrence in the buffer is updated on the basis of the binary value to be decoded/encoded, enabling the appropriate probability of occurrence to be maintained in accordance with the context.

The encoded data #1 obtained by the video encoding device 2 encoding a moving image is input to the video decoding device 1. The video decoding device 1 decodes the input encoded data #1, and outputs a moving image #2 to outside. Before proceeding to a detailed description of the video decoding device 1, a description will be given hereinafter of the configuration of the encoded data #1.

[Configuration of Encoded Data]

An example configuration of the encoded data #1 generated by the video encoding device 2 and decoded by the video decoding device 1 will be described with reference to FIG. 3. The encoded data #1 includes, by way of example, a sequence and a plurality of pictures forming the sequence.

Figure 3:
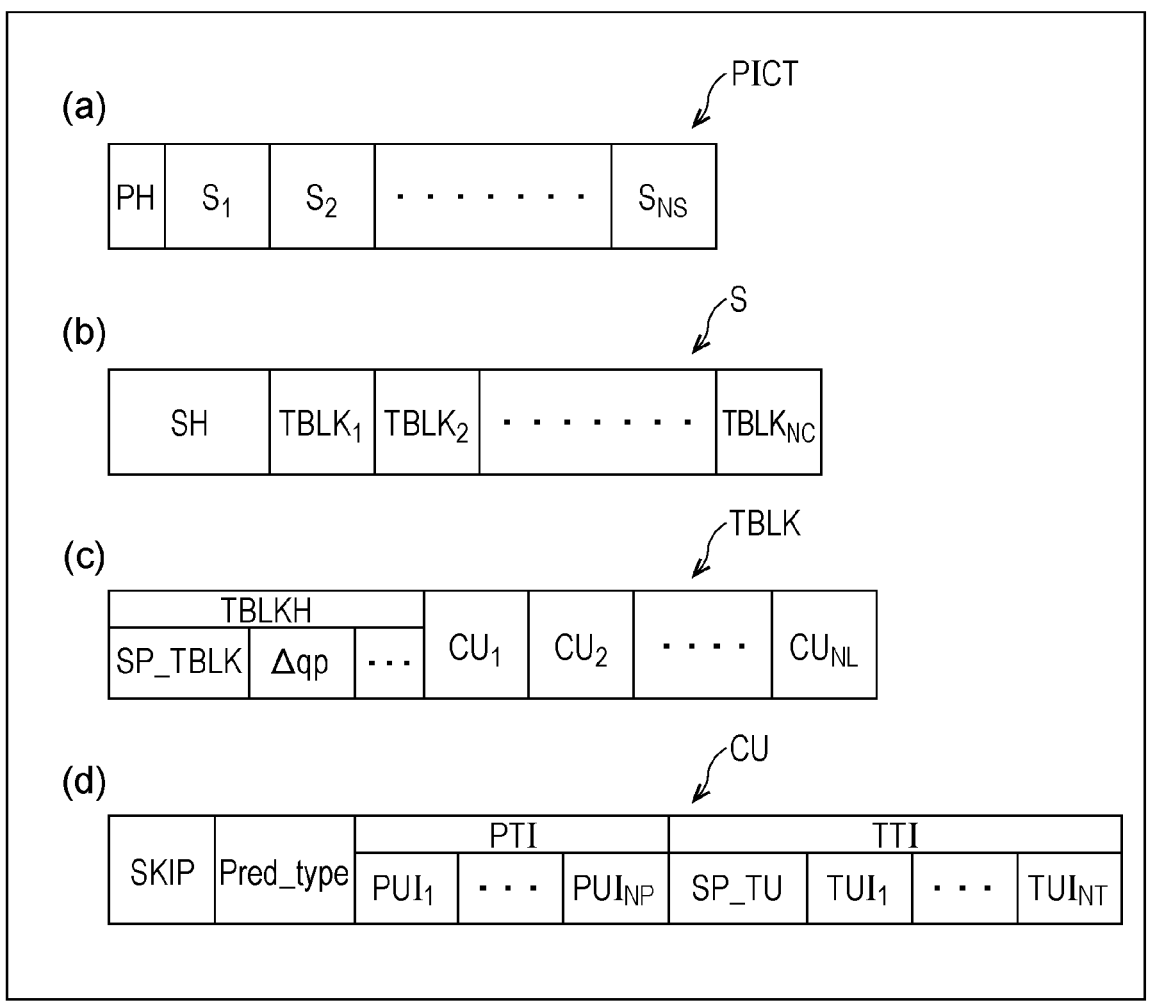
FIG. 3 includes diagrams illustrating a data configuration of encoded data generated by a video encoding device according to an embodiment of the present invention and decoded by the video decoding device, in which parts (a) to (d) are diagrams illustrating a picture layer, a slice layer, a tree block layer, and a CU layer, respectively.

FIG. 3 illustrates a structure of layers including a picture layer and layers below the picture layer in the encoded data #1. Parts (a) to (d) of FIG. 3 are diagrams illustrating, respectively, a picture layer that defines a picture PICT, a slice layer that defines a slice S, a tree block layer that defines a tree block TBLK, and a CU layer that defines a coding unit (CU) included in the tree block TBLK.

(Picture Layer)

The picture layer defines a data set referred to by the video decoding device 1 in order to decode a picture PICT being processed (hereinafter also referred to as a target picture). As illustrated in part (a) of FIG. 3, the picture PICT includes a picture header PH and slices $S_1$ to $S_{NS}$ (where NS is the total number of slices included in the picture PICT).

Hereinafter, subscripts may be omitted if there is no need to distinguish the slices $S_1$ to $S_{NS}$ from one another. The above similarly applies to other data items with subscripts among the data items included in the encoded data #1, described below.

The picture header PH includes a coding parameter group referred to by the video decoding device 1 in order to determine a method for decoding the target picture. For example, coding mode information (entropy_coding_mode_flag) indicating a variable length coding mode used by the video encoding device 2 for coding is an example of a coding parameter included in the picture header PH.

If entropy_coding_mode_flag is equal to 0, the picture PICT is a picture coded using CAVLC (Context-based Adaptive Variable Length Coding). If entropy_coding_mode_flag is equal to 1, the picture PICT is a picture coded using CABAC (Context-based Adaptive Binary Arithmetic Coding).

The picture header PH is also referred to as a picture parameter set (PPS).

(Slice Layer)

The slice layer defines a data set referred to by the video decoding device 1 in order to decode a slice S being processed (hereinafter also called a target slice). As illustrated in part (b) of FIG. 3, the slice S includes a slice header SH and tree blocks $TBLK_1$ to $TBLK_{NC}$ (where NC is the total number of tree blocks included in the slice S).

The slice header SH includes a coding parameter group referred to by the video decoding device 1 in order to determine a method for decoding the target slice. Slice type specifying information (slice_type) specifying a slice type is an example of a coding parameter included in the slice header SH.

Slice types that may be specified by the slice type specifying information include (1) I slice that uses only intra prediction for coding, (2) P slice that uses uni-prediction or intra prediction for coding, and (3) B slice that uses uni-prediction, bi-prediction, or intra prediction for coding.

The slice header SH may also include filter parameters referred to by a loop filter (not illustrated) included in the video decoding device 1.

(Tree Block Layer)

The tree block layer defines a data set referred to by the video decoding device 1 in order to decode a tree block TBLK being processed (hereinafter also called a target tree block).

The tree block TBLK includes a tree block header TBLKH and coding unit information items $CU_1$ to $CU_{NL}$ (where NL is the total number of coding unit information items included in the tree block TBLK). The following is a description of, first, the relationship between the tree block TBLK and the coding unit information CU.

The tree block TBLK is split into units for specifying block sizes for the respective processes of intra prediction or inter prediction and transformation.

The units of the tree block TBLK are obtained by recursive quadtree partitioning. The tree structure obtained by the recursive quadtree partitioning is hereinafter referred to as a coding tree.

In the following, units corresponding to leaf nodes that are end points in a coding tree will be referenced as coding nodes. Since a coding node is the basic unit of a coding process, a coding node is hereinafter also referred to as a coding unit (CU).

That is, the coding unit information items $CU_1$ to $CU_{NL}$ are information items corresponding to the coding nodes (coding units) obtained by the recursive quadtree partitioning of the tree block TBLK.

The root of the coding tree is associated with the tree block TBLK. In other words, the tree block TBLK is associated with the highest node of a quadtree structure recursively including a plurality of coding nodes.

The size of each individual coding node is half, both horizontally and vertically, the size of a coding node to which the individual coding node directly belongs (that is, the unit at the node that is one layer above the individual coding node).

The size that each individual coding node may take depends on size specifying information and the maximum hierarchical depth of the individual coding node, which are included in the sequence parameter set SPS in the encoded data #1. For example, if the tree block TBLK has a size of 64×64 pixels and has a maximum hierarchical depth of 3, each of the coding nodes in the layers at or below the tree block TBLK may take any of the following four sizes: 64×64 pixels, 32×32 pixels, 16×16 pixels, and 8×8 pixels.

(Tree Block Header)

The tree block header TBLKH includes coding parameters referred to by the video decoding device 1 in order to determine a method for decoding the target tree block. Specifically, as illustrated in part (c) of FIG. 3, the tree block header TBLKH includes tree block split information SP_TBLK specifying a pattern in which the target tree block is split into individual CUs, and a quantization parameter difference Δqp (qp_delta) specifying a quantization step size.

The tree block split information SP_TBLK is information indicating a coding tree for splitting a tree block. Specifically, the tree block split information SP_TBLK is information for specifying the shape and size of the CUs included in the target tree block and also specifying the position of the CUs in the target tree block.

The tree block split information SP_TBLK may not necessarily explicitly include the shape or size of the CUs. For example, the tree block split information SP_TBLK may be a set of flags (split_coding_unit_flag) indicating whether or not to split the entire target tree block or a sub-block of a tree block into four sections. In this case, the shape and size of the CUs can be identified using the shape and size of the tree block in combination with the set of flags.

The quantization parameter difference Δqp is a difference qp-qp' between a quantization parameter qp in the target tree block and a quantization parameter qp' in the tree block that has been coded immediately before the target tree block.

(Cu Layer)

The CU layer defines a data set referred to by the video decoding device 1 in order to decode a CU being processed (hereinafter also referred to as a target CU).

Before proceeding to the discussion of the specific content of the data items included in the coding unit information CU, a description will be given of the tree structure of data items included in a CU. A coding node is a node at the root of a prediction tree (PT) and a transform tree (TT). The following is a description of the prediction tree and the transform tree.

In the prediction tree, the coding node is split into one or more prediction blocks, and the prediction tree specifies the position and size of the individual prediction blocks. In other words, prediction blocks are one or more non-overlapping regions forming a coding node. The prediction tree includes one or more prediction blocks obtained by the splitting procedure described above.

A prediction process is performed in units of prediction blocks. The prediction blocks, which are the units of prediction, are hereinafter also referred to as prediction units (PUs).

There are roughly two prediction tree partition types, namely, intra prediction and inter prediction.

For the intra prediction, partitions of 2N×2N (the same size as the coding node) and N×N are available.

For the inter prediction, partitions of 2N×2N (the same size as the coding node), 2N×N, N×2N, N×N, and the like are available.

In the transform tree, the coding node is split into one or more transform blocks, and the transform tree specifies the position and size of the individual transform blocks. In other words, transform blocks are one or more non-overlapping regions forming a coding node. The transform tree includes one or more transform blocks obtained by the splitting procedure described above.

A transform process is performed in units of transform blocks. The transform blocks, which are the units of transform, are hereinafter also referred to as transform units (TUs).

(Data Structure of Coding Unit Information)

Next, the detailed content of data items included in the coding unit information CU will be described with reference to part (d) of FIG. 3. As illustrated in part (d) of FIG. 3, specifically, the coding unit information CU includes a skip mode flag (a skip flag) SKIP, CU prediction type information Pred_type, PT information PTI, and TT information TTI.

[Skip Flag]

The skip flag SKIP is a flag indicating whether or not a skip mode is applied to the target CU. If the value of the skip flag SKIP is equal to 1, that is, if a skip mode is applied to the target CU, the PT information PTI in the coding unit information CU is omitted. The skip flag SKIP is omitted in I slices.

[CU Prediction Type Information]

The CU prediction type information Pred_type includes CU prediction mode information PredMode and PU partition type information PartMode.

The CU prediction mode information PredMode specifies which of intra prediction (intra CU) and inter prediction (inter CU) to use as a prediction image generation method for each of the PUs included in the target CU. In the following, the types of skip, intra prediction, and inter prediction in the target CU are referred to as CU prediction modes.

The PU partition type information PartMode specifies a PU partition type that is a pattern in which the target coding unit (CU) is split into individual PUs. The split of the target coding unit (CU) into individual PUs in the manner described above in accordance with the PU partition type is hereinafter referred to as PU partition.

The PU partition type information PartMode may be, by way of example, an index indicating a type of PU partition pattern, or may specify the shape and size of the PUs included in the target prediction tree and also specify the position of the PUs in the target prediction tree.

PU partition types that can be selected differ depending on the CU prediction scheme and the CU size. Moreover, PU partition types that can be selected differ depending on inter prediction or intra prediction. The details of the PU partition types will be described below.

For non-I slices, the value of the PU partition type information PartMode may be identified by an index (cu_split_pred_part_mode) specifying a combination of tree block partitioning, prediction scheme, and CU splitting method.

[PT Information]

The PT information PTI is information concerning a PT included in the target CU. In other words, the PT information PTI is a set of information items each concerning one of one or more PUs included in the PT. As described above, since a prediction image is generated on a per-PU basis, the PT information PTI is referred to by the video decoding device 1 to generate a prediction image. As illustrated in part (d) of FIG. 3, the PT information PTI includes PU information items $PUI_1$ to $PUI_{NP}$ (where NP is the total number of PUs included in the target PT) each including prediction information and the like on one of the PUs.

The prediction information PUI includes intra prediction information or inter prediction information in accordance with which prediction method the prediction type information Pred_mode specifies. In the following, a PU to which intra prediction is applied is also referred to as an intra PU, and a PU to which inter prediction is applied is also referred to as an inter PU.

The inter prediction information includes coding parameters referred to by the video decoding device 1 to generate an inter prediction image using inter prediction.

Inter prediction parameters include, for example, a merge flag (merge_flag), a merge index (merge_idx), a motion vector predictor index (mvp_idx), a reference image index (ref_idx), an inter prediction flag (inter_pred_flag), and a motion vector difference (mvd).

The intra prediction information includes coding parameters referred to by the video decoding device 1 to generate an intra prediction image using intra prediction.

Intra prediction parameters include, for example, an estimated prediction mode flag, an estimated prediction mode index, and a residual prediction mode index.

In the intra prediction information, a PCM mode flag indicating whether or not to use a PCM mode may be coded. If the PCM mode flag has been coded and the PCM mode flag indicates the use of the PCM mode, the processes of prediction (intra), transformation, and entropy coding are omitted.

[TT Information]

The TT information TTI is information concerning a TT included in a CU. In other words, the TT information TTI is a set of information items each concerning one of one or more TUs included in the TT. The TT information TTI is referred to by the video decoding device 1 to decode residual data. In the following, a TU may also be referred to as a block.

As illustrated in part (d) of FIG. 3, the TT information TTI includes TT split information SP_TU specifying a pattern in which the target CU is split into individual transform blocks, and TU information items $TUI_1$ to $TUI_{NT}$ (where NT is the total number of blocks included in the target CU).

The TT split information SP_TU is information for, specifically, determining the shape and size of the TUs included in the target CU and also determining the position of the TUs in the target CU. The TT split information SP_TU may be implemented by, for example, information (split_transform_flag) indicating whether or not to split the target node into partitions and information (trafoDepth) indicating the depth of the partitions.

For example, if the CU size is 64×64, each of the TUs obtained by splitting may have a size in the range of 32×32 pixels to 4×4 pixels.

The TU information items $TUI_1$ to $TUI_{NT}$ are individual information items each concerning one of one or more TUs included in the TT. For example, the TU information TUI includes quantized prediction residuals.

Each quantized prediction residual is encoded data generated by the video encoding device 2 performing the following processes 1 to 3 on the target block, which is a block being processed.

Process 1: Application of a DCT transform (Discrete Cosine Transform) to a prediction residual obtained by subtracting a prediction image from an image to be encoded;

Process 2: Quantization of a transform coefficient obtained by Process 1; and

Process 3: Encoding of the transform coefficient quantized in Process 2 using a variable-length code.

The quantization parameter qp described above represents the size of the quantization step QP used when the video encoding device 2 quantizes a transform coefficient ($QP=2^{qp/6}$).

(PU Partition Type)

Given that the target CU has a size of 2N×2N pixels, the PU partition type has the following eight patterns: four symmetric partitions (symmetric splittings) of 2N×2N pixels, 2N×N pixels, N×2N pixels, and N×N pixels, and four asymmetric partitions (asymmetric splittings) of 2N×nU pixels, 2N×nD pixels, nL×2N pixels, and nR×2N pixels. Note that $N=2^m$ (where m is an arbitrary integer greater than or equal to 1). In the following, regions obtained by splitting the target CU are also referred to as partitions.

Figure 4:
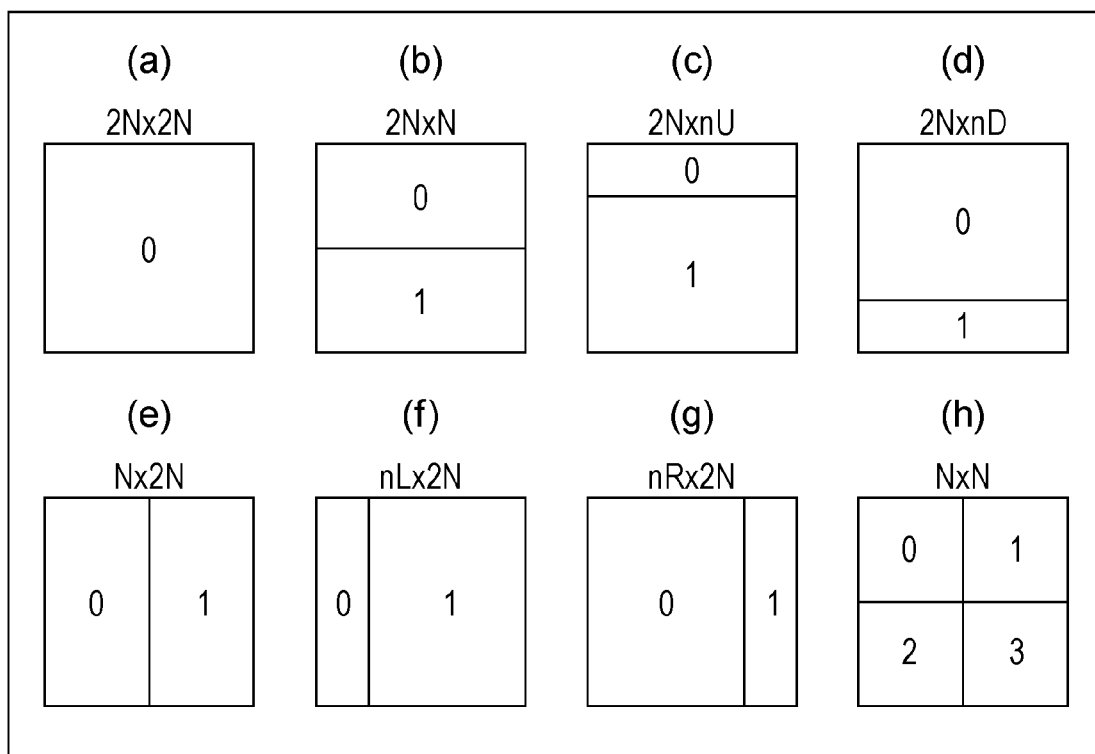
FIG. 4 includes diagrams illustrating patterns of PU partition types. Parts (a) to (h) of FIG. 4 illustrate partition shapes in the PU partition types of 2N×2N, 2N×N, 2N×nU, 2N×nD, N×2N, nL×2N, nR×2N and N×N, respectively.

Parts (a) to (h) of FIG. 4 illustrate specific positions of the boundaries of PU partitions in CUs for the respective partition types.

Part (a) of FIG. 4 illustrates the PU partition type of 2N×2N in which the CU is not split.

Parts (b), (c), and (d) of FIG. 4 illustrate the shape of partitions for the PU partition types of 2N×N, 2N×nU, and 2N×nD, respectively. In the following, partitions for the PU partition types of 2N×N, 2N×nU, and 2N×nD are collectively referred to as landscape-oriented partitions.

Parts (e), (f), and (g) of FIG. 4 illustrate the shape of partitions for the PU partition types of N×2N, nL×2N, and nR×2N, respectively. In the following, partitions for the PU partition types of N×2N, nL×2N, and nR×2N are collectively referred to as portrait-oriented partitions.

The landscape-oriented partitions and the portrait-oriented partitions are collectively referred to as rectangular partitions.

Part (h) of FIG. 4 illustrates the shape of partitions for the PU partition type of N×N. The PU partition types in parts (a) and (h) of FIG. 4 are also referred to as a square partition, which is based on the shapes of the partitions. The PU partition types in parts (b) to (g) of FIG. 4 are also referred to as a non-square partition.

In parts (a) to (h) of FIG. 4, numbers assigned to individual regions represent the identification numbers of the regions, and the regions are processed in ascending order of their identification numbers. That is, the identification numbers represent the scan order of the regions.

In parts (a) to (h) of FIG. 4, furthermore, it is assumed that the upper left corner is the reference point (origin) of the CU.

[Partition Types for Inter Prediction]

Of the eight partition types described above, seven types, other than N×N (part (h) of FIG. 4), are defined for inter PUs. The four asymmetric splittings described above may also be referred to as AMPs (Asymmetric Motion Partitions).

The specific value of N, described above, is specified by the size of the CU to which the current PU belongs, and the specific values of nU, nD, nL, and nR are determined in accordance with the value of N. For example, an inter CU having 128×128 pixels can be split into an inter PU having 128×128 pixels or into inter PUs having 128×64 pixels, 64×128 pixels, 64×64 pixels, 128×32 pixels, 128×96 pixels, 32×128 pixels, or 96×128 pixels.

[Partition Types for Intra Prediction]

The following two partition patterns are defined for intra PUs: the partition pattern of 2N×2N in which the target CU is not split, that is, the target CU itself is handled as one PU, and the pattern of N×N in which the target CU is symmetrically split into four PUs.

Thus, referring to the examples illustrated in FIG. 4, the partition patterns in parts (a) and (h) may be used for intra PUs.

For example, an intra CU having 128×128 pixels may be split into an intra PU having 128×128 pixels or intra PUs having 64×64 pixels.

For I slices, the coding unit information CU may include an intra partition mode (intra_part_mode) for identifying the PU partition type PartMode.

(TU Partitioning and Order of TUs in Node)

Next, TU partitioning and the order of TUs in a node will be described with reference to FIG. 18 to FIG. 20. A TU partition pattern is determined by the CU size, the partition depth (trafoDepth), and the PU partition type of the target PU.

The TU partition patterns include square quadtree partitions and non-square quadtree partitions. Specific examples of the TU partition patterns are illustrated in FIG. 18 and FIG. 19.

Figures 17, 18:
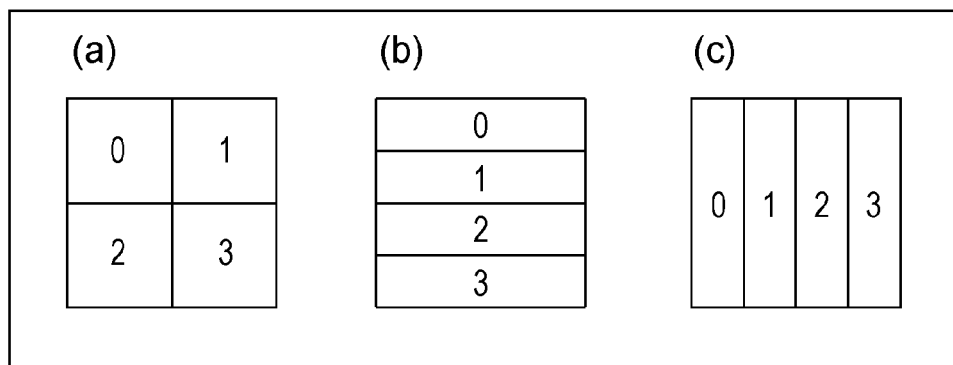
FIG. 17 is a diagram illustrating an example of transform size determination information in which TU partition patterns are defined in accordance with CU sizes, TU partition depths (trafoDepth), and PU partition types of target PUs.
FIG. 18 includes diagrams illustrating partitioning schemes in which a square node is partitioned into square or non-square nodes using quadtree partitioning. Part (a) of FIG. 18 illustrates partitioning into square nodes, part (b) of FIG. 18 illustrates partitioning into landscape-oriented rectangular nodes, and part (c) of FIG. 18 illustrates partitioning into portrait-oriented rectangular nodes.

FIG. 18 illustrates partitioning schemes in which a square node is split into square or non-square nodes using quadtree partitioning.

Part (a) of FIG. 18 illustrates a partitioning scheme in which a square node is split into square nodes using quadtree partitioning. Part (b) of FIG. 18 illustrates a partitioning scheme in which a square node is split into landscape-oriented rectangular nodes using quadtree partitioning. Part (c) of FIG. 18 illustrates a partitioning scheme in which a square node is split into portrait-oriented rectangular nodes using quadtree partitioning.

Figure 19:
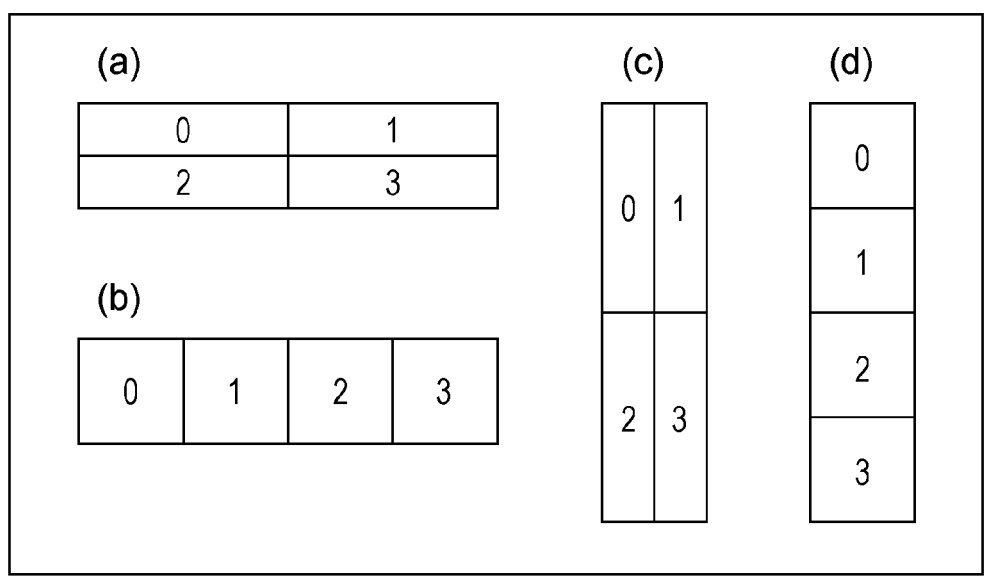
FIG. 19 includes diagrams illustrating partitioning schemes in which a square node is partitioned into square or non-square nodes using quadtree partitioning. Part (a) of FIG. 19 illustrates partitioning of a landscape-oriented node into landscape-oriented nodes, part (b) of FIG. 19 illustrates partitioning of a landscape-oriented node into square nodes, part (c) of FIG. 19 illustrates partitioning of a portrait-oriented node into portrait-oriented nodes, and part (d) of FIG. 19 illustrates partitioning of a portrait-oriented node into square nodes.

FIG. 19 illustrates partitioning schemes in which a non-square node is split into square or non-square nodes using quadtree partitioning.

Part (a) of FIG. 19 illustrates a partitioning scheme in which a landscape-oriented rectangular node is split into landscape-oriented rectangular nodes using quadtree partitioning. Part (b) of FIG. 19 illustrates a partitioning scheme in which a landscape-oriented rectangular node is split into square nodes using quadtree partitioning. Part (c) of FIG. 19 illustrates a partitioning scheme in which a portrait-oriented rectangular node is split into portrait-oriented rectangular nodes using quadtree partitioning. Part (d) of FIG. 19 illustrates a partitioning scheme in which a portrait-oriented rectangular node is split into square nodes using quadtree partitioning.

Figure 20:
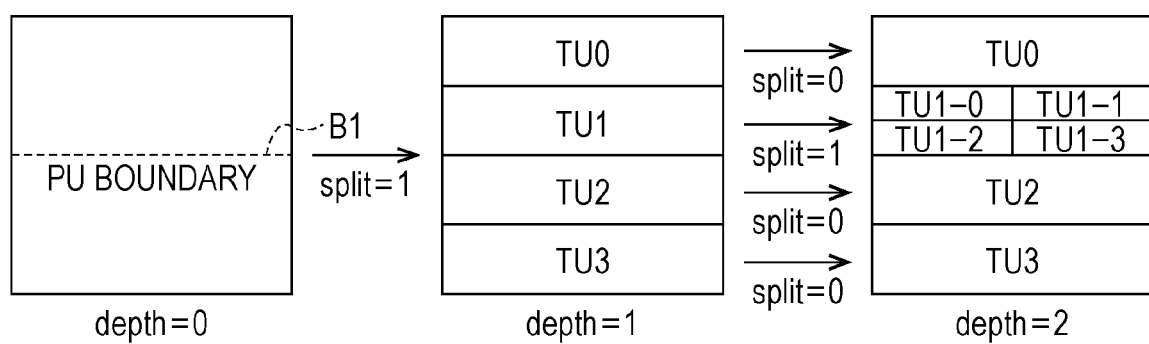
FIG. 20 is a diagram illustrating an example of TU partitions of a 32×32 CU with the PU partition type of 2N×N.

FIG. 20 illustrates an example of TU partitions of a 32×32 CU with the PU partition type of 2N×N. In FIG. 20, "depth" represents the partition depth (trafoDepth). Further, "split" represents the value of split_transform_flag at the corresponding depth. If "split" is equal to "1", TU partitioning is applied to the node at the corresponding depth. If "split" is equal to "0", no TU partitioning is applied.

The details of the correspondences between the TU partition patterns and CU sizes, partition depths (trafoDepth), and PU partition types of the target PU will be described below.

[Video Decoding Device]

A configuration of the video decoding device 1 according to this embodiment will be described hereinafter with reference to FIG. 1 to FIG. 24.

(Overview of Video Decoding Device)

The video decoding device 1 generates a prediction image for each PU. The video decoding device 1 adds the generated prediction image to a prediction residual decoded from the encoded data #1 to generate a decoded image #2, and outputs the generated decoded image #2 to outside.

The generation of a prediction image is based on the reference to coding parameters obtained by decoding the encoded data #1. The coding parameters are parameters referred to in order to generate a prediction image. The coding parameters include prediction parameters such as a motion vector that is referred to in inter-frame prediction and a prediction mode that is referred to in intra-frame prediction. The coding parameters also include the PU size and shape, the block size and shape, residual data between the original image and the prediction image, and so on. In the following, a set of all information items, except for the residual data, among the information items included in the coding parameters is referred to as side information.

In the following, furthermore, the picture (frame), slice, tree block, block, and PU to be decoded are referred to as the target picture, the target slice, the target tree block, the target block, and the target PU, respectively.

The tree block size is, for example, 64×64 pixels, and the PU size is, for example, 64×64 pixels, 32×32 pixels, 16×16 pixels, 8×8 pixels, 4×4 pixels, or the like. However, these sizes are merely illustrative, and any other tree block size and PU size may be used.

(Configuration of Video Decoding Device)

Referring back to FIG. 2, a schematic configuration of the video decoding device 1 will be described hereinafter. FIG. 2 is a functional block diagram illustrating a schematic configuration of the video decoding device 1.

As illustrated in FIG. 2, the video decoding device 1 includes a decoding module 10, a CU information decoding unit 11, a PU information decoding unit 12, a TU information decoding unit 13, a prediction image generation unit 14, a dequantization/inverse transform unit 15, a frame memory 16, and an adder 17.

[Decoding Module]

The decoding module 10 performs a decoding process to decode a syntax value from a binary representation. More specifically, the decoding module 10 decodes a syntax value encoded using an entropy coding scheme such as CABAC or CAVLC, on the basis of the encoded data and syntax type supplied from the source, and returns the decoded syntax value to the source.

In the example described below, the source from which the encoded data and the syntax type are supplied includes the CU information decoding unit 11, the PU information decoding unit 12, and the TU information decoding unit 13.

The following is a description of an example of the decoding process of the decoding module 10, in which a binary representation (bit sequence) of encoded data and the syntax type "split_coding_unit_flag" are supplied from the CU information decoding unit 11 to the decoding module 10. In this case, the decoding module 10 refers to the associations between a bit sequence related to "split_coding_unit_flag" and a syntax value to derive the syntax value from the binary representation, and returns the derived syntax value to the CU information decoding unit 11.

[CU Information Decoding Unit]

The CU information decoding unit 11 performs a decoding process on encoded data #1 of one frame, which is input from the video encoding device 2, using the decoding module 10 on the tree block and CU levels. Specifically, the CU information decoding unit 11 decodes the encoded data #1 using the following procedure.

First, the CU information decoding unit 11 refers to various headers included in the encoded data #1, and sequentially separates the encoded data #1 into slices and then tree blocks.

The various headers include (1) information on the method of partitioning the target picture into slices, and (2) information on the size and shape of tree blocks included in the target slice and the position of the tree blocks in the target slice.

The CU information decoding unit 11 refers to the tree block split information SP_TBLK included in the tree block header TBLKH, and splits the target tree block into CUs.

Then, the CU information decoding unit 11 acquires coding unit information (hereinafter referred to as CU information) corresponding to the obtained CUs. The CU information decoding unit 11 sequentially designates each of the CUs included in the tree block as a target CU, and executes the decoding process on the CU information corresponding to the target CU.

That is, the CU information decoding unit 11 demultiplexes the TT information TTI concerning the transform tree obtained for the target CU and the PT information PTI concerning the prediction tree obtained for the target CU.

As described above, the TT information TTI includes TU information TUI corresponding to the TUs included in the transform tree. As described above, the PT information PTI includes PU information PUI corresponding to the PUs included in the target prediction tree.

The CU information decoding unit 11 supplies the PT information PTI obtained for the target CU to the PU information decoding unit 12. Further, the CU information decoding unit 11 supplies the TT information TTI obtained for the target CU to the TU information decoding unit 13.

[PU Information Decoding Unit]

The PU information decoding unit 12 performs a decoding process on the PT information PTI supplied from the CU information decoding unit 11, using the decoding module 10 on the PU level. Specifically, the PU information decoding unit 12 decodes the PT information PTI using the following procedure.

The PU information decoding unit 12 refers to the PU partition type information PartMode, and determines the PU partition type for the target prediction tree. Then, the PU information decoding unit 12 sequentially designates each of the PUs included in the target prediction tree as a target PU, and executes the decoding process on the PU information corresponding to the target PU.

That is, the PU information decoding unit 12 decodes parameters used for the generation of a prediction image, from the PU information corresponding to the target PU.

The PU information decoding unit 12 supplies the PU information decoded for the target PU to the prediction image generation unit 14.

[TU Information Decoding Unit]

The TU information decoding unit 13 performs a decoding process on the TT information TTI supplied from the CU information decoding unit 11, using the decoding module 10 on the TU level. Specifically, the TU information decoding unit 13 decodes the TT information TTI using the following procedure.

The TU information decoding unit 13 refers to the TT split information SP_TU, and splits the target transform tree into nodes or TUs. If the further splitting of the target node is specified, the TO information decoding unit 13 recursively performs the splitting of the TUs.

When the splitting process is completed, the TU information decoding unit 13 sequentially designates each of the TUs included in the target prediction tree as a target TU, and executes the decoding process on the TU information corresponding to the target TU.

That is, the TU information decoding unit 13 decodes parameters used for the restoration of a transform coefficient, from the TU information corresponding to the target TU.

The TU information decoding unit 13 supplies the TU information decoded for the target TU to the dequantization/inverse transform unit 15.

[Prediction Image Generation Unit]

The prediction image generation unit 14 generates a prediction image for each of the PUs included in the target CU, on the basis of the PT information PTI. Specifically, the prediction image generation unit 14 performs intra prediction or inter prediction on each target PU included in the target prediction tree in accordance with the parameters included in the PU information PUI corresponding to the target PU to generate a prediction image Pred from a decoded image, or a locally decoded image P'. The prediction image generation unit 14 supplies the generated prediction image Pred to the adder 17.

The following is a description of a technique how the prediction image generation unit 14 generates a prediction image of a PU included in the target CU on the basis of motion compensation prediction parameters (motion vector, reference image index, inter prediction flag).

If the inter prediction flag indicates uni-prediction, the prediction image generation unit 14 generates a prediction image corresponding to a decoded image located at the position indicated by the motion vector of the reference image identified by the reference image index.

If the inter prediction flag indicates bi-prediction, on the other hand, the prediction image generation unit 14 generates a prediction image using motion compensation for each of two combinations of reference image indices and motion vectors and averages the generated prediction images, or performs weighted addition of the respective prediction images on the basis of the display time interval between the target picture and the respective reference images. Accordingly, the prediction image generation unit 14 generates a final prediction image.

[Dequantization/Inverse Transform Unit]

The dequantization/inverse transform unit 15 performs a dequantization and inverse transform process on each of the TUs included in the target CU on the basis of the TT information TTI. Specifically, the dequantization/inverse transform unit 15 dequantizes and performs inverse orthogonal transform on the quantized prediction residual included in the TU information TUI corresponding to each of the target TUs included in the target transform tree to restore a prediction residual D for each pixel. The term "orthogonal transform", as used herein, refers to the orthogonal transform from the pixel domain to the frequency domain. The term "inverse orthogonal transform" thus refers to the transform from the frequency domain to the pixel domain. Examples of the inverse orthogonal transform include inverse DCT transform (Inverse Discrete Cosine Transform) and inverse DST transform (Inverse Discrete Sine Transform). The dequantization/inverse transform unit 15 supplies the restored prediction residual D to the adder 17.

[Frame Memory]

Decoded images P are sequentially recorded on the frame memory 16 together with the parameters used in the decoding of the decoded images P. At the time of decoding of a target tree block, the frame memory 16 has recorded thereon the decoded images corresponding to all the tree blocks (for example, all the preceding tree blocks in raster scan order) that have already been decoded before the target tree block. The decoding parameters recorded on the frame memory 16 include, for example, the CU prediction mode information PredMode.

[Adder]

The adder 17 adds the prediction images Pred supplied from the prediction image generation unit 14 to the prediction residuals D supplied from the dequantization/inverse transform unit 15 to generate a decoded image P for the target CU.

At the time when the generation process for a decoded image on a tree block basis is completed for all the tree blocks in an image, a decoded image #2 corresponding to encoded data #1 of one frame, which is input to the video decoding device 1, is output to outside from the video decoding device 1.

In the following, a detailed description will be given of the respective configurations of (1) the CU information decoding unit 11, (2) the PU information decoding unit 12, and (3) the TU information decoding unit 13, together with the configuration of the decoding module 10 corresponding to the configurations.

(1) Details of CU Information Decoding Unit

An example configuration of the CU information decoding unit 11 and the decoding module 10 will now be described with reference to FIG. 1. FIG. 1 is a functional block diagram exemplifying a configuration for decoding CU prediction information in the video decoding device 1, that is, the configuration of the CU information decoding unit 11 and the decoding module 10.

The configuration of the individual components in the CU information decoding unit 11 and the decoding module 10 will be described hereinafter in this order.

(CU Information Decoding Unit)

As illustrated in FIG. 1, the CU information decoding unit 11 includes a CU prediction mode determination unit 111, a PU size determination unit 112, and a PU size table 113.

The CU prediction mode determination unit 111 supplies encoded data and syntax type of the CU prediction mode and encoded data and syntax type of the PU partition type to the decoding module 10. In addition, the CU prediction mode determination unit 111 acquires the syntax values of the CU prediction mode and the syntax values of the PU partition type, which have been decoded, from the decoding module 10.

Specifically, the CU prediction mode determination unit 111 determines the CU prediction mode and the PU partition type as follows.

First, the CU prediction mode determination unit 111 determines whether or not the target CU is a skip CU using a skip flag SKIP decoded by the decoding module 10.

If the target CU is not a skip CU, the CU prediction type information Pred_type is decoded using the decoding module 10. Further, the CU prediction mode determination unit 111 determines whether the target CU is an intra CU or an inter CU on the basis of the CU prediction mode information PredMode included in the CU prediction type information Pred_type, and also determines the PU partition type on the basis of the PU partition type information PartMode.

The PU size determination unit 112 refers to the PU size table 113, and determines the number of PUs and a PU size from the size of the target CU and the CU prediction type and PU partition type determined by the CU prediction mode determination unit 111.

The PU size table 113 is a table in which the numbers of PUs and PU sizes are associated with CU sizes and combinations of CU prediction types and PU partition types.

A specific example configuration of the PU size table 113 will now be described with reference to FIG. 5.

Figure 5:
FIG. 5 is a diagram illustrating a specific example configuration of a PU size table in which the numbers of PUs and PU sizes are defined in association with CU sizes and PU partition types.

The PU size table 113 illustrated in FIG. 5 defines the numbers of PUs and PU sizes in accordance with CU sizes and PU partition types (intra CU and inter CU). In the table, the symbol "d" denotes the CU partition depth.

In the PU size table 113, the following four CU sizes are defined: 64×64, 32×32, 16×16, and 8×8.

In the PU size table 113, furthermore, the number of PUs and a PU size for each PU partition type are defined for each CU size.

For example, for a 64×64 inter CU and a partition of 2N×N, the number of PUs is 2 and the PU sizes are both 64×32.

For a 64×64 inter CU and a partition of 2N×nU, the number of PUs is 2 and the PU sizes are 64×16 and 64×48.

For an 8×8 intra CU and a partition of N×N, the number of PUs is 4 and the PU sizes are all 4×4.

The PU partition type of a skip CU is presumably 2N×2N. In the table, the sign "-" represents an unselectable PU partition type.

Specifically, for the CU size of 8×8, PU partition types of asymmetric partition (2N×nU, 2N×nD, nL×2N, and nR×2N) are not selectable in the case of inter CU. In the case of inter CU, furthermore, the PU partition type of N×N is not selectable.

For intra prediction, the PU partition type of N×N is selectable only in the case of 8×8 CU size.

(Decoding Module)

As illustrated in FIG. 1, the decoding module 10 includes a CU prediction mode decoding unit (decoding means, changing means) 1011, a binarization information storage unit 1012, a context storage unit 1013, and a probability setting storage unit 1014.

The CU prediction mode decoding unit 1011 decodes a syntax value, in accordance with the encoded data and syntax type supplied from the CU prediction mode determination unit 111, from a binary representation included in the encoded data. Specifically, the CU prediction mode decoding unit 1011 performs decoding processes for the CU prediction mode and the PU partition type in accordance with the binarization information stored in the binarization information storage unit 1012. The CU prediction mode decoding unit 1011 also performs a decoding process for the skip flag.

The binarization information storage unit 1012 stores binarization information for allowing the CU prediction mode decoding unit 1011 to decode a syntax value from a binary representation. The binarization information is information indicating associations between binary representations (bin sequences) and syntax values.

The context storage unit 1013 stores contexts referred to by the CU prediction mode decoding unit 1011 in decoding processes.

The probability setting storage unit 1014 stores probability setting values referred to by the CU prediction mode decoding unit 1011 to decode a bin sequence from encoded data using an arithmetic decoding process. The probability setting values include recorded setting values each corresponding to a context, and specified probability setting values. The probability setting values corresponding to the individual contexts are updated based on the results of arithmetic decoding. On the other hand, the specified probability setting values are fixed and are not updated in accordance with the results of arithmetic decoding. The probability setting values may not necessarily be in the form of the values of probability, but may be represented as being indicated by integer values corresponding to the values of probability.

SPECIFIC EXAMPLE CONFIGURATION

[1-1] Example of Configuration for Restricting References to Contexts

If the PU partition type is an asymmetric partition, the CU prediction mode decoding unit 1011 may perform a decoding process on information indicating a partition type of the asymmetric partition, without using contexts for CABAC. In other words, the CU prediction mode decoding unit 1011 may decode a bin sequence corresponding to information indicating a partition type of the asymmetric partition from encoded data using arithmetic decoding, by performing the decoding process using a specified probability setting value (for example, a probability setting value in which the probability of occurrence of 0 is equal to the probability of occurrence of 1) without using a probability setting value recorded on the probability setting storage unit 1014 for each context.

A configuration for restricted references to contexts, described above, will be described hereinafter by way of example with reference to FIG. 7.

The CU prediction mode decoding unit 1011 decodes information indicating a partition type of asymmetric partition, assuming a specified probability.

A more specific example of the present example configuration will now be described with reference to FIG. 7. An association table BT1 illustrated in FIG. 7 depicts rectangular partitions, with the prefix portion indicating whether the direction of partitioning is landscape orientation (horizontal) or portrait orientation (vertical) and the suffix portion indicating partition types.

For example, when the prefix portion indicates that the PU partition type is a landscape-oriented partition, the suffix portion indicates which of the three kinds of landscape-oriented partitions, namely, 2N×N, 2N×nU, and 2N×nD, to select.

If the PU partition type is a rectangular partition, the CU prediction mode decoding unit 1011 refers to the specified probability setting values set in the probability setting storage unit 1014, instead of the probability setting values recorded for the respective contexts, which are set in the probability setting storage unit 1014, and performs arithmetic decoding of each bin in the suffix portion. The probability setting value may be set on the basis of the assumption of, for example, equal probabilities.

The term "CABAC arithmetic decoding using a context", as used herein, refers to a process for recording or updating the (state indicating the) probability of occurrence of a binary value in accordance with the position (context) of a binary representation and performing arithmetic decoding based on the probability of occurrence (state). The term "CABAC arithmetic decoding without using a context", in contrast, refers to arithmetic decoding based on a fixed probability determined by a probability setting value without updating the probability of occurrence (state) of a binary value. Since the update of the probability of occurrence (state) is not necessary in encoding processes or decoding processes if contexts are not used, processing load is reduced and throughput is increased. In addition, a memory for accumulating probabilities of occurrence (states) corresponding to contexts is not necessary. Coding with a fixed probability of 0.5 may be referred to as EP coding (equal probabilities, equal probability coding) or bypass.

The operations and effects of the configuration described above will be described with reference to FIG. 6. A context is effective for the improvement in coding efficiency when the same code appears consecutively in a specific condition. Coding efficiency is improved by decoding the suffix portion by referring to contexts when, specifically, 2N×N, 2N×nU, or 2N×nD is consecutively selected in a state where a landscape-oriented partition is selected. This effect works, for example, when 2N×N is selected in a prediction unit subsequent to the prediction unit in which 2N×N was selected.

Figures 6, 7:
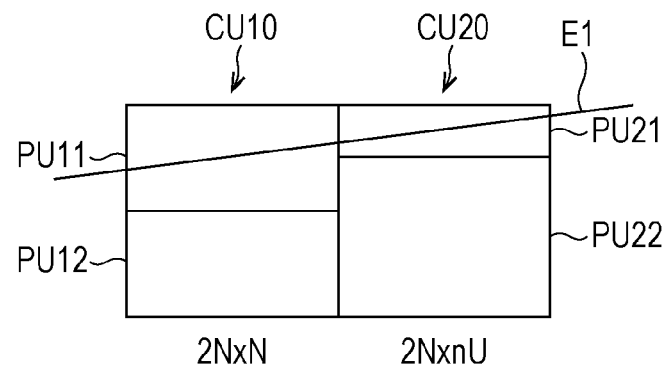
FIG. 6 is a diagram illustrating a 2N×N CU and a 2N×nU CU in which an edge having an inclination is present.
FIG. 7 is a table illustrating an example of binarization information that defines associations between combinations of CU prediction types and PU partition types and bin sequences.

On the other hand, partitions are generally set so as not to lie over edge boundaries, as illustrated in FIG. 6.

Specifically, as illustrated in FIG. 6, if an edge E1 having an inclination is present in a region, the PU partition type of a CU 10 and a CU 20 is determined so that no partitions lie across the edge E1.

More specifically, the edge E1 is present near the center in the vertical direction of a region in the CU 10, whereas the edge E1 is present in an upper portion of a region in the CU 20.

In this manner, if an edge E1 having an inclination is present in a region, the CU 10 is split into a PU 11 and a PU 12 that are symmetric to each other using the 2N×N PU partition type so that no partitions lie across the edge E1.

The CU 20 is split into a PU 21 and a PU 22 that are asymmetric to each other using the 2N×nU partition type so that no partitions lie across the edge E1.

In this manner, if an edge E1 having an inclination is present in a region, in some cases, partitions having the same shape do not appear consecutively.

In such cases, 2N×N, 2N×nU, or 2N×nD is not consecutively selected. In these cases, coding efficiency might not be reduced even without using contexts.

As in the configuration described above, the information described above is decoded with the assumption of a specified probability for the prefix portion, which may simplify the decoding process for pred_type while maintaining coding efficiency.

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions. Partition types in which a coding unit is split into the prediction units include a partition into rectangular prediction units, and codes for identifying a partition into the rectangular prediction units include a code indicating whether each of the rectangular prediction units is portrait-oriented or landscape-oriented, and a code indicating a type of rectangular prediction unit. The image decoding device includes decoding means for decoding the code indicating a type of rectangular prediction unit without using a context.

Thus, it is possible to achieve simplified processes without referring to contexts while maintaining coding efficiency.

The example described above may also be expressed as follows. Information for selecting any PU partition type among a set of PU partition types for PU partition including a plurality of rectangular partitions, the set of PU partition types including symmetric partition types and asymmetric partition types, may be decoded without using a context.

In the example described above, a context may be used for the decoding of some of the bins in a bin sequence corresponding to information used for the selection of asymmetric partition, instead of no contexts being used for the decoding of any of the bins. For example, in the example in FIG. 7 described above, if a partition including a rectangular partition is selected for a CU having a size larger than 8×8, up to two-digit bins are decoded. Of the two-digit bins, the first digit is information indicating a symmetric partition or an asymmetric partition. The second digit is a bin to be decoded if the first digit is equal to '0', or indicates an asymmetric partition, and represents a positional relationship between the smaller PU and the larger PU in an asymmetric partition. Preferably, a context is not set for the first digit since the same code may not necessarily appear consecutively due to the reason described above with reference to FIG. 6. For the second digit, however, a context is preferably set because on the basis of the assumption that an asymmetric partition is being used, the smaller PU locally tends to be tilted to one side (for example, upward or downward if the second digit indicates information on the selection of 2N×nU or 2N×nD).

[1-2] Configuration for Decoding CU Prediction Type Information (Pred_Type)

The CU prediction mode decoding unit 1011 may be configured to decode CU prediction type information by referring to the binarization information stored in the binarization information storage unit 1012, as described below.

An example configuration of the binarization information stored in the binarization information storage unit 1012 will be described with reference to FIG. 7. FIG. 7 is a table indicating an example of binarization information that defines associations between combinations of CU prediction types and PU partition types and bin sequences.

In FIG. 7, by way of example, but not limited to, binarization information is represented in tabular form in which bin sequences are associated with CU prediction types and PU partition types. The binarization information may be represented as derivation formulas from which PU partition types and CU prediction types are derived. The above similarly applies to binarization information described below.

In addition, the binarization information may not necessarily be stored as data. The binarization information may be implemented as logic of a program for performing a decoding process.

In the table BT1 illustrated by way of example in FIG. 7, bin sequences are associated with CU prediction types and PU partition types in accordance with CU sizes.

First, a description will be given of the definition of CU sizes. In the association table BT1, two associations, namely, a non-8×8 CU 1012B having a CU size larger than 8×8 (CU>8×8) and an 8×8 CU 1012A having a CU size equal to 8×8 (CU==8×8), are defined as the definition of CU sizes.

Each of the bin sequences associated in the non-8×8 CU 1012B and the 8×8 CU 1012A has a prefix portion (prefix) and a suffix portion (suffix).

In the association table BT1, two CU prediction types, namely, the intra CU described above (labeled as "Intra") and inter CU (labeled as "Inter"), are defined for the definition of the respective CU sizes. PU partition types are further defined for the respective CU prediction types.

Details are as follows. First, for the intra CU, two PU partition types, namely, 2N×2N and N×N, are defined.

A description of 2N×2N will be given hereinafter. In the non-8×8 CU 1012B, only the prefix portion is defined and the bin sequence is "000". The suffix portion is not coded. In the 8×8 CU 1012A, the prefix portion is "000" and the suffix portion is "0".

For N×N, on the other hand, a definition is provided only for the non-8×8 CU 1012B. In this case, the prefix portion is "000", and the suffix portion is "1".

In this manner, for the intra CU, the prefix portion is "000", which is common.

For the inter CU, seven PU partition types, namely, 2N×2N, 2N×N, 2N×nU, 2N×nD, N×2N, nL×2N, and nR×2N, are defined.

If the PU partition type is 2N×2N, only the prefix portion is defined and the bin sequence is "1" in either the non-8×8 CU 1012B or the 8×8 CU 1012A.

In the non-8×8 CU 1012B, the common prefix portion "01" is assigned to the PU partition types of the landscape-oriented partition, which are based on partitioning in the horizontal direction, namely, 2N×N, 2N×nU, and 2N×nD.

The suffix portions for 2N×N, 2N×nU, and 2N×nD are "1", "00", and "01", respectively.

Further, the common prefix portion "001" is assigned to the PU partition types of the portrait-oriented partition, which are based on a partition in the vertical direction, namely, N×2N, nL×2N, and nR×2N.

The suffix portions for N×2N, nL×2N, and nR×2N are "1", "00", and "01", respectively. The suffix portions are similar to those in the PU partition types described above which are based on a partition in the horizontal direction.

Specifically, in the definition of the landscape-oriented partition and the portrait-oriented partition, the suffix portion represents partition types. More specifically, the bin is "1" for a symmetric partition. "00" indicates that the partition boundary lies nearer the origin than that for a symmetric partition, and "01" indicates that the partition boundary lies farther from the origin than for a symmetric partition.

Next, in the 8×8 CU 1012A, only the prefix portions are defined for 2N×2N, 2N×N, and N×2N. The prefix portions for 2N×2N, 2N×N, and N×2N are "1", "01", and "001", respectively.

The CU prediction mode decoding unit 1011 may perform a decoding process in accordance with the binarization information described above, by using different contexts for the respective bin positions in the prefix portion and the suffix portion.

If different contexts are used for the respective bin positions in the prefix portion and the suffix portion, a total of eight contexts are used as follows.

Since a bin of up to 3 bits is defined in the prefix portion, the number of contexts is three.

For the suffix portion, first, one context is used for 2N×2N and N×N. Then, two contexts are used for landscape-oriented partitions (2N×N, 2N×nU, and 2N×nD), and two contexts are used for portrait-oriented partitions (N×2N, nL×2N, and nR×2N).

[1-3] Configuration for Decoding Short Code of Intra CU in Small Size CU

The CU prediction mode decoding unit 1011 may be configured to decode a short code of an intra CU in a small size CU. The small size CU is a CU having a size less than or equal to a predetermined value. In the following, by way of example, the small size CU is a CU having an 8×8 size.

Example Configuration 1-3-1

The binarization information stored in the binarization information storage unit 1012 may have a configuration as illustrated in FIG. 8. FIG. 8 illustrates another example configuration of the 8×8 CU 1012A, which is a definition of binarization information. An 8×8 CU 1012A_1 illustrated in FIG. 8 is another example configuration of the 8×8 CU 1012A included in the association table BT1 illustrated in FIG. 7.

As illustrated in FIG. 8, in the 8×8 CU 1012A_1, which is a definition of binarization information, a short code is assigned to an intra CU for a CU having an 8×8 size, which is a small size CU.

In the 8×8 CU 1012A_1 illustrated in FIG. 8, a shorter code than a code assigned to an intra CU for a large size CU is assigned (see the non-8×8 CU 1012B in FIG. 7). The term "large size CU" refers to a CU that is a non-small size CU, and refers to, specifically, a CU having a size larger than an 8×8 size.

In the 8×8 CU 1012A_1, furthermore, a code assigned to an intra CU is shorter than a code assigned to an inter CU. In other words, in CUs having the same size, a shorter code is assigned to an intra CU than to any other PU partition type other than an intra CU.

For example, in the 8×8 CU 1012A_1, a 1-bit code is assigned to an intra CU, and a 2-bit or 3-bit code is assigned to an inter CU.

Intra prediction of small CUs tends to be applied to a region where inter prediction is less reliable. For this reason, small CUs have a high usage rate of intra CU. In the example configuration illustrated in FIG. 7, a long code is assigned to an intra CU. In contrast, in the data configuration described above, short codes are assigned to intra CUs having a small size.

Accordingly, the CU prediction mode decoding unit 1011 decodes short codes for intra CUs having a small size in a region for which inter prediction is less reliable. This achieves the advantage of improved coding efficiency.

In the configuration described above, preferably, the CU prediction mode decoding unit 1011 sets different contexts for the prefix portion of a large size CU and the prefix portion of a small size CU.

Accordingly, the context storage unit 1013 may store an 8×8 CU prefix 1013A, which is a context for decoding the prefix portion of a large size CU, and a non-8×8 CU prefix 1013B, which is a context for decoding the prefix portion of a small size CU. The 8×8 CU prefix 1013A and the non-8×8 CU prefix 1013B are different contexts.

The meaning of the bins in the prefix portion is different between a small size CU (CU==8×8) and a large size CU (CU>8×8).

For example, for a small size CU, the first bit of the prefix portion is information indicating whether the CU prediction type is intra CU or inter CU. For a large size CU, however, the first bit of the prefix portion is information indicating whether the CU prediction type is 2N×2N inter CU or other inter CU.

Bins having different meanings have different tendencies to appear. If the same context is set for the prefix portion for a large size CU and the prefix portion for a small size CU, the tendency for the bins to appear differs. This may cause a reduction in coding efficiency.

According to the configuration described above, allows different contexts may be set for bins having different tendencies to appear. Accordingly, the coding efficiency of bins may be improved.

Example Configuration 1-3-2

The binarization information stored in the binarization information storage unit 1012 may also have a configuration as illustrated in FIG. 9. FIG. 9 illustrates another example configuration of the 8×8 CU 1012A, which is a definition of binarization information. An 8×8 CU 1012A_2 illustrated in FIG. 9 is another example configuration of the 8×8 CU 1012A included in the association table BT1 illustrated in FIG. 7.

In the 8×8 CU 1012A_2 illustrated in FIG. 9, a bin sequence has three portions, namely, a flag, a prefix portion, and a suffix portion.

For the intra CU, the flag is "1". For the inter CU, the flag is "0".

For the intra CU, only the suffix portion is defined. Specifically, the suffix portion is "0" for the PU partition type of 2N×2N, and the suffix portion is "1" for the PU partition type of N×N.

For the inter CU, on the other hand, only the prefix portion is defined. Specifically, the prefix portions for 2N×2N, 2N×N, and N×2N are "1", "01", and "00", respectively.

In the 8×8 CU 1012A_2 illustrated in FIG. 9, similarly to the 8×8 CU 1012A_1 illustrated in FIG. 8, a shorter code is assigned to a large size CU than a code assigned to an intra CU, and the code assigned to an intra CU is shorter than the code assigned to an inter CU.

The 8×8 CU 1012A_2 having the configuration illustrated in FIG. 9 allows the CU prediction mode decoding unit 1011 to decode short codes for intra CUs having a small size in a region for which inter prediction is less reliable. This achieves the advantage of improved coding efficiency.

In the configuration described above, preferably, a specific context, which is different from the contexts set for the prefix portion and the suffix portion, is set for the flag. Preferably, furthermore, the same context is set for the prefix portion of a small size CU and the prefix portion of a large size CU.

For example, the context storage unit 1013 may store a single context into which the 8×8 CU prefix 1013A and the non-8×8 CU prefix 1013B are integrated.

The configuration described above is designed such that individual bins have the same meaning between the prefix portion of a small size CU and the prefix portion of a large size CU. Accordingly, the same context is set for both CUs, enabling an improvement in the coding efficiency of bins.

[Operations and Effects]

The present invention may also be expressed in the following form. An image decoding device according to an aspect of the present invention is an image decoding device for decoding information for restoring an image from encoded image data for each coding unit to restore an image. The image decoding device includes decoding means for decoding codes assigned to combinations of sizes of prediction units and prediction schemes to be applied to the coding units, the decoding means decoding a shorter code for a combination of a coding unit with a size less than or equal to a predetermined value and a prediction scheme for intra-frame prediction, than codes assigned to combinations other than the combination.

Thus, it is possible to assign a short code to a combination having a high probability of occurrence in coding units having a size less than or equal to a predetermined value. This achieves the advantage of improved coding efficiency.

[1-4] Configuration for Modifying the Interpretation of Bin Sequences in Accordance with Neighboring Prediction Parameters The CU prediction mode decoding unit 1011 may be configured to modify the interpretation of bin sequences by referring to prediction parameters allocated to neighboring regions.

Example Configuration 1-4-1

The binarization information stored in the binarization information storage unit 1012 may have a configuration as illustrated in FIG. 10.

FIG. 10 is a diagram illustrating still another example configuration of the binarization information stored in the binarization information storage unit 1012.

A binarization information association table BT20 illustrated in FIG. 10 is configured such that the interpretation of bin sequences is made different in accordance with the values of the prediction parameters of neighboring regions by replacing the 8×8 CU 1012A illustrated in FIG. 7 with an inter CU definition (1012D) and an intra CU definition (1012C).

Specifically, the association table BT20 is configured such that a definition of a small size CU has different interpretations of bin sequences between the inter CU 1012D, which is a binarization information definition in a case that at least one of neighboring CUs is an inter CU, and the intra CU 1012C, which is a binarization information definition in a case that both neighboring CUs are intra CUs.

In the inter CU 1012D (in a case that at least one of neighboring CUs is an inter CU), the target CU is interpreted as an intra CU (2N×2N or N×N) for the bin sequence "000" in the prefix portion, and the target CU is interpreted as a 2N×2N inter CU for the bin sequence "1" in the prefix portion.

In the intra CU 1012C (in a case that both neighboring CUs are intra CUs), the target CU is an intra CU (2N×2N or N×N) for the bin sequence "1" in the prefix portion, and the target CU is a 2N×2N inter CU for the bin sequence "000" in the prefix portion.

If neighboring CUs are intra CUs, the target CU can also possibly be an intra CU in terms of spatial correlation. Accordingly, if neighboring CUs are intra CUs, short codes are assigned to the intra CUs, resulting in a reduction in the amount of coding.

In addition, a small size CU has a high frequency of occurrence of an intra CU. Accordingly, a short code is assigning to an intra CU in a small size CU, leading to further improvement in coding efficiency.

In contrast, as illustrated in FIG. 10, a CU other than a small size CU (for example, a large size CU) may not necessarily have a configuration for "assigning a short code to an intra CU in a case that both neighboring CUs are intra". Which CU size the configuration for "assigning a short code to an intra CU in a case that both neighboring CUs are intra" is employed for may be based on the frequency of occurrence of an intra CU. In general, an intra CU tends to be more frequently selected for a CU having a smaller size. Thus, preferably, a short code is assigned to an intra CU for a CU having a size less than or equal to a predetermined value (for example, 16×16) including a CU having the minimum size. In this configuration, if neighboring CUs are intra CUs, the CU prediction mode decoding unit 1011 refers to the intra CU 1012C, and assigns short codes to the intra CUs. If neighboring CUs include an inter CU, the CU prediction mode decoding unit 1011 refers to the inter CU 1012D, and assigns a short code to the inter CU. As a result, the amount of coding may be reduced to improve coding efficiency.

Example Configuration 1-4-2

The binarization information stored in the binarization information storage unit 1012 may have a configuration as illustrated in FIG. 11.

FIG. 11 is a diagram illustrating still another example configuration of the binarization information stored in the binarization information storage unit 1012.

A binarization information association table BT30 illustrated in FIG. 11 is configured such that the interpretation of bin sequences is made different in accordance with the values of the prediction parameters of neighboring regions by replacing the non-8×8 CU 1012B illustrated in FIG. 7 with a definition (1012B_1) "in which an upper CU has a size greater than or equal to the target CU" and a definition (1012B_2) "in which an upper CU has a size less than the target CU".

Specifically, the association table BT30 is configured such that a definition of a large size CU has different interpretations of bin sequences between the case that an upper neighboring CU has a size greater than or equal to the target CU and the case that an upper neighboring CU has a size less than the target size.

In the definition 1012B_1 "in which an upper CU has a size greater than or equal to the target CU" (in a case that an upper neighboring CU has a size greater than or equal to the target CU), the target CU is interpreted as being of a portrait-oriented partition for the bin sequence "001" in the prefix portion, and the target CU is interpreted as being of a landscape-oriented partition for the bin sequence "01" in the prefix portion.

In the definition 1012B_2 "in which an upper CU has a size less than the target CU" (in a case that an upper neighboring CU has a size less than the target CU), on the other hand, the target CU is interpreted as being of a portrait-oriented partition for the bin sequence "01" in the prefix portion, and the target CU is interpreted as being of a landscape-oriented partition for the bin sequence "001" in the prefix portion.

If a neighboring CU has a size smaller than the target CU, it is probable that an edge is present in the neighboring CU.

In this case, it is probable that the target CU is split into partitions in a direction perpendicular to the side corresponding to the boundary between the target CU and the neighboring CU. Accordingly, if an upper neighboring CU has a size less than the target CU, it is probable that a portrait-oriented partition will be selected.

Thus, if an upper neighboring CU has a size less than the target CU, a short code is assigned to the portrait-oriented partition that can probably be selected. Accordingly, coding efficiency may be improved.

According to the configuration described above, if an upper neighboring CU has a size less than the target CU, the CU prediction mode decoding unit 1011 refers to the definition 1012B_2 "in which an upper CU has a size less than the target CU", and assigns a short code to a portrait-oriented partition.

If an upper neighboring CU has a size greater than or equal to the target CU, on the other hand, the CU prediction mode decoding unit 1011 refers to the definition 1012B_1 "in which an upper CU has a size greater than or equal to the target CU", and assigns a short code to a landscape-oriented partition. As a result, the amount of coding may be reduced to improve coding efficiency.

In addition, preferably, the suffix portions have the same interpretation without depending on the interpretation of the prefix portion based on neighboring CUs. In the association table BT30, the interpretation of the same suffix portion is the same regardless of whether the prefix portion represents a portrait-oriented partition or a landscape-oriented partition. In an example of the association table BT30, thus, the decoding process for the suffix portions may not necessarily be changed depending on whether the prefix portion represents a portrait-oriented partition or a landscape-oriented partition.

In other words, the association table BT30 is configured such that the PU partition type (the number of splits) does not depend on the parameter to be referred to.

Since the number of splits does not depend on the value of the parameter to be referred to, an error in the reference parameter will have small effect on the subsequent variable length decoding processes. Specifically, even in a case that erroneous size of a neighboring CU causes wrong interpretation of which of a portrait-oriented partition and a landscape-oriented partition the prefix portion represents, the subsequent syntax elements including the suffix portions may be continuously decoded.

That is, the decoding process for the suffix portion is possible regardless of the size of neighboring CUs. Thus, the decoding process is less affected by neighboring parameter error, increasing error robustness.

If a left neighboring CU has a size smaller than the target CU, it is probable that a landscape-oriented partition will be selected. Accordingly, if a left neighboring CU has a size smaller than the target CU, a short code may be assigned to the landscape-oriented partition that can probably be selected. Accordingly, advantages similar to those described above may be achieved.

In addition, preferably, the switching of interpretation based on the size of neighboring CUs is not performed on a minimum size CU. If the target CU is a minimum size CU, the size of the target CU is always less than or equal to that of neighboring CUs. The omission of the process of switching interpretation may simplify decoding processes.

The term "upper neighboring CU has a size less than the target CU" can also mean that a CU boundary having a vertical positional relationship with an upper side (except for the topmost vertex) of the target CU is present at the upper side.

Accordingly, in a case that a CU boundary or PU boundary having a vertical positional relationship with an upper side (except for the topmost vertex) of the target CU is present at the upper side, a short code may be assigned to a portrait-oriented partition.

While a description has been made of neighboring CUs adjacent to the target CU, the present invention is limited thereto. The above similarly applies to a CU located as near as spatial correlation could be recognized.

The configuration described above is generalized as follows. In the configuration described above, for a set of binary sequences, and for a set of pred_type each associated with the same number of partitions, priorities are set for pred_type in terms of the possibility of occurrence of pred_type in accordance with neighboring prediction parameters, and pred_type with higher priority is associated with a shorter binary sequence.

In the foregoing description, the condition that the size of an upper neighboring CU is smaller than the size of the target CU may also be expressed as follows.

(1) The upper left pixel in the target CU is represented by (xc, yc).

(2) An upper neighboring CU including the pixel at (xc, yc−1) is derived, and the upper left pixel in the upper neighboring CU is represented by (xu, yu).

(3) If the relationship of "log 2CUSize[xu][yu]<log 2CUSize[xc][yc]" holds true, it is determined that the size of the upper neighboring CU is smaller than the size of the target CU, where log 2CUSize[x][y] is a logarithmic value with a base of 2 of the size of the CU in which the upper left pixel is the pixel at (x, y).

Preferably, the determination described above is based on the comparison between only the size of the CU located above the upper left pixel in the target CU and the size of the target CU.

While a description has been given of an upper neighboring CU, the size of a left neighboring CU may be determined. In this case, preferably, only the size of the CU located to the left of the upper left pixel in the target CU is compared with the size of the target CU.

In the determination step (3), by way of example, the values of the CU sizes are directly compared with each other. Other values associated with the CU sizes may be compared with each other. For example, the condition in the determination step (3) may be determined using the values of a CU partition depth (cuDepth[x][y]) indicating the number of times the tree block (LCU) is partitioned, in accordance with the formula "cuDepth[xu][yu]>cuDepth[xc][yc]".

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions. The image decoding device includes changing means for changing a plurality of codes associated with a plurality of combinations of partition types and prediction schemes, the partition types being types in which a target coding unit that is a coding unit to be decoded is split into the prediction units, in accordance with a decoded parameter allocated to a decoded prediction unit near a target prediction unit that is a prediction unit to be decoded.

Thus, it is possible to assign a shorter code to a combination of prediction scheme and partition type having a higher probability of occurrence in accordance with a decoded parameter allocated to a nearby decoded prediction unit. Accordingly, coding efficiency may be improved.

(2) Details of PU Information Decoding Unit

Figure 12:
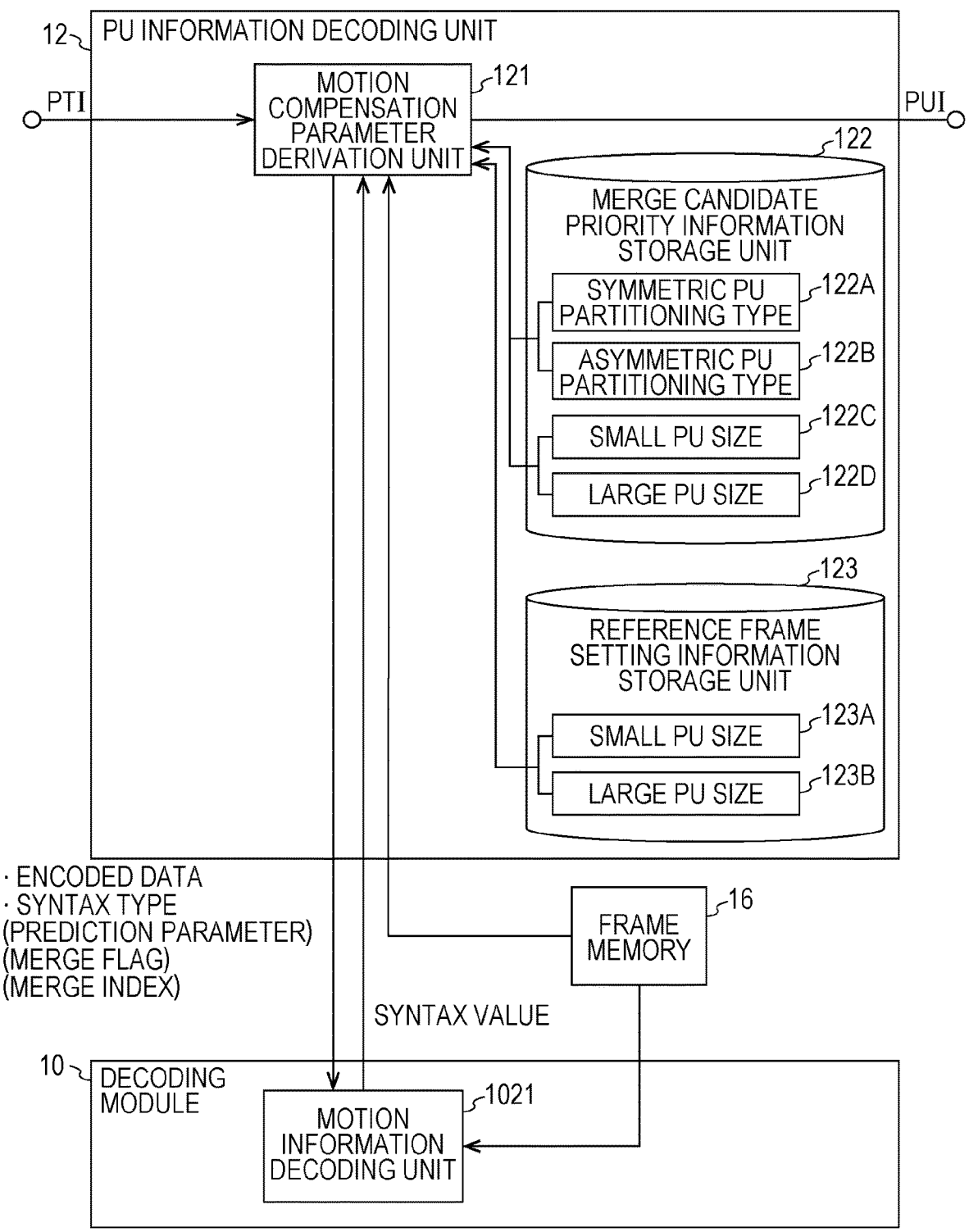
FIG. 12 is a functional block diagram illustrating an example configuration of a PU information decoding unit and a decoding module in the video decoding device.

Next, an example configuration of the PU information decoding unit 12 and the decoding module 10 will be described with reference to FIG. 12. FIG. 12 is a functional block diagram exemplifying a configuration for decoding motion information in the video decoding device 1, that is, the configuration of the PU information decoding unit 12 and the decoding module 10.

The configuration of the individual components in the PU information decoding unit 12 and the decoding module 10 will be described hereinafter in this order.

(PU Information Decoding Unit)

As illustrated in FIG. 12, the PU information decoding unit 12 includes a motion compensation parameter derivation unit (bi-prediction restriction means, candidate determining means, estimating means) 121, a merge candidate priority information storage unit 122, and a reference frame setting information storage unit 123.

The motion compensation parameter derivation unit 121 derives motion compensation parameters for each of the PUs included in the target CU from the encoded data.

Specifically, the motion compensation parameter derivation unit 121 derives motion compensation parameters using the following procedure. If the target CU is a skip CU, a skip index may be decoded instead of a merge index, and prediction parameters in the skip CU may be derived based on the value of the decoded skip index.

First, the motion compensation parameter derivation unit 121 determines a skip flag. As a result of the determination, if the target CU is a non-skip CU, the motion compensation parameter derivation unit 121 decodes a merge flag using a motion information decoding unit 1021.

If the target CU is a skip CU or a merge PU, the motion compensation parameter derivation unit 121 decodes a merge index to derive prediction parameters (motion vector, reference image index, inter prediction flag) on the basis of the value of the decoded merge index. Note that the motion compensation parameter derivation unit 121 determines merge candidates to be specified by the merge index, in accordance with merge candidate information stored in the merge candidate priority information storage unit 122.

If the target CU is not a skip CU or a merge PU, the motion compensation parameter derivation unit 121 decodes prediction parameters (inter prediction flag, reference image index, motion vector difference, motion vector predictor index).

Furthermore, the motion compensation parameter derivation unit 121 derives an estimated motion vector on the basis of the value of the motion vector predictor index, and also derives a motion vector on the basis of the motion vector difference and the estimated motion vector.

The merge candidate priority information storage unit 122 stores merge candidate information. The merge candidate information includes information indicating regions designated as merge candidates and information indicating the priorities of the merge candidates.

The reference frame setting information storage unit 123 stores reference frame setting information for determining which inter-frame prediction scheme will be used among a uni-prediction scheme in which one reference image is referred to and a bi-prediction scheme in which two reference images are referred to.

(Decoding Module)

As illustrated in FIG. 12, the decoding module 10 includes the motion information decoding unit 1021. The motion information decoding unit 1021 decodes a syntax value, in accordance with the encoded data and syntax type supplied from the motion compensation parameter derivation, unit 121, from a binary representation included in the encoded data. The motion compensation parameters decoded by the motion information decoding unit 1021 include a merge flag (merge_flag), a merge index (merge_idx), a motion vector predictor index (mvp_idx), a reference image index-(ref_idx), an inter prediction flag (inter_pred_flag), and a motion vector difference (mvd).

[Example Configuration for Deriving Prediction Parameters in Merge PU]

[2-1] Example of Positions and Priorities of Merge Candidates

The derivation of prediction parameters in a merge PU will be described with reference to FIG. 13 to FIG. 15.

In a case that the PU partition type is asymmetric, the motion compensation parameter derivation unit 121 may be configured to determine the priorities of merge candidates using a method different from that in a case that the PU partition type is symmetric.

First, a description will be given of the characteristics of asymmetric partitions. Of the asymmetric partitions, a smaller partition can possibly include an edge extending in the longitudinal direction. In addition, it is probable that accurate motion vectors will have been derived in a region including an edge.

A specific description will now be given with reference to FIG. 13. FIG. 13 illustrates a CU for which an asymmetric partition has been selected. As illustrated in FIG. 13, in a target CU 30, an edge E1 having an inclination is present in a region, and the 2N×nU PU partition type has been selected.

The target CU includes a PU 31 and a PU 32. Here, the target PU is the PU 31. The edge E1 having an inclination crosses the region of the target PU 31.

Figure 13:
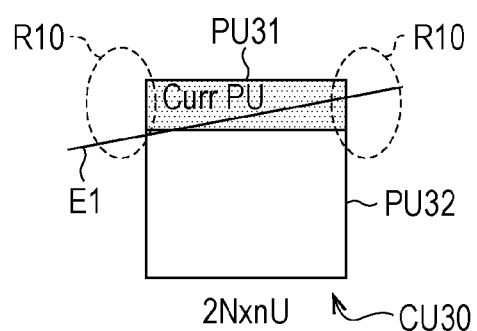
FIG. 13 is a diagram illustrating a CU for which an asymmetric partition has been selected.

In the example illustrated in FIG. 13, it is probable that the same edge as the edge present in the region of the target PU 31 will be present in regions R10 near the short sides of the target PU 31. Thus, it is probable that the same motion vector (mv) as that for the target PU 31 will have been allocated to the regions R10.

Accordingly, in a region possibly including an edge, that is, in the smaller partition, motion vectors allocated to regions near the short sides of the region are referred to, whereas, in the larger partition, motion vectors allocated to regions around the smaller partition are referred to. Thus, the accuracy of motion vectors may be increased.

The merge candidate priority information stored in the merge candidate priority information storage unit 122 is configured to include two types of merge candidate priority information, namely, merge candidate priority information on a symmetric PU partition type 122A and merge candidate priority information on an asymmetric PU partition type 122B.

The merge candidate priority information on the symmetric PU partition type 122A will now be described with reference to FIG. 14.

Figure 14:
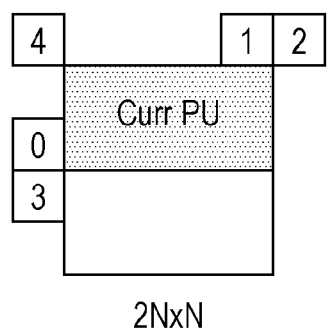
FIG. 14 is a diagram illustrating the priorities of merge candidates of a CU for which a symmetric partition has been selected.

FIG. 14 illustrates a CU for which a symmetric partition has been selected. As illustrated in FIG. 14, the 2N×N PU partition type has been selected for a symmetric CU. In FIG. 14, the target PU is represented by "Curr PU". Priorities are assigned to merge candidates for the target PU, in the order of left (L), upper (U), upper right (UR), bottom left (BL), and upper left (UL) merge candidates.

The merge candidate priority information on the asymmetric PU partition type 122B will be described hereinafter with reference to FIG. 15. Parts (a) and (b) of FIG. 15 illustrate the setting of the priorities for the smaller partition in 2N×nU and the larger partition in 2N×nU, respectively. Parts (c) and (d) of FIG. 15 illustrate the setting of the priorities for the larger partition in 2N×nD and the smaller partition in 2N×nD, respectively.

Figure 15:
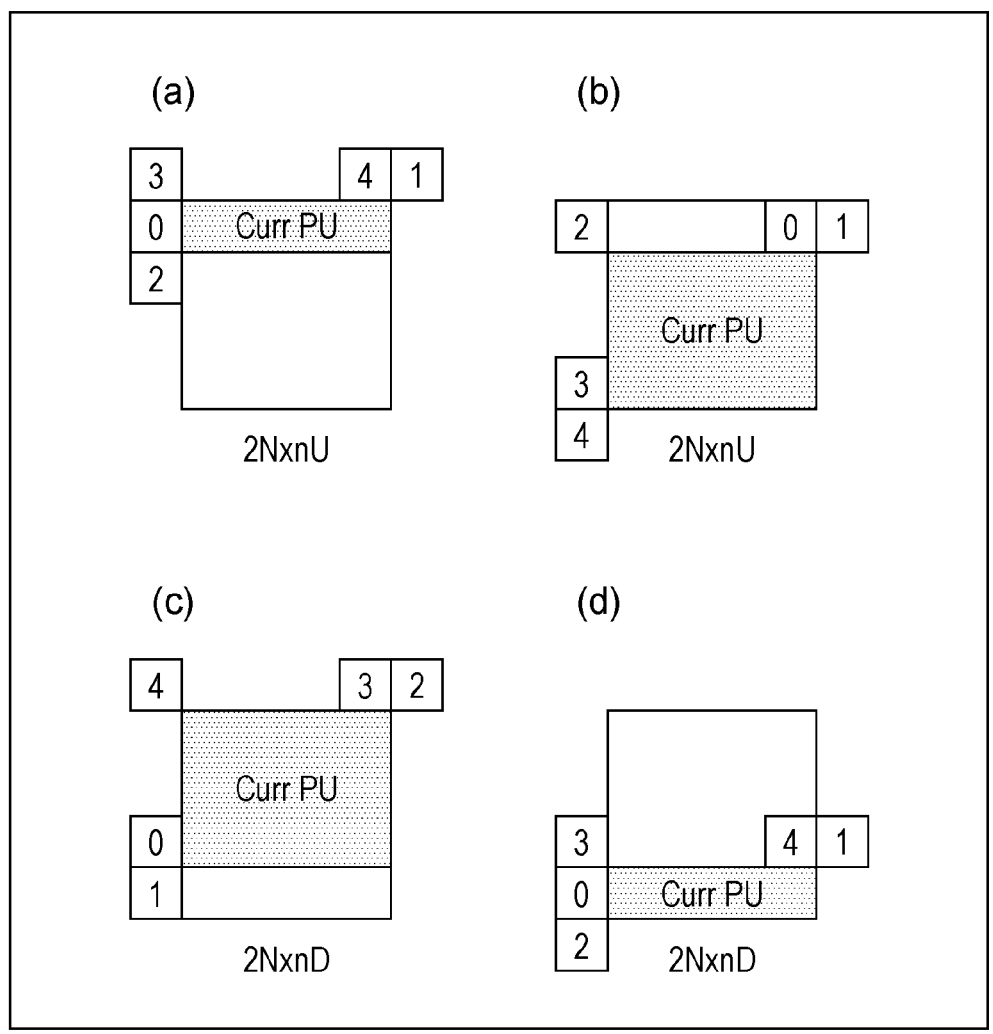
FIG. 15 includes diagrams illustrating the priorities of merge candidates of a CU for which an asymmetric partition has been selected. Parts (a) and (b) of FIG. 15 illustrate CUs with the PU partition type of 2N×nU. Part (a) of FIG. 15 illustrates the priorities of merge candidates in the smaller partition, and part (b) of FIG. 15 illustrates the priorities of merge candidates in the larger partition. Parts (c) and (d) of FIG. 15 illustrate CUs with the PU partition type of 2N×nD. Part (c) of FIG. 15 illustrates the priorities of merge candidates in the larger partition, and part (d) of FIG. 15 illustrates the priorities of merge candidates in the smaller partition.

For the smaller partition in the asymmetric partitions, as illustrated in parts (a) and (d) of FIG. 15, high priorities are assigned to merge candidates near the short sides of the smaller partition.

Specifically, priorities are assigned to merge candidates for the smaller PUs in 2N×nU and 2N×nD, as illustrated in parts (a) and (d), respectively, in the order of those adjacent to the short sides (L), adjacent to the vertices (UR, BL, UL), and adjacent to the long sides (U).

For the larger partition in the asymmetric partitions, as illustrated in parts (b) and (c) of FIG. 15, higher priorities are assigned to merge candidates located near the smaller partition.

Specifically, priorities are assigned to merge candidates for the larger PU in 2N×nU, as illustrated in part (b) of FIG. 15, in the order of a merge candidate (U) in the smaller PU, merge candidates (UR, UL) near the smaller PU, and the other merge candidates (L, BL).

Further, for the larger PUs in 2N×nD, as illustrated in part (c) of FIG. 15, priorities are assigned to merge candidates in the order of merge candidates (L, BL) near the smaller PU and the other merge candidates (U, BL, UL).

Note that a candidate having a high priority is assigned a low merge index, and a short code is assigned to a low merge index. Only candidates having high priorities may be designated as selectable merge candidates.

While a description has been made of the derivation of prediction parameters in a merge PU, a similar derivation method may be used for the derivation of estimated motion vectors to be used to restore motion vectors for non-merge PUs in an inter CU. In general, the method described above may be applicable to the derivation of, for each PU in asymmetric PUs, the estimated values or predicted values of motion parameters corresponding to neighboring regions.

[Operations and Effects]

The present invention may also be expressed in the following form. An image decoding device according to an aspect of the present invention is an image decoding device for restoring an image by generating a prediction image using an inter-frame prediction scheme for each of prediction units obtained by splitting a coding unit into one or more partitions. Partition types in which a coding unit is split into the prediction units include an asymmetric partition in which a coding unit is split into a plurality of prediction units having different sizes or a symmetric partition in which a coding unit is split into a plurality of prediction units having the same size. The image decoding device includes estimating means for estimating a prediction parameter for inter-frame prediction using, in a case that the partition type is an asymmetric partition, an estimation method different from an estimation method in a case that the partition type is a symmetric partition.

Thus, the following advantage may be achieved: different estimation methods are used for the case that the partition type is an asymmetric partition and the case that the partition type is a symmetric partition, allowing prediction parameters for inter-frame prediction to be estimated using a desired estimation method in accordance with the partition type.

[2-2] Change of Merge Candidates Using Combination of CU Size and Skip/Merge

The motion compensation parameter derivation unit 121 may be configured to change merge candidates in accordance with a combination of a CU size and a CU type, namely, whether or not the CU of interest is a CU to skip/merge. Accordingly, the merge candidate information stored in the merge candidate priority information storage unit 122 is configured to include two types of definition information, namely, definition information on a small PU size 122C and definition information on a large PU size 122D.

The merge candidate information on the small PU size 122C defines the number of merge candidates to be applied to a small size PU. The merge information on the large PU size 122D defines the number of merge candidates to be applied to a large size PU.

As an example, merge candidate information has a definition in which the number of merge candidates (the number of merge candidates of a small size PU) defined for the small PU size 122C is smaller than the number of merge candidates (the number of merge candidates of a large size PU) defined for the large PU size 122D.

A region where a small size PU is selected generally includes complex motion. Thus, the motion vectors allocated to neighboring PUs of such a region tend to have low correlations with each other.

This tendency may result in less improvement in estimation accuracy than that in the case of a large size PU even if the number of merge candidates increases.

Thus, preferably, the number of merge candidates is reduced to reduce the amount of coding of side information.

In the example described above, in the merge candidate information, the number of merge candidates of a small size PU generally including complex motion is smaller than the number of merge candidates of a large size PU. Thus, the amount of coding of side information may be reduced.

Examples of combinations of small size PUs and large size PUs are as follows.

A small size PU is a PU having sides at least one of which is smaller than a predetermined threshold value (for example, 8), and a large size PU is a PU other than that PU. For example, PUs with 16×4, 4×16, 8×4, 4×8, and 4×4 sizes are small size PUs, and PUs with 8×8 and 16×16 sizes are large size PUs.

A small size PU is a PU having an area smaller than a predetermined threshold value (for example, 64), and a large size PU is a PU other than that PU. For example, PUs with 8×4, 4×8, and 4×4 sizes are small size PUs, and PUs with 8×8, 16×4, 4×16, 16×16, and similar sizes are large size PUs.

A small size PU is a PU included in a CU having a size less than or equal to a predetermined value (for example, 8×8), and a large size PU is a PU included in a larger CU. For example, PUs with 8×8, 8×4, 4×8, and 4×4 sizes included in an 8×8 CU are small size PUs.

A small size PU is a smaller PU in a CU to which an asymmetric partition is adapted, and a large size PU is a larger PUs in a CU to which an asymmetric partition is adapted.

As another example, in the merge candidate information, the number of merge candidates based on temporal prediction for a small PU is preferably smaller than the number of merge candidates based on temporal prediction for a large PU; The merge candidate information may be defined as not including merge candidates based on temporal prediction for a small PU.

In a region with complex motion where a small size PU is selected, the correlation between a collocated PU used for temporal prediction and a target PU is low. Thus, it is less probable that temporal prediction will be selected for such a region. Accordingly, it is preferable that the number of merge candidates based on temporal prediction be reduced or merge candidates based on temporal prediction not be included.

[Operations and Effects]

The present invention may also be expressed in the following form. An image decoding device according to an aspect of the present invention is an image decoding device for restoring an image by generating a prediction image using an inter-frame prediction scheme for each of prediction units obtained by splitting a coding unit into one or more partitions. The image decoding device includes candidate determining means for determining a candidate in a region to be used for estimation in accordance with a size of a target prediction unit, which is a prediction unit to be decoded, in a case that the target prediction unit is a prediction unit in which a prediction parameter of the target prediction unit is estimated from a prediction parameter allocated to a neighboring region of the target prediction unit.

Thus, it is possible to reduce side information by reducing the number of candidates, and, as a result, to improve coding efficiency.

[2-3] Determination of Number of Reference Frames

The motion compensation parameter derivation unit 121 may determine which prediction scheme out of uni-prediction and bi-prediction to apply in inter prediction, by referring to the reference frame setting information stored in the reference frame setting information storage unit 123.

The motion compensation parameter derivation unit 121 may be configured to restrict bi-prediction for a small size PU. Accordingly, the reference frame setting information is configured to include two types of definition information, namely, definition information on a small PU size 123A and definition information on a large PU size 123B.

A prediction scheme selectable for a large size PU is defined in the large PU size 123B. The large PU size 123B has a definition in which either prediction scheme out of bi-prediction and uni-prediction can be selected for a large size PU without any restriction.

A prediction scheme selectable for a small size PU is defined in the small PU size 123A. The small PU size 123A has a definition in which bi-prediction is restricted for a small size PU.

An example of the definition of the small PU size 123A is as follows. Uni-prediction is applied, without the inter prediction flag being decoded, to a PU not to merge in an inter CU, the PU having a size less than 16×16.

Another example of the definition of the small PU size 123A is as follows. Uni-prediction is applied to a PU to merge in an inter CU, the PU having a size less than 16×16.

Still another example of the definition of the small PU size 123A is as follows. Uni-prediction is applied to each of PUs included in a skip CU.

Still another example of the definition of the small PU size 123A is as follows. Weighted prediction is not applied to a PU not to merge in an inter CU, the PU having a size less than 16×16. That is, information concerning weighted prediction is omitted.

The details of the configuration of encoded data and the configuration of the video decoding device in a case that bi-prediction is restricted on the basis of reference frame setting information will be described hereinafter with reference to a syntax table and a block diagram.

(Types of Bi-Prediction Restriction)

PU types include a PU in which the target CU is skip (skip PU), a PU for which a merge is adapted to the target PU (merge PU), and a PU for which the target PU is not skip or merge (basic inter PU or non-motion information omitted PU). For a basic inter PU, an inter prediction flag indicating bi-prediction or uni-prediction is decoded from encoded data to derive motion compensation parameters. For a skip PU and a merge PU, on the other hand, motion compensation parameters are derived without decoding the inter prediction flag. For these PUs, a candidate used for motion compensation is selected from among skip candidates or merge candidates on the basis of the skip index or the merge index to derive motion compensation parameters for the target PU on the basis of the motion compensation parameters for the selected candidate. In general, motion compensation parameters for the skip PU may be derived using a method similar to that for the merge PU. If the use of merge is restricted using a flag in the sequence parameter set or the like, the same method as that for the basic inter PU, except that the motion vector difference (mvd) is not decoded, may be used. In this case, the bi-prediction restriction operation for the skip PU is the same as that for the basic inter PU.

Part (a) of FIG. 35 illustrates examples of bi-prediction restriction for each PU. The examples of bi-prediction restriction include bi-prediction restriction only on the basic inter PU and bi-prediction restriction on all the PUs to which motion compensation prediction is applied. In the case of bi-prediction restriction only on the basic inter PU, the restriction of bi-prediction is not imposed on the skip PU or the merge PU but the restriction of bi-prediction is imposed only on the basic inter PU. The amount of processing imposed on a video encoding device and a video decoding device and the size of their circuitry may be reduced for both bi-prediction restriction only on the basic inter PU and bi-prediction restriction on all the PUs.

Part (b) of FIG. 35 illustrates bi-prediction restriction methods for the respective PUs. The prediction of bi-prediction is imposed on the skip PU and the merge PU by the derivation of information indicating that bi-prediction is not applied to the derivation of motion compensation parameters based on skip candidates or merge candidates. Specifically, as described below with reference to a motion compensation parameter derivation unit, the restriction of bi-prediction is imposed by the conversion of the value of the inter prediction flag included in the motion compensation parameters from bi-prediction to uni-prediction. In order to impose the restriction of bi-prediction on the basic inter PU, whether or not to apply the restriction of bi-prediction is determined in accordance with the PU size information. If the restriction of bi-prediction is not applied, the inter prediction flag is decoded. If the restriction of bi-prediction is applied, the decoding of the inter prediction flag is omitted. Furthermore, the process for estimating the value of the inter prediction flag as uni-predictive is performed.

The PU size information is information for determining whether the PU of interest is a small PU, and may include the size of the target CU and the PU partition type, the size of the target CU and the number of PU partitions, the PU width or height, the area of the PU, or the like.

The skip PU and the merge PU are different from the basic inter PU in the method for decoding the motion compensation parameters as well as the situations in which the PUs are used. For the skip PU and the merge PU, the amount of coding is reduced by the restriction of selectable motion compensation parameters. Such PUs are mainly used in a region with uniform motion. Uniform motion is likely to have a large noise removal effect created by bi-prediction because two prediction images are close to each other. For this reason, the skip PU and the merge PU would be more likely to experience a reduction in coding efficiency due to the restriction of bi-prediction than the basic inter PU, compared to the restriction of bi-prediction for the basic inter PU. Accordingly, as described above, the restriction that bi-prediction is used only for a basic inter PU may be preferable. In addition, as described below, the PU size to be limited may be changed between the basic inter PU and the skip and merge PUs. In view of the structure of encoded data, the restriction of bi-prediction for the basic inter PU is more effective in terms of reducing the amount of coding because the inter prediction flag is not encoded.

(Details of Inter Prediction Flag)

The details of the inter prediction flag will now be described. The inter prediction flag inter_pred_flag may be a binary flag indicating uni-prediction or bi-prediction, or may be a flag further including information for selecting a list of reference images (reference list) to be referred to in uni-prediction from among a plurality of reference lists. For example, the inter prediction flag may be defined as a ternary flag including a flag for selecting one of two reference lists (L0 list and L1 list). The individual cases will be described hereinafter.

The decoding module 10 decodes a combined list flag ref_pic_list_combination_flag for selecting whether to use the L0 or L1 list or the combined list (LC list) as a reference frame list from the slice header or the like. The method for determining the reference frame for uni-prediction differs depending on the value of the combined list flag. If the combined list flag is equal to 1, the combined list LC is used as a reference list to be used to specify a uni-predictive reference frame, and a flag for specifying a reference list for each PU is not needed. The inter prediction flag inter_pred_flag may thus be a binary flag. If the combined list flag is equal to 0, it is necessary to select a reference list from the L0 list or the L1 list for each PU. Thus, the inter prediction flag inter_pred_flag is a ternary flag.

Part (a) of FIG. 32 illustrates the meaning of an inter prediction flag in a case that the inter prediction flag is a binary flag. Part (b) of FIG. 32 illustrates the meaning of an inter prediction flag in a case that the inter prediction flag is a ternary flag.

(Example of Syntax Table for Bi-Prediction Restriction)

FIG. 31 illustrates an example of a PU syntax table in the related art, and illustrates the configuration of encoded data in a case that no restriction of bi-prediction is performed. FIG. 33 illustrates an example of a PU syntax table, in which parts (a) and (b) illustrate the configuration of encoded data in a case that restriction of bi-prediction is performed, and specifically illustrate the portion of the inter prediction flag inter_pred_flag. Part (a) of FIG. 33 illustrates an example of the syntax table in a case that the inter prediction flag is always a binary flag. In this case, two portions, namely, Pred_LC, which means uni-prediction, and Pred_Bi, which means bi-prediction, are identified from each other by inter_pred_flag. If the slice is a B slice and bi-prediction is active (DisableBiPred=false), the encoded data includes the inter prediction flag inter_pred_flag in order to identify uni-prediction and bi-prediction from each other. If bi-prediction is not active (DisableBiPred=true), the encoded data does not include the inter prediction flag inter_pred_flag because uni-prediction is always enabled.

Part (b) of FIG. 33 illustrates an example of a syntax table in a case that the inter prediction flag is a ternary flag. If a combined list is used, two types, namely, Pred_LC, which means uni-prediction in which one reference frame in an LC list is used, and Pred_Bi, which means bi-prediction, are identified from each other by inter_pred_flag. Otherwise, three types, namely, Pred_L0, which means uni-prediction with the L0 list, Pred_L1, which means uni-prediction with the L1 list, and Pred_Bi, which means bi-prediction, are identified from one another. If the slice is a B slice and bi-prediction is active (DisableBiPred=false), the encoded data includes a first inter prediction flag inter_pred_flag0 for specifying uni-prediction and bi-prediction. If bi-prediction is not active, only in a case that a combined list is not used, the encoded data includes a second inter prediction flag inter_pred_flag1 for specifying uni-prediction and bi-prediction to specify a reference list. The case that a combined list is not used is determined specifically using !UsePredRefLC && !NoBackPredFlag, as illustrated in part (a) of FIG. 33. That is, the determination is based on a flag UsePredRefLC (indicating that a combined list is used if the value of UsePredRefLC is true) specifying whether or not to use a combined list, and a flag NoBackPredFlag (indicating that backward prediction is not used if the value of NoBackPredFlag is true) specifying whether or not to use backward prediction. If a combined list is used, the use of a combined list is determined without list selection. No use of backward prediction means the disabling of Pred_L1. In this case, it may be determined that the list used also when the second inter prediction flag inter_pred_flag1 is not encoded is the combined list (Pred_LC) or the L0 list (Pred_L1). The expression "NoL1PredFlag", which means no use of the L1 list, may be used instead of NoBackPredFlag.

A threshold value used to determine whether or not to impose the restriction of bi-prediction or to determine the PU size in a case that the restriction of bi-prediction is imposed may be included in the encoded data. FIG. 34 illustrates an example of a syntax table for bi-prediction restriction. Part (a) of FIG. 34 illustrates the case that the sequence parameter set includes the flag disable_bipred_in_small_PU restricting whether or not to impose the restriction of bi-prediction. As illustrated in Part (a) of FIG. 34, a flag for the restriction of bi-prediction may be encoded independently from a flag disable_inter_4x4 prohibiting a small size PU (here, a 4×4 size PU). The purpose of the flag prohibiting a small size PU is also to reduce the amount of worst-case processing to generate a PU prediction image, similarly to the restriction of bi-prediction. Accordingly, the flag prohibiting a small size PU and the flag prohibiting small size bi-prediction may be used as a common flag. Part (b) of FIG. 34 illustrates an example in which a prediction restriction flag use_restricted_prediction is used as a common flag. In this case, if the prediction restriction flag is true, both the application of small size PU and bi-prediction for small size PU are simultaneously prohibited. Part (c) of FIG. 34 illustrates an example in which the encoded data includes disable_bipred_size indicating the size of a PU for which bi-prediction is prohibited. disable_bipred_size may be the value of a logarithm with a base of 2 of a threshold value TH described below in the determination method for bi-prediction restriction, or the like. The flags described above may be encoded using a parameter set other than the sequence parameter set, or may be encoded using the slice header.

(Motion Compensation Parameter Derivation Unit in Bi-Prediction Restriction)

Figure 29:
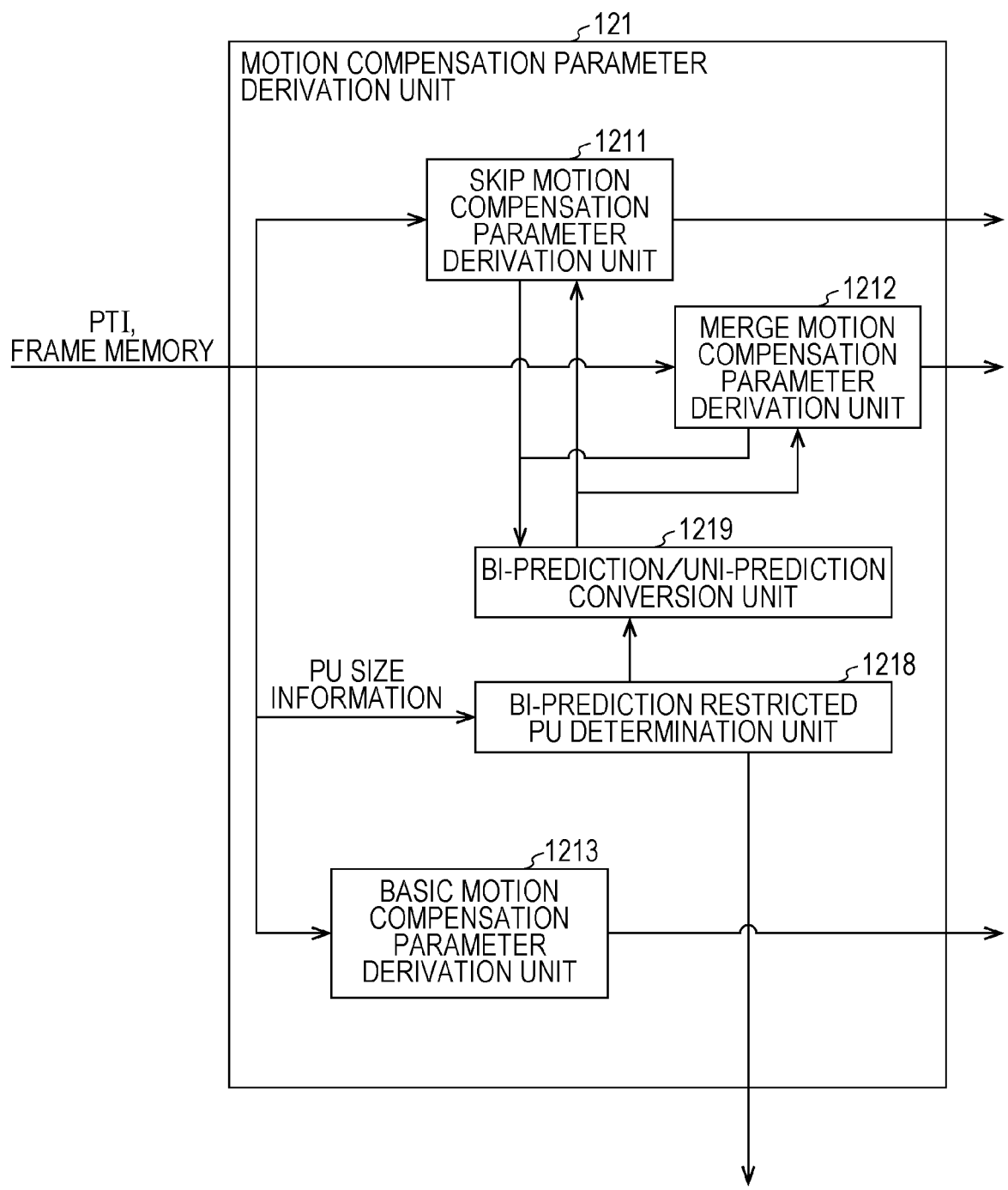
FIG. 29 is a functional block diagram illustrating a detailed example configuration of a motion compensation parameter derivation unit in the PU information decoding unit in the video decoding device.

FIG. 29 illustrates a configuration of the motion compensation parameter derivation unit 121. The motion compensation parameter derivation unit 121 includes a skip motion compensation parameter derivation unit 1211, a merge motion compensation parameter derivation unit 1212, a basic motion compensation parameter derivation unit 1213, a bi-prediction restricted PU determination unit 1218, and a bi-prediction/uni-prediction conversion unit 1219.

The motion compensation parameter derivation unit 121 imposes the restriction of bi-prediction on, particularly, the skip PU and the merge PU, which are PUs in a case that the inter prediction flag is not decoded.

The skip motion compensation parameter derivation unit 1211 derives motion compensation parameters for a skip PU if the target CU is skip, and inputs the derived motion compensation parameters to the bi-prediction/uni-prediction conversion unit 1219. The bi-prediction/uni-prediction conversion unit 1219 converts the motion compensation parameters in accordance with a bi-prediction restriction condition, and returns the resulting motion compensation parameters to the skip motion compensation parameter derivation unit 1211. The skip motion compensation parameter derivation unit 1211 outputs the motion compensation parameters converted in accordance with the bi-prediction restriction condition to outside as the motion compensation parameters of the target PU. If the motion compensation parameters are determined by a skip index, the following configuration may be used: the bi-prediction/uni-prediction conversion unit 1219 may convert each skip candidate, and the converted skip candidates may be selected using the skip index.

The merge motion compensation parameter derivation unit 1212 derives motion compensation parameters of a target PU if the target PU is merge, and inputs the derived motion compensation parameters to the bi-prediction/uni-prediction conversion unit 1219. The bi-prediction/uni-prediction conversion unit 1219 converts the motion compensation parameters in accordance with a bi-prediction restriction condition, and returns the resulting motion compensation parameters to the merge motion compensation parameter derivation unit 1212. The merge motion compensation parameter derivation unit 1212 outputs the motion compensation parameters converted in accordance with the bi-prediction restriction condition to outside as the motion compensation parameters of the target PU. If the motion compensation parameters are determined by the merge index, the following configuration may be used: the bi-prediction/uni-prediction conversion unit 1219 may convert each merge candidate, and the converted merge candidates may be selected using the merge index.

The basic motion compensation parameter derivation unit 1213 derives motion compensation parameters of a target PU if the target PU is not skip or merge, and outputs the derived motion compensation parameters to outside.

The bi-prediction restricted PU determination unit 1218 refers to the PU size information on the target PU, and determines whether or not to impose the restriction of bi-prediction, in which bi-prediction is not used, on the target PU. Whether or not to impose the restriction of bi-prediction on the skip CU and the merge PU may be determined independently from the determination of whether or not to impose the restriction of bi-prediction on the basic inter PU. For example, the restriction of bi-prediction may be imposed using the same PU size as a threshold value for all the PUs, or the restriction of bi-prediction may be imposed using a larger PU size as a threshold value for the skip PU and the merge PU. Alternatively, the restriction of bi-prediction may be imposed only on the basic inter PU whereas the restriction of bi-prediction may not be imposed on the skip PU or the merge PU.

In cases where the inter prediction flag is decoded using a skip PU, such as in a case that the use of merge is restricted, whether or not to impose the restriction of bi-prediction may be determined individually for each of a skip PU, a merge PU, and a basic inter PU.

In the configuration described above, the setting of bi-prediction and uni-prediction, which is set by the skip motion compensation parameter derivation unit 1211, is determined in the bi-prediction/uni-prediction conversion unit 1219 in accordance with the bi-prediction restricted PU determination unit 1218. However, the present invention is not limited to this configuration. For example, the following configuration may be used: a determination result of the bi-prediction restricted PU determination unit 1218 may be input directly to the skip motion compensation parameter derivation unit 1211 to perform the setting of bi-prediction/uni-prediction.

(Determination Method for Bi-Prediction Restriction)

A preferred example of a method in which the bi-prediction restricted PU determination unit 1218 determines whether or not the PU of interest is a small size PU to be subject to bi-prediction restriction will now be described. The determination method is not limited to the following example, and other parameters may be used as PU size information.

(Example Determination Method 1)

In example determination method 1, a PU with a size less than TH×TH is subject to bi-prediction restriction, where TH is a threshold value used to determine a PU size. In this case, a determination formula that uses the target CU size (here, the CU Width) and the PU partition type is as follows.

DisableBiPred=(($CU$ Width==$TH$ &&$PU$ partition type !=$2N{\times}2N$)||$CU$ Width<$TH$) ? true:false Specifically, the following operation is performed:
In the case of TH=16, respective PUs with the sizes of 16×8, 8×16, 12×16, 4×16, 16×12, 16×4, 8×8, 8×4, 4×8, and 4×4 are subject to bi-prediction restriction.
In the case of TH=8, respective PUs with the sizes 8×4, 4×8, and 4×4 are subject to bi-prediction restriction.

It is possible to perform determination using parameters other than the target CU size and the PU partition type. For example, the following determination may be performed using the number of PU partitions NumPart.

DisableBiPred=(($CU$ Width==$TH$ && NumPart>1) && $CU$ Width<$TH$) ? true:false (Example Determination Method 2)

In example determination method 2, a PU with a size less than or equal to TH×TH is subject to bi-prediction restriction. In this case, a determination formula is as follows.

DisableBiPred=(($CU$ Width==$2{*}TH$ && $PU$ partition type==$N{\times}N$)||$CU$ Width<$2{*}TH$) ? true:false Specifically, the following operation is performed:
In the case of TH=16, respective PUs with the sizes of 16×16, 16×8, 8×16, 12×16, 4×16, 16×12, 16×4, 8×8, 8×4, 4×8, and 4×4 are subject to bi-prediction restriction. In the case of TH=8, respective PUs with the sizes of 8×8, 8×4, 4×8, and 4×4 are subject to bi-prediction restriction. In the case of TH=4, PUs with the size of 4×4 are subject to bi-prediction restriction.

The following determination using the number of PU partitions NumPart is also possible.

DisableBiPred=(($CU$ Width==$2{*}TH$ && NumPart !=4)||$CU$ Width<$2{*}TH$) ? true:false In the example described above, different PU sizes (threshold value TH) may be used for the skip PU, the merge PU, and the basic inter PU. In addition, as already illustrated in part (c) of FIG. 34, the PU size (threshold value TH) used for determination may be encoded.

The bi-prediction/uni-prediction conversion unit 1219 converts the motion compensation parameters input to the bi-prediction/uni-prediction conversion unit 1219 into those for uni-prediction if the input motion compensation parameters represent bi-prediction and if the bi-prediction restricted PU determination unit determines that the skip PU and the merge PU are subject to bi-prediction restriction.

The motion compensation parameters are converted into 1, which indicates uni-prediction, if the inter prediction flag inter_pred_flag of the motion compensation parameters, which is derived by copying the motion compensation parameters for a temporally and spatially neighboring PU or derived from a combination of motion compensation parameters for a temporally and spatially neighboring PU, is equal to 2, which indicates bi-prediction. If an inter prediction flag (internal inter prediction flag) used for internal processing is a flag including 1, which indicates L0 prediction, 2, which indicates L1 prediction, and 3, which indicates bi-prediction, the following operation is performed. If the internal inter prediction flag is equal to 3, the internal inter prediction flag is converted into the value 1, which indicates L0 prediction, or the value 2, which indicates L1 prediction. For conversion into L0 prediction, for example, the motion compensation parameters concerning L1 prediction refreshed to zero. For conversion into L1 prediction, for example, the motion compensation parameters concerning L0 prediction refreshed to zero.

The bi-prediction/uni-prediction conversion unit 1219 may be implemented as a means included in each of the skip motion compensation parameter derivation unit 1211 and the merge motion compensation parameter derivation unit 1212. The bi-prediction/uni-prediction conversion unit 1219 may not necessarily be provided when the restriction of bi-prediction is imposed only on the basic inter PU.

(Motion Information Decoding Unit for Bi-Prediction Restriction)

Figure 30:
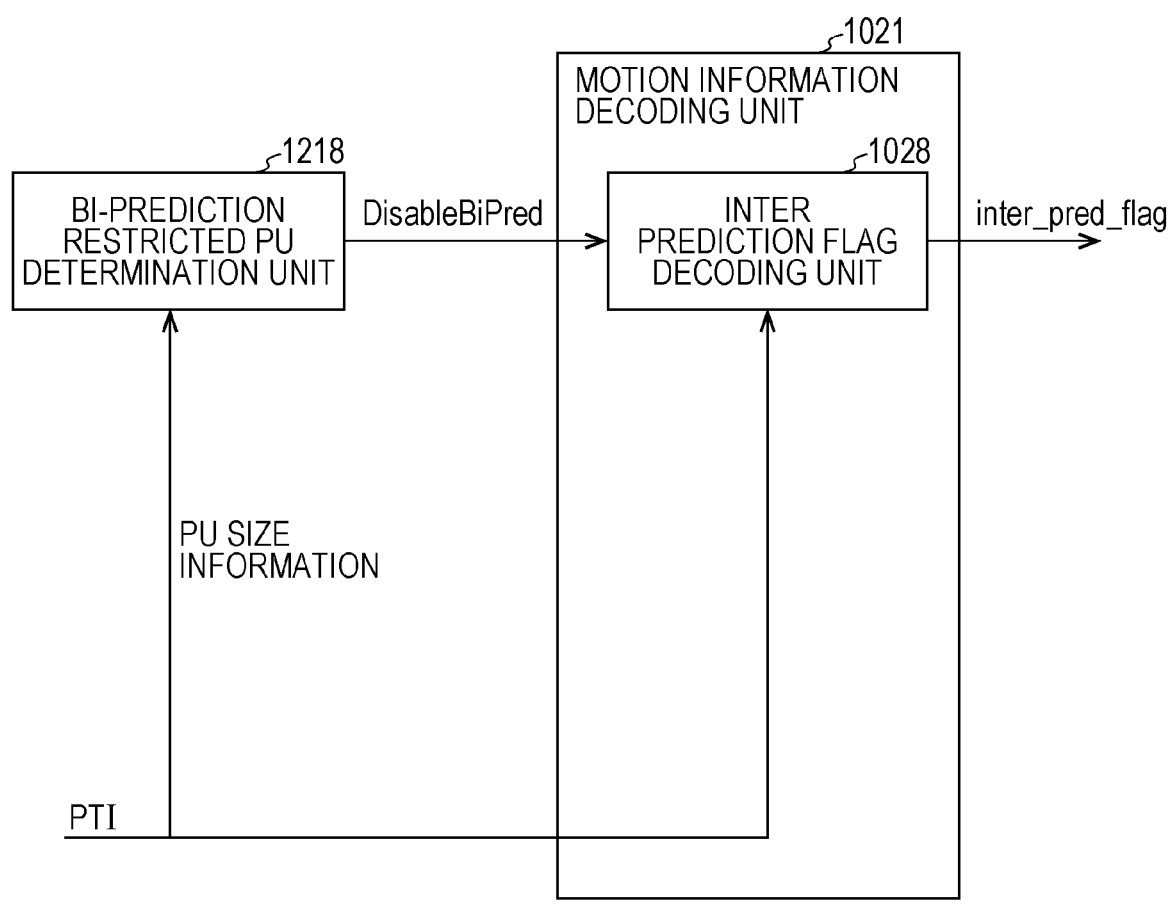
FIG. 30 is a functional block diagram illustrating a detailed example configuration of a motion information decoding unit in the decoding module in the video decoding device.

FIG. 30 is a block diagram illustrating a configuration of the motion information decoding unit 1021. The motion information decoding unit 1021 at least includes the inter prediction flag decoding unit 1028. The motion information decoding unit 1021 imposes the restriction of bi-prediction on the basic inter PU, which is a PU used to particularly decode an inter prediction flag. The inter prediction flag decoding unit 1028 changes whether or not to decode the inter prediction flag, in accordance with whether or not the bi-prediction restricted PU determination unit 1218 described above imposes the restriction of bi-prediction on the basic inter PU.

In cases where the inter prediction flag is decoded using a skip PU, such as in a case that the use of merge is restricted, the skip PU is subject to bi-prediction restriction.

The operations and effects achieved by the motion compensation parameter derivation unit 121 imposing the restriction of bi-prediction by referring to the small PU size 123A are as follows. Bi-prediction involves a larger amount of processing than uni-prediction, and a small size PU requires a larger amount of processing per unit area than a large size PU. Thus, bi-prediction for a small size PU can be a bottleneck in processing. To address this bottleneck, for a small size PU, suppressing bi-prediction may prevent an excessive increase in the amount of processing. In particular, the amount of worst-case processing such as the processing of a PU with the smallest size may be reduced.

An additional description will now be given of the inter prediction flag. In NPL 1, the inter prediction flag (inter_pred_flag) is basically a flag to select bi-prediction or uni-prediction. However, if a combined list is not used and a backward prediction disabling flag is not disabled, a flag to select L0 or L1 as a reference frame list to be used for uni-prediction may be transmitted using inter_pred_flag.

[Operations and Effects]

The present invention may also be expressed in the following form. An image decoding device according to an aspect of the present invention is an image decoding device for restoring an image in a prediction unit using a prediction scheme for any inter-frame prediction out of uni-prediction in which one reference image is referred to and bi-prediction in which two reference images are referred to. The image decoding device includes bi-prediction restriction means for imposing restriction of bi-prediction on a target prediction unit to which the inter-frame prediction is to be applied, the target prediction unit being a prediction unit having a size less than or equal to a predetermined value.

With the restriction described above, the advantage of reducing the amount of processing that can be a bottleneck in decoding processing may be achieved.

(3) Details of TU Information Decoding Unit

Figure 16:
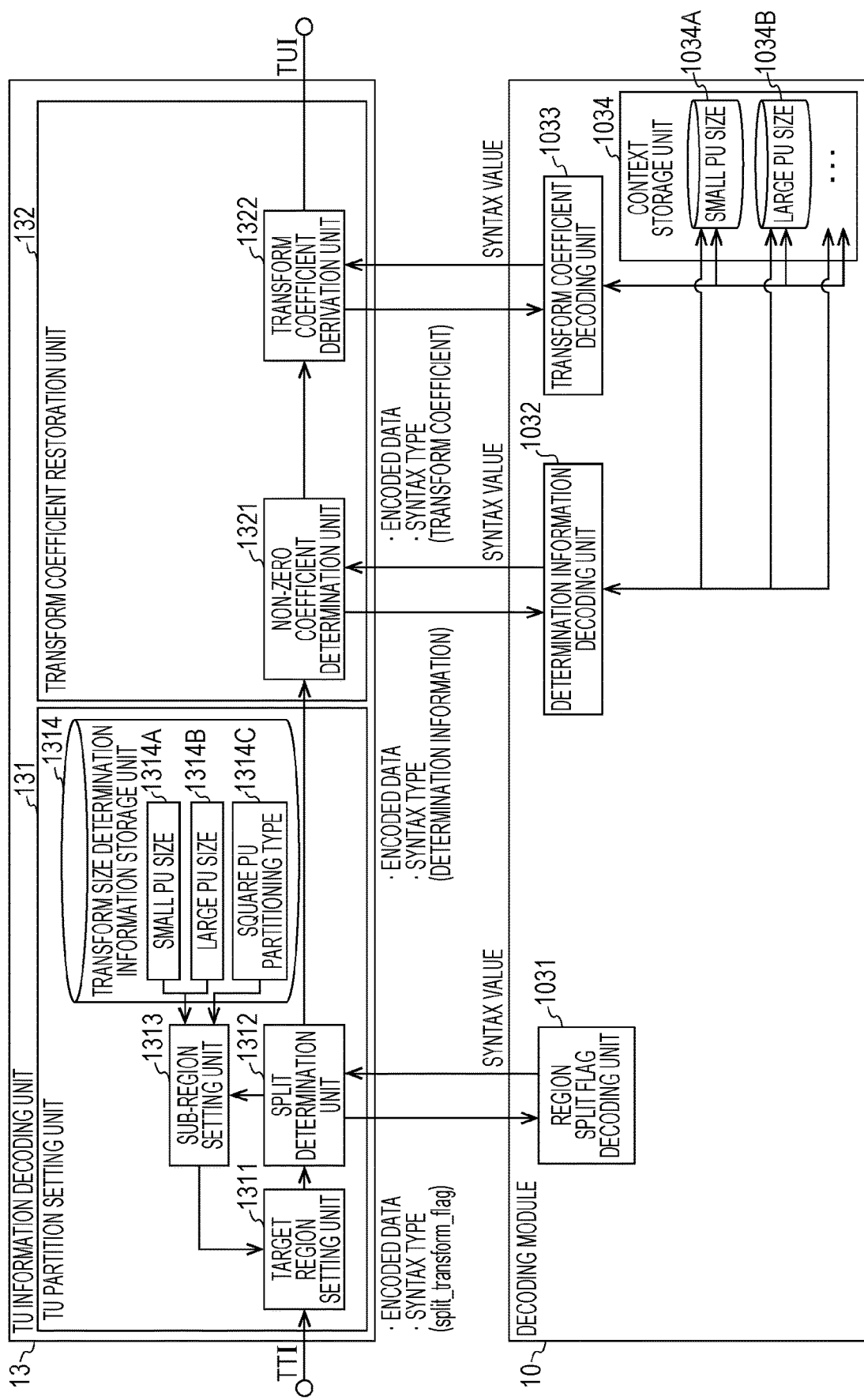
FIG. 16 is a functional block diagram illustrating an example configuration of a TU information decoding unit and a decoding module in the video decoding device.

Next, an example configuration of the TU information decoding unit 13 and the decoding module 10 will be described with reference to FIG. 16. FIG. 16 is a functional block diagram exemplifying a configuration in which the video decoding device 1 performs a TU partition decoding process, a transform coefficient decoding process, and a prediction residual derivation process, that is, the configuration of the TU information decoding unit 13 and the decoding module 10.

The configuration of the individual components in the TU information decoding unit 13 and the decoding module 10 will be described hereinafter in this order.

[TU Information Decoding Unit]

As illustrated in FIG. 16, the TU information decoding unit 13 includes a TU partition setting unit 131 and a transform coefficient restoration unit 132.

The TU partition setting unit 131 is configured to set a TU partitioning scheme on the basis of the parameters decoded from the encoded data, the CU size, and the PU partition type. The transform coefficient restoration unit 132 is configured to restore the prediction residuals of the individual TUs in accordance with the TU partition set by the TU partition setting unit 131.

[TU Partition Setting Unit]

First, the details of the TU partition setting unit 131 will be described with reference to FIG. 16. More specifically, the TU partition setting unit 131 includes a target region setting unit 1311, a split determination unit 1312, a sub-region setting unit (transform unit splitting means, splitting means) 1313, and a transform size determination information storage unit 1314.

The target region setting unit 1311 sets a target node, which is a target region. When the TU partitioning process for the target transform tree is started, the target region setting unit 1311 sets the entire target CU as an initial value of the target region. The partition depth is set to "0".

The split determination unit 1312 decodes information (split_transform_flag) indicating whether or not to split the target node set by the target region setting unit 1311, using a region split flag decoding unit 1031, and determines whether or not the splitting of the target node is required on the basis of the decoded information.

The sub-region setting unit 1313 sets sub-regions for the target node that is determined by the split determination unit 1312 to be required to be split. Specifically, the sub-region setting unit 1313 adds 1 to the partition depth for the target node determined to be required to be split, and splits the target node on the basis of the transform size determination information stored in the transform size determination information storage unit 1314.

Each target node obtained by splitting is further set as a target region by the target region setting unit 1311.

In TU partitioning, the series of processes of the "setting of a target region", the "determination of splitting", and the "setting of sub-regions" is recursively repeated for a target node, which has been split, by the target region setting unit 1311, the split determination unit 1312, and the sub-region setting unit 1313.

The transform size determination information storage unit 1314 stores transform size determination information indicating the partitioning scheme for a target node. The transform size determination information is, specifically, information that defines the correspondences between CU sizes, TU partition depths (trafoDepth), PU partition types of the target PU, and TU partition patterns.

A specific example of the configuration of the transform size determination information will now be described with reference to FIG. 17. In the transform size determination information illustrated in FIG. 17, TU partition patterns are defined in accordance with CU sizes, TU partition depths (trafoDepth), and PU partition types of the target PU. In the table, "d" represents the CU partition depth.

In the transform size determination information, the following four CU sizes are defined: 64×64, 32×32, 16×16, and 8×8.

In the transform size determination information, furthermore, selectable PU partition types are defined in accordance with CU sizes.

For CU sizes of 64×64, 32×32, and 16×16, any of 2N×2N, 2N×nU, 2N×nD, N×2N, nL×2N, and nR×2N may be selectable as a PU partition type.

For a CU size of 8×8, any of 2N×2N, 2N×N, and N×2N may be selectable as a PU partition type.

In the transform size determination information, furthermore, TU partition patterns are defined for respective TU partition depths in accordance with CU sizes and PU partition types.

For example, for a CU size of 64×64, the details are as follows. First, a TU partition depth of "0" is not defined, and a 64×64 CU is forcibly split (which is indicated by *1 in FIG. 17). The reason for this is that the maximum size of a transform unit is defined as 32×32.

For TU partition depths of "1" and "2", different TU partition patterns are defined for the case that only square quadtree partitions are included and the case that only non-square quadtree partitions are included.

For the PU partition type of 2N×2N and the TU partition pattern including only square quadtree partitions, a 32×32 square quadtree partition is defined at a TU partition depth of "1", and a 16×16 square quadtree partition is defined at a TU partition depth of "2".

The definitions for any of the PU partition types of 2N×2N, 2N×nU, 2N×nD, N×2N, nL×2N, and nR×2N and the TU partition pattern including only non-square quadtree partitions are as follows.

First, a 32×32 square quadtree partition is defined at a TU partition depth of "1". Then, at a TU partition depth of "2", a 32×8 non-square quadtree partition is defined for the PU partition types of 2N×2N, 2N×nU, and 2N×nD, and an 8×32 non-square quadtree partition is defined for the PU partition types of N×2N, nL×2N, and nR×2N.

The example for a CU size of 8×8 is as follows. For a CU size of 8×8, the selectable PU partition types are 2N×2N, 2N×2, and N×2N. For each of the PU partition types, an 8×8 square quadtree partition is defined at a TU partition depth of "1", and a 4×4 square quadtree partition is defined at a TU partition depth of "2". No definition is given at a TU partition depth of "3", and the CU is forced into non-split (which is indicated by *2 in FIG. 17).

The details of TU partitioning in the TU partition setting unit 131 will now be described with reference to FIG. 20. FIG. 20 is a diagram illustrating an example of TU partitions of the CU size of 32×32 and the PU partition type of 2N×N.

When the TU partitioning process starts, the target region setting unit 1311 sets the entire target CU as an initial value of the target region, and also sets depth=0. At depth=0, a PU boundary B1 is indicated by a dotted line at the center in the vertical direction of the region.

Then, the split determination unit 1312 determines whether or not the splitting of the target node is required on the basis of information (split_transform_flag) indicating whether or not to split the target node.

Since split=1 is set, the split determination unit 1312 determines that the target node is split.

The sub-region setting unit 1313 increases the depth by 1, and sets a TU partition pattern for the target node on the basis of transform size determination information. The sub-region setting unit 1313 executes TU partitioning on the target region, or the target CU, with depth=1.

In accordance with the definition of the transform size determination information illustrated in FIG. 17, at depth=1, the sub-region setting unit 1313 splits the target node into 32×8 regions using quadtree partitioning.

Accordingly, the target node is split into four landscape-oriented rectangular regions TU0, TU1, TU2, and TU3 using a partitioning scheme illustrated in part (b) of FIG. 18.

Further, the target region setting unit 1311 sequentially sets the respective nodes of TU0, TU1, TU2, and TU3 as target regions at the partition depth of depth=1.

Since split=1 is set for TU1, the split determination unit 1312 determines that TU1 is split.

The sub-region setting unit 1313 executes TU partitioning on TU1 with depth=2. In accordance with the definition of the transform size determination information illustrated in FIG. 17, at depth=2, the sub-region setting unit 1313 splits the target node into 16×4 regions using quadtree partitioning.

Accordingly, the target node TU1 is split into four landscape-oriented rectangular regions TU1-0, TU1-1, TU1-2, and TU1-3 using a partitioning scheme illustrated in part (a) of FIG. 19.

[3-1] Example of Configuration for Derivation of Sub-Region Size when PU Partition Type is Asymmetric For an asymmetric PU partition type, the sub-region setting unit 1313 may be configured to apply rectangular (non-square) transform to smaller PUs and to apply square transform to at least some of larger PUs.

For example, the transform size determination information stored in the transform size determination information storage unit 1314 includes pieces of definition information, namely, a small PU size 1314A and a large PU size 1314B.

The small PU size 1314A has a definition in which rectangular transform is applied to a small size PU among asymmetric PUs obtained by splitting.

The large PU size 1314B has a definition in which square transform is applied to a large size PU among asymmetric PUs obtained by splitting.

Further, the sub-region setting unit 1313 refers to one of the definition information of the small PU size 1314A and the definition information of the large PU size 1314B in accordance with the sizes of the asymmetric PUs obtained by splitting, and sets sub-regions.

TU partitioning with the example configuration described above will now be described with reference to FIG. 21.

Figure 21:
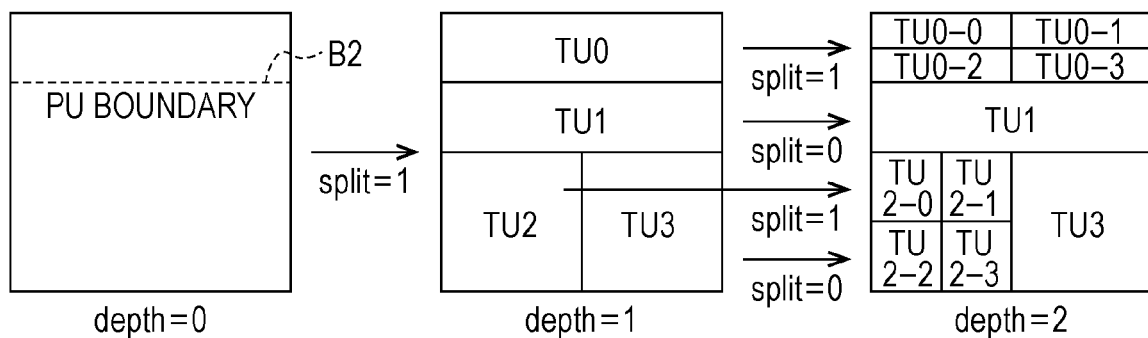
FIG. 21 is a diagram illustrating an example of TU partitions of a 32×32 CU with the PU partition type of 2N×nU.

FIG. 21 is a diagram illustrating an example of TU partitions of the PU partition type of 2N×nU in the example configuration described above.

First, when the TU partitioning process starts, the target region setting unit 1311 sets the entire target CU as an initial value of the target region, and also sets depth=0. At depth=0, a PU boundary B2 is indicated by a dotted line at a position above the center in the vertical direction of the region.

Then, the split determination unit 1312 determines whether or not the splitting of the target node is required on the basis of information (split_transform_flag) indicating whether or not to split the target node.

Since split=1 is set, the split determination unit 1312 determines that the target node is split.

The sub-region setting unit 1313 increases the depth by 1, and sets a TU partition pattern for the target node on the basis of transform size determination information. The sub-region setting unit 1313 executes TU partitioning on the target region, or the target CU, with depth=1.

The sub-region setting unit 1313 performs landscape-oriented rectangular TU partitioning on a small size PU among asymmetric PUs obtained by splitting, in accordance with the small PU size 1314A.

The sub-region setting unit 1313 performs setting so that a larger size PU among asymmetric PUs obtained by splitting includes square TU partitions, in accordance with the large PU size 1314B. As illustrated in FIG. 21, the sub-region setting unit 1313 may perform setting so that a region located near the PU boundary includes rectangular TU sub-regions.

As a result, at depth=1, the sub-region setting unit 1313 splits the target node into two rectangular nodes and two square nodes using quadtree partitioning.

Accordingly, the target node is split into four regions, namely, landscape-oriented rectangular regions TU0 and TU1 and square regions TU2 and TU3.

The target region setting unit 1311 further sequentially sets the respective nodes TU0, TU1, TU2, and TU3 as target regions at the partition depth of depth=1.

Since split=1 is set for TU0 and TU2, the split determination unit 1312 determines that TU0 and TU2 are split.

The sub-region setting unit 1313 executes TU partitioning on TU0 and TU2 with depth=2. At depth=2, the sub-region setting unit 1313 splits TU0 into four landscape-oriented rectangles using TU partitioning, and splits TU2 into four squares using TU partitioning.

Accordingly, TU0 is split into four landscape-oriented rectangular regions TU0-0, TU0-1, TU0-2, and TU0-3. TU2 is split into four landscape-oriented rectangular regions TU2-0, TU2-1, TU2-2, and TU2-3.

As described above, a CU with an asymmetric PU partition type is preferably subjected to TU partitioning so that no partitions lie across the PU boundary and the TU sub-regions obtained by splitting have the same area.

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partition types in which a coding unit is split into the prediction units include an asymmetric partition in which a coding unit is split into a plurality of prediction units having different sizes or a symmetric partition in which a coding unit is split into a plurality of prediction units having the same size. The image decoding device includes transform unit splitting means for determining, in a case that a partition type of a target coding unit, which is a coding unit to be decoded, is the asymmetric partition, a partitioning scheme for a transform unit in accordance with a size of a prediction unit included in the target coding unit.

Thus, if the partition type is the asymmetric partition, a partitioning scheme for a transform unit that enables efficient removal if correlations in accordance with the size of a prediction unit included in the target coding unit described above may be selected.

[3-2] Example of Configuration for Applying Non-Rectangular Transform when PU Partition Type is a Square Partition for Some CU Sizes Example Configuration 3-2-1

The sub-region setting unit 1313 may split a target node into non-square regions if the PU partition type is a square partition.

To that end, in the transform size determination information stored in the transform size determination information storage unit 1314, a square PU partition type 1314C that defines a target node as being split into non-square regions may be defined if the PU partition type is a square partition.

If the PU partition type is a square partition, the sub-region setting unit 1313 splits a target node into non-square regions by referring to the square PU partition type 1314C.

If the CU size is 32×32 size and the PU partition type is 2N×2N, the sub-region setting unit 1313 may split a region into 32×8 nodes using TU partitioning.

If the CU size is 32×32 size and the PU partition type is 2N×2N, the sub-region setting unit 1313 may additionally decode information indicating the partitioning scheme for TU partitions, and split a region into 32×8, 16×16, or 8×32 nodes on the basis of the decoded information.

If the CU size is 32×32 size and the PU partition type is 2N×2N, the sub-region setting unit 1313 may estimate the TU size at which the target CU is split, on the basis of the size and PU partition type of the neighboring CUs. The sub-region setting unit 1313 may also estimate the TU size as given in the following items (i) to (iii).

(i) If a CU boundary or a PU boundary is present near the left side and a boundary between a CU boundary and a PU boundary is not present near the upper side, 32×8 is selected.

(ii) If a CU boundary or a PU boundary is present near the upper side and a boundary between a CU boundary and a PU boundary is not present near the left side, 8×32 is selected.

(iii) Otherwise than the items (i) and (ii) above (if a boundary is present near the left side or near the upper side or no boundary is present near the left side or near the upper side), 16×16 is selected.

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partitioning schemes in which a coding unit is split into the transform units include square partitioning and rectangular partitioning. The image decoding device includes splitting means for splitting a target transform unit using a rectangular partitioning scheme in a case that a target prediction unit, which is a prediction unit to be decoded, has a square shape.

The operations and effects achieved by the configuration described above are as follows. In some cases, square prediction units may be selected even though edges are present in the region and the image has directionality. For example, in a case that an object including a large number of horizontal edges is moving, motion is uniform over the entire object. Thus, square prediction units are selected. In the transform process, however, preferably, transform units having a shape that is long in the horizontal direction along the horizontal edges are applied.

According to the configuration described above, in a case that a target prediction unit, which is the prediction unit to be decoded, has a square shape, a target transform unit is split using a rectangular partitioning scheme.

Accordingly, a rectangular transform unit may also be selected in a square coding unit, resulting in improved coding efficiency for the region described above.

Example Configuration 3-2-2

In addition to the configuration 3-2-1 described above, for the CU size of 16×16 size and the PU partition type of 2N×2N, the sub-region setting unit 1313 performs splitting as follows at the respective partition depths.

At a partition depth equal to 1, splitting into 16×4 TUs is performed.

At a partition depth equal to 2, splitting into 4×4 TUs is performed.

The configuration described above allows a uniform scan order in 4×4 TUs regardless of the PU partition type of a 16×16 CU. If the scan order is not uniform in 4×4 TUs because of different PU partition types of a 16×16 CU, the scanning process needs to be changed in accordance with the PU partition types of the 16×16 CU, causing an increased complexity of processing. Such non-uniformity in scan order might create a bottleneck in processing.

According to the configuration described above, uniformity of the scan order may achieve the advantage of simplified processing.

Figure 22:
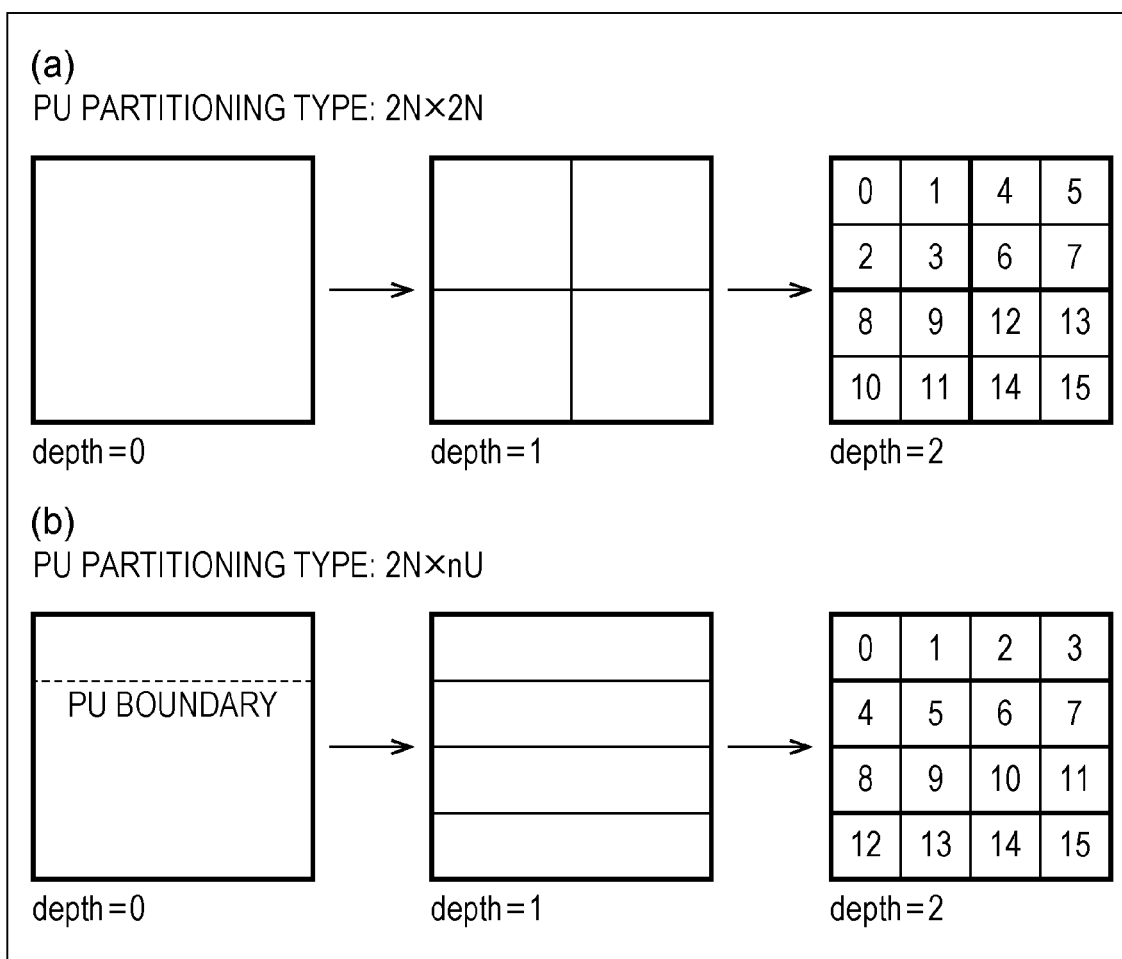
FIG. 22 includes diagrams illustrating the flow of TU partitioning in a case that a split is performed in accordance with the transform size determination information illustrated in FIG. 17. Part (a) of FIG. 22 illustrates the PU partition type of 2N×2N, and part (b) of FIG. 22 illustrates the PU partition type of 2N×nU.
Figure 23:
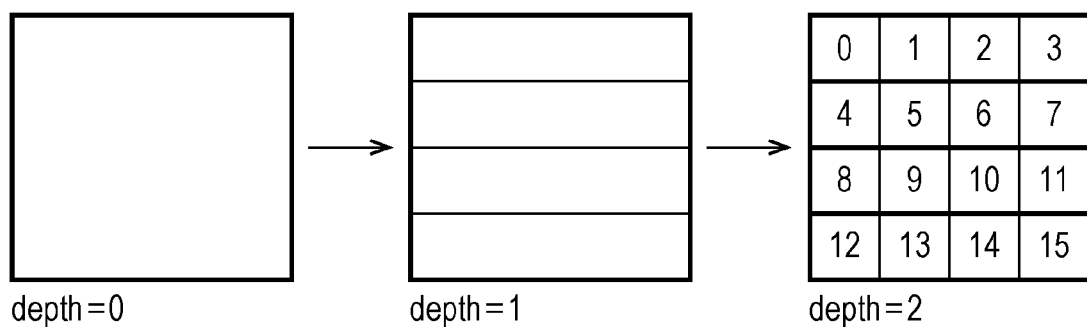
FIG. 23 is a diagram illustrating an example of the flow of TU partitioning in a case that a region with the PU partition type of 2N×2N is split.

More details will now be described with reference to FIG. 22 and FIG. 23. First, a description will be given of TU partitions illustrated in FIG. 22. FIG. 22 illustrates the flow of TU partitioning in a case that a split is performed in accordance with the transform size determination information illustrated in FIG. 17.

As illustrated in part (a) of FIG. 22, for the PU partition type of 2N×2N: at depth=1, the sub-region setting unit 1313 splits the target node using square quadtree partitioning. At depth=2, the sub-region setting unit 1313 further splits each of the square nodes obtained by splitting, using square quadtree partitioning. Here, the recursive z-scan order is used. The details are as illustrated in FIG. 22.

As illustrated in part (b) of FIG. 22, for the PU partition type of 2N×nU: at depth=1, the sub-region setting unit 1313 splits the target node using landscape-oriented rectangular quadtree partitioning. At depth=2, the sub-region setting unit 1313 further splits each of the landscape-oriented rectangular nodes obtained by splitting, using square quadtree partitioning. Here, raster scan order is used as the scan order of the TUs. The details are as illustrated in FIG. 22.

Next, a description will be given of the TU partitioning illustrated in FIG. 23. FIG. 23 illustrates the flow of TU partitioning in a case that a region with the PU partition type of 2N×2N is split in accordance with the square PU partition type 1314C.

For the PU partition type of 2N×2N: at depth=1, the sub-region setting unit 1313 splits the target node using landscape-oriented rectangular quadtree partitioning. At depth=2, the sub-region setting unit 1313 further splits each of the landscape-oriented rectangular nodes obtained by splitting, using square quadtree partitioning.

As a result, raster scan order is used. Accordingly, a common scan order, or raster scan order, can be used for the PU partition type of 2N×nU and the PU partition type of 2N×2N.

[Transform Coefficient Restoration Unit]

The details of the transform coefficient restoration unit 132 will be described hereinafter with reference again to FIG. 16. More specifically, the transform coefficient restoration unit 132 includes a non-zero coefficient determination unit 1321 and a transform coefficient derivation unit 1322.

The non-zero coefficient determination unit 1321 decodes non-zero transform coefficient presence or absence information on each TU included in a target CU or on a transform tree using a determination information decoding unit (coefficient decoding means) 1032 to determine whether or not each TU includes a non-zero transform coefficient.

The transform coefficient derivation unit 1322 restores the transform coefficient of each TU including a non-zero transform coefficient using a transform coefficient decoding unit (coefficient decoding means) 1033, and also sets the transform coefficient of each TU not including a non-zero transform coefficient to 0 (zero).

[Decoding Module]

As illustrated in FIG. 16, the decoding module 10 includes the region split flag decoding unit 1031, the determination information decoding unit 1032, the transform coefficient decoding unit 1033, and a context storage unit 1034.

The region split flag decoding unit 1031 decodes syntax values, in accordance with the encoded data and syntax type supplied from the split determination unit 1312, from a binary representation included in the encoded data. The region split flag decoding unit 1031 decodes information (split_transform_flag) indicating whether or not to split the target node.

In accordance with encoded data and syntax type of the non-zero transform coefficient presence or absence information supplied from the transform coefficient derivation unit 1322, the determination information decoding unit 1032 decodes a syntax value from a binary representation included in the encoded data. The syntax elements decoded by the determination information decoding unit 1032 include, specifically, no_residual_data_flag, cbf_luma, cbf_cb, cbf_cr, and cbp.

In accordance with encoded data and syntax type of the transform coefficients supplied from the transform coefficient derivation unit 1322, the transform coefficient decoding unit 1033 decodes a syntax value from a binary representation included in the encoded data. The syntax elements decoded by the transform coefficient decoding unit 1033 include, specifically, level, which is the absolute value of a transform coefficient, the sign of a transform coefficient, and the run of consecutive zeros.

The context storage unit 1034 stores contexts referred to by the determination information decoding unit 1032 and the transform coefficient decoding unit 1033 for decoding processes.

[3-3] Specific Configuration for Referring to Contexts when Decoding Transform Coefficients If the PU partition type is an asymmetric partition, each of the determination information decoding unit 1032 and the transform coefficient decoding unit 1033 may be configured to decode syntax values for transform coefficients using different contexts for TUs included in a smaller PU and TUs included in a larger PU. Examples of such types of syntax elements include a non-zero transform coefficient flag, a transform coefficient level, a-run of transform coefficients, and non-zero transform coefficient presence or absence information on each node in the TU tree. The syntax elements described above may be used in combination.

Accordingly, the context storage unit 1034 may store a small PU size 1034A representing probability setting values corresponding to various syntax values for transform coefficients in contexts referred to in TUs included in a smaller PU, and a large PU size 1034B representing probability setting values in contexts referred to in TUs included in a larger PU. The small PU size 1034A and the large PU size 1034B are probability setting values corresponding to different contexts.

The determination information decoding unit 1032 arithmetically decodes Cbf (cbf_luma, cbf_cb, cbf_cr, etc.) for the target TU by referring to the small PU size 1034A if the target TU is included in a small PU or by referring to the large PU size 1034B if the target TU is included in a larger PU.

The transform coefficient decoding unit 1033 arithmetically decodes transform coefficients (level, sign, run, etc.) for the target TU by referring to the small PU size 1034A if the target TU is included in a small PU or by referring to the large PU size 1034B if the target TU is included in a larger PU.

The determination information decoding unit 1032 and the transform coefficient decoding unit 1033 may refer to the small PU size 1034A if the target TU is included in a larger PU and if the target TU is located near a smaller PU.

In other words, even in a case that the target TU is included in a larger PU, if the target TU is located near the PU boundary, the determination information decoding unit 1032 and the transform coefficient decoding unit 1033 may refer to the small PU size 1034A.

A smaller PU may possibly include an edge, and is likely to include a transform coefficient. On the other hand, a larger PU is less likely to include a transform coefficient. A different context is used for the target TU depending on whether the target TU is included in the small PU or the larger PU. Accordingly, variable length decoding may be performed in accordance with the probability of occurrence of the transform coefficient in each region.

[Operations and Effects]

The present invention may also be expressed in the following form. An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partition types in which a coding unit is split into the prediction units include a split into asymmetric partitions that are prediction units having different sizes and a split into symmetric partitions that are prediction units having the same size. The image decoding device includes coefficient decoding means for decoding, in a case that a partition type of a target prediction unit, which is a prediction unit to be decoded, is a split into asymmetric partitions, transform coefficients by referring to different contexts for small and large prediction units obtained by the split.

Thus, variable length decoding may be performed in accordance with the probability of occurrence of transform coefficients in respective regions of transform units included in a small prediction unit and transform units included in a large prediction unit.

(Processing Flow)

Figure 24:
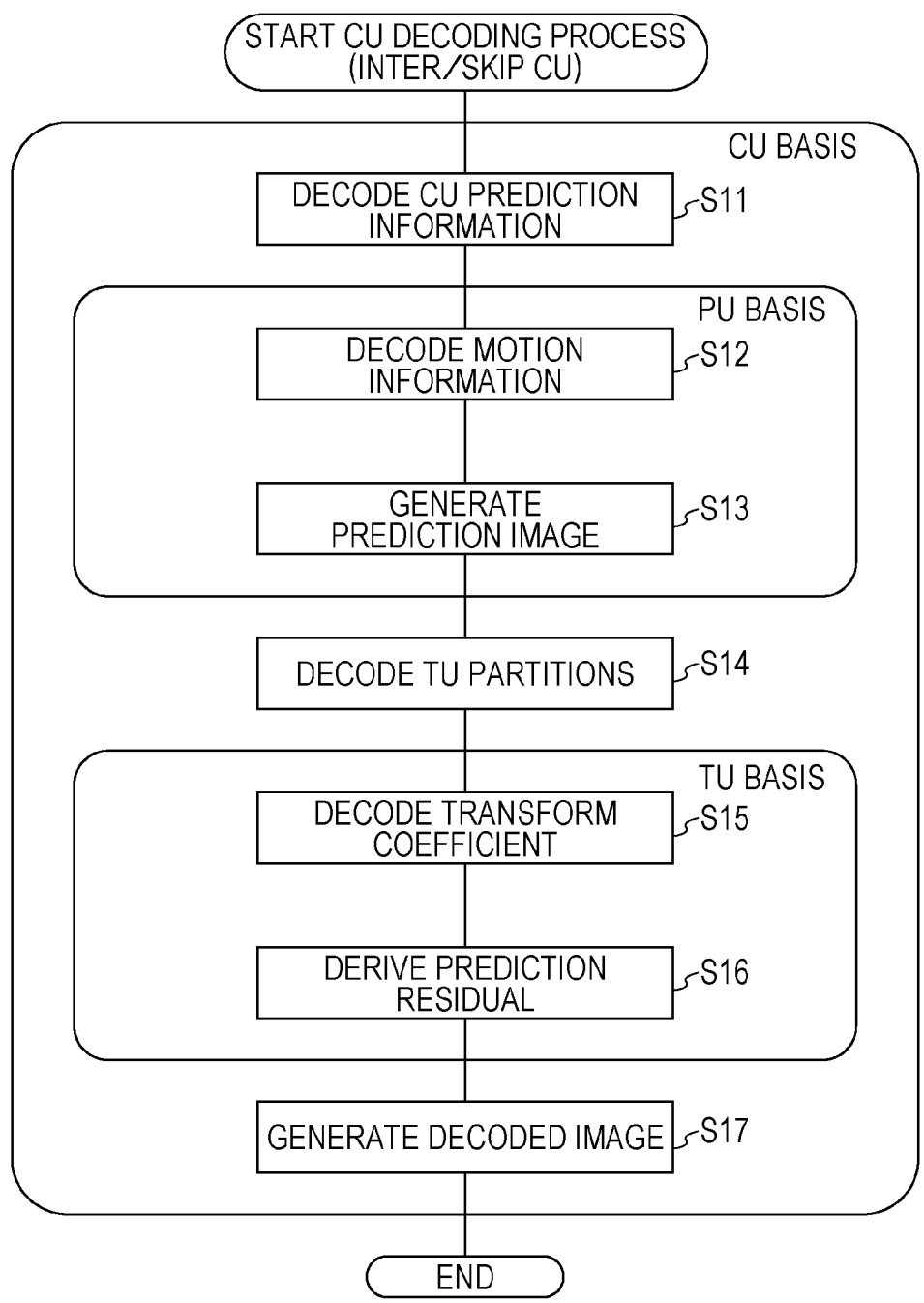
FIG. 24 is a flowchart illustrating an example of the flow of a CU decoding process.

The CU decoding process of the video decoding device 1 will now be described with reference to FIG. 24. In the following, it is assumed that a target CU is an inter CU or a skip CU. FIG. 24 is a flowchart illustrating an example of the flow of the CU decoding process (inter/skip CU) for the video decoding device 1.

When the CU decoding process starts, the CU information decoding unit 11 decodes CU prediction information on the target CU using the decoding module 10 (S11). This process is performed on a per-CU basis.

Specifically, in the CU information decoding unit 11, the CU prediction mode determination unit 111 decodes the skip flag SKIP using the decoding module 10. If the skip flag does not indicate a skip CU, the CU prediction mode determination unit 111 further decodes CU prediction type information Pred_type using the decoding module 10.

Then, processing on a per-PU basis is performed. Specifically, the motion compensation parameter derivation unit 121 in the PU information decoding unit 12 decodes motion information (S12), and the prediction image generation unit 14 generates a prediction image through inter prediction based on the decoded motion information (S13).

Then, the TU information decoding unit 13 performs a TU partition decoding process (S14). Specifically, in the TU information decoding unit 13, the TU partition setting unit 131 sets a TU partitioning scheme on the basis of parameters decoded from the encoded data and the CU size and the PU partition type. This process is performed on a per-CU basis.

Then, processing on a per-TU basis is performed. Specifically, the TU information decoding unit 13 decodes a transform coefficient (S15), and the dequantization/inverse transform unit 15 derives a prediction residual from the decoded transform coefficient (S16).

Then, the adder 17 adds together the prediction image and the prediction residual to generate a decoded image (S17). This process is performed on a per-CU basis.

[Video Encoding Device]

Figure 25:
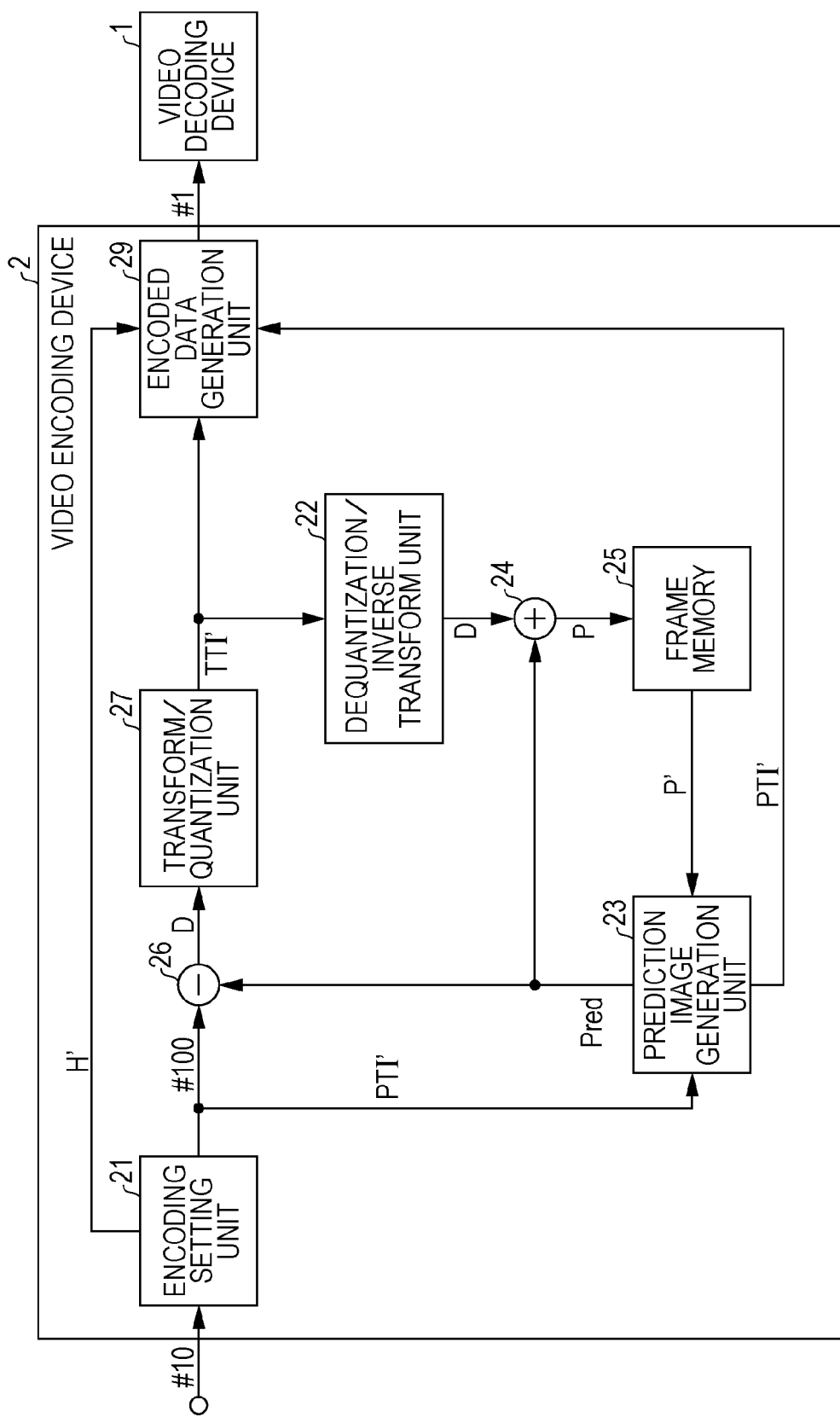
FIG. 25 is a functional block diagram illustrating a schematic configuration of a video encoding device according to an embodiment of the present invention.
Figure 26:
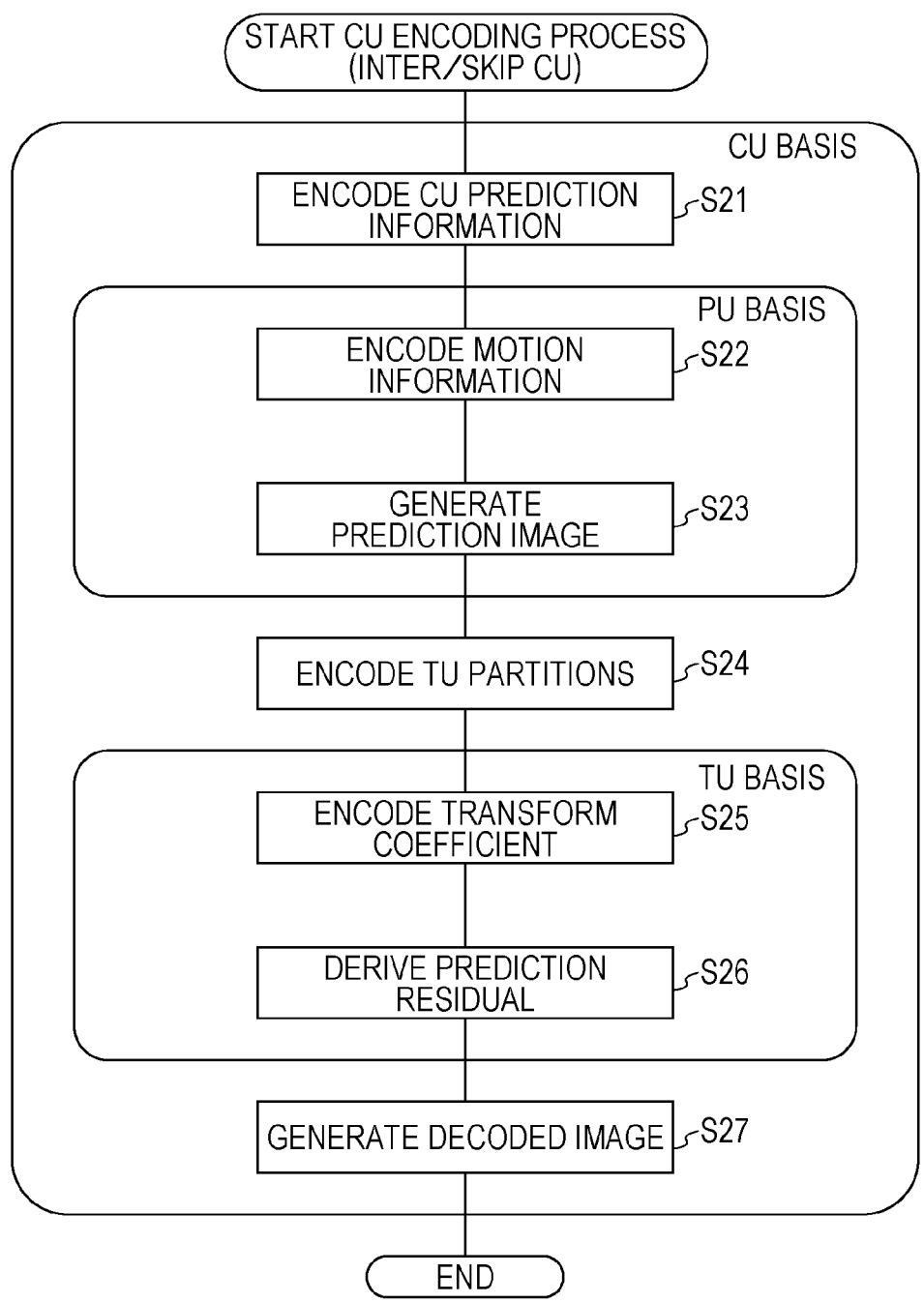
FIG. 26 is a flowchart illustrating an example of the flow of a CU encoding process.

The video encoding device 2 according to the present embodiment will be described hereinafter with reference to FIG. 25 and FIG. 26.

(Overview of Video Encoding Device)

Generally, the video encoding device 2 is a device configured to encode an input image #10 to generate encoded data #1, and to output the encoded data #1.

(Configuration of Video Encoding Device)

First, an example configuration of the video encoding device 2 will be described with reference to FIG. 25. FIG. 25 is a functional block diagram illustrating a configuration of the video encoding device 2. As illustrated in FIG. 25, the video encoding device 2 includes an encoding setting unit 21, a dequantization/inverse transform unit 22, a prediction image generation unit 23, an adder 24, a frame memory 25, a subtractor 26, a transform/quantization unit 27, and an encoded data generation unit (encoding means) 29.

The encoding setting unit 21 generates image data and various kinds of setting information concerning encoding, on the basis of the input image #10.

Specifically, the encoding setting unit 21 generates the following image data and setting information.

First, the encoding setting unit 21 sequentially splits the input image #10 into slices and tree blocks to generate a CU image #100 for a target CU.

The encoding setting unit 21 further generates header information H' on the basis of the results of the splitting process. The header information H' includes (1) information on the size and shape of a tree block included in a target slice and the position of the tree block in the target slice, and (2) CU information CU' on the size and shape of CUs of each tree block and the position of CUs in a target tree block.

The encoding setting unit 21 also generates PT setting information PTI' by referring to the CU image #100 and the CU information CU'. The PT setting information PTI' includes information concerning all the combinations of (1) possible patterns of splitting the target CU into individual PUs and (2) possible prediction modes that are allocated to each PU.

The encoding setting unit 21 supplies the CU image #100 to the subtractor 26. The encoding setting unit 21 further supplies the header information H' to the encoded data generation unit 29. The encoding setting unit 21 further supplies the PT setting information PTI' to the prediction image generation unit 23.

The dequantization/inverse transform unit 22 applies dequantization and inverse orthogonal transform to the quantized prediction residuals for each block, which are supplied from the transform/quantization unit 27, to restore prediction residuals for each block. The inverse orthogonal transform has been described in conjunction with the dequantization/inverse transform unit 15 illustrated in FIG. 1 and a description thereof is thus omitted here.

Further, the dequantization/inverse transform unit 22 integrates the prediction residuals for each block in accordance with a partition pattern specified by TT split information (described below), and generates a prediction residual D for the target CU. The dequantization/inverse transform unit 22 supplies the generated prediction residual D for the target CU to the adder 24.

The prediction image generation unit 23 generates a prediction image Pred for the target CU by referring to a locally decoded image P' recorded on the frame memory 25 and the PT setting information PTI'. The prediction image generation unit 23 sets the prediction parameters obtained by a prediction image generation process in the PT setting information PTI', and transfers the set PT setting information PTI' to the encoded data generation unit 29. The prediction image generation process of the prediction image generation unit 23 is similar to that of the prediction image generation unit 14 in the video decoding device 1, and a description thereof is thus omitted here.

The adder 24 adds together the prediction image Pred supplied from the prediction image generation unit 23 and the prediction residual D supplied from the dequantization/inverse transform unit 22 to generate a decoded image P for the target CU.

Decoded images P, which have been decoded, are sequentially recorded on the frame memory 25. At the time when the target tree block is decoded, the frame memory 25 has recorded thereon decoded images corresponding to all the tree blocks decoded before the target tree block is decoded (for example, all the preceding tree blocks in raster scan order), together with parameters used for the decoding of the decoded images P.

The subtractor 26 subtracts the prediction image Pred from the CU image #100 to generate a prediction residual D for the target CU. The subtractor 26 supplies the generated prediction residual D to the transform/quantization unit 27.

The transform/quantization unit 27 applies orthogonal transform and quantization to the prediction residual D to generate a quantized prediction residual. The term "orthogonal transform", as used herein, refers to an orthogonal transform from the pixel domain to the frequency domain. Examples of the orthogonal transform include DCT transform (Discrete Cosine Transform) and DST transform (Discrete Sine Transform).

Specifically, the transform/quantization unit 27 refers to the CU image #100 and the CU information CU', and determines the pattern in which the target CU is split into one or a plurality of blocks. The transform/quantization unit 27 splits the prediction residual D into prediction residuals for the respective blocks in accordance with the determined partition pattern.

Further, the transform/quantization unit 27 applies orthogonal transform to the prediction residual for each block to generate a prediction residual in the frequency domain. Then, the transform/quantization unit 27 quantizes the prediction residual in the frequency domain to generate a quantized prediction residual for each block.

The transform/quantization unit 27 further generates TT setting information TTI' including the generated quantized prediction residual for each block, TT split information for specifying the partition pattern of the target CU, and information concerning all possible patterns of splitting the target CU into individual blocks. The transform/quantization unit 27 supplies the generated TT setting information TTI' to the dequantization/inverse transform unit 22 and the encoded data generation unit 29.

The encoded data generation unit 29 encodes the header information H', the TT setting information TTI', and the PT setting information PTI'. The encoded data generation unit 29 further multiplexes the encoded header information H, TT setting information TTI, and PT setting information PTI to generate encoded data #1, and outputs the encoded data #1.

(Correspondence Between Video Encoding Device and Video Decoding Device)

The video encoding device 2 includes a configuration corresponding to the configuration of the video decoding device 1. The term "correspondence", as used herein, is used to indicate a relationship in which the video encoding device 2 and the video decoding device 1 perform similar or opposite operations.

For example, as described above, the prediction image generation process of the prediction image generation unit 14 in the video decoding device 1 is similar to the prediction image generation process of the prediction image generation unit 23 in the video encoding device 2.

For example, a process in which the video decoding device 1 decodes syntax values from a bit sequence is opposite to a process in which the video encoding device 2 encodes a bit sequence from syntax values.

The following description will be given of what correspondence exists between the respective components of the video encoding device 2 and the CU information decoding unit 11, the PU information decoding unit 12, and the TU information decoding unit 13 of the video decoding device 1. Accordingly, the operations and functions of the respective components of the video encoding device 2 will become apparent in more detail.

The encoded data generation unit 29 corresponds to the decoding module 10. More specifically, whereas the decoding module 10 derives syntax values on the basis of encoded data and syntax type, the encoded data generation unit 29 generates encoded data on the basis of syntax values and syntax type.

The encoding setting unit 21 corresponds to the CU information decoding unit 11 of the video decoding device 1. A comparison between the encoding setting unit 21 and the CU information decoding unit 11 will be presented as follows.

The CU information decoding unit 11 supplies encoded data and syntax type for CU prediction type information to the decoding module 10, and determines a PU partition type on the basis of the CU prediction type information decoded by the decoding module 10.

On the other hand, the encoding setting unit 21 determines a PU partition type, and generates CU prediction type information. The encoding setting unit 21 supplies syntax values and syntax type for the CU prediction type information to the encoded data generation unit 29.

The encoded data generation unit 29 may include components similar to the binarization information storage unit 1012, the context storage unit 1013, and the probability setting storage unit 1014 in the decoding module 10.

The prediction image generation unit 23 correspond to the PU information decoding unit 12' and the prediction image generation unit 14 of the video decoding device 1. A comparison between them will be presented as follows.

As described above, the PU information decoding unit 12 supplies encoded data and syntax type for motion information to the decoding module 10, and derives motion compensation parameters on the basis of the motion information decoded by the decoding module 10. The prediction image generation unit 14 generates a prediction image on the basis of the derived motion compensation parameters.

On the other hand, the prediction image generation unit 23 determine motion compensation parameters in a prediction image generation process, and supplies syntax values and syntax type for the motion compensation parameters to the encoded data generation unit 29.

The prediction image generation unit 23 may include components similar to the merge candidate priority information storage unit 122 and the reference frame setting information storage unit 123 in the PU information decoding unit 12.

The transform/quantization unit 27 corresponds to the TU information decoding unit 13 and the dequantization/inverse transform unit 15 of the video decoding device 1. A comparison between them will be presented as follows.

The TU partition setting unit 131 in the TU information decoding unit 13 supplies encoded data and syntax type for information indicating whether or not to split a node to the decoding module 10, and performs TU partitioning on the basis of the information indicating whether or not to split a node, which is decoded by the decoding module 10.

The transform coefficient restoration unit 132 in the TU information decoding unit 13 supplies encoded data and syntax type for determination information and transform coefficients to the decoding module 10, and derives transform coefficients on the basis of the determination information and transform coefficients decoded by the decoding module 10.

On the other hand, the transform/quantization unit 27 determines a partitioning scheme for TU partitions, and supplies syntax values and syntax type for information indicating whether or not to split a node to the encoded data generation unit 29.

The transform/quantization unit 27 further supplies syntax values and syntax type for quantized transform coefficients obtained by applying transform and quantization to prediction residuals to the encoded data generation unit 29.

The transform/quantization unit 27 may include a configuration similar to that of the transform size determination information storage unit 1314 in the TU partition setting unit 131. The encoded data generation unit 29 may include a configuration similar to that of the context storage unit 1034 in the decoding module 10.

(Correspondence Between Video Encoding Device and Specific Configuration)

[1]' Encoding Setting Unit and Encoded Data Generation Unit

[1-1]' Example of Configuration for Restricting References to Contexts

If the PU partition type is an asymmetric partition, the encoded data generation unit 29 may perform an encoding process on information indicating the partition type of the asymmetric partition without using contexts for CABAC.

A specific configuration of the encoded data generation unit 29 is similar to that described in, for example, the example configuration [1-1] of the video decoding device 1, and a description thereof is thus omitted here. Note that "the CU prediction mode decoding unit 1011", "the probability setting storage unit 1014", and "decode (decoding)" in the description of the example configuration [1-1] should be substituted with "the encoded data generation unit 29", "the configuration corresponding to the probability setting storage unit 1014", and "encode (encoding)", respectively.

[1-2]' Configuration for Encoding CU Prediction Type Information (Pred_Type)

The encoded data generation unit 29 may be configured to encode CU prediction type information by referring to binarization information.

A specific configuration of the encoded data generation unit 29 is similar to that described in, for example, the example configuration [1-2] of the video decoding device 1, and a description thereof is thus omitted here. Note that "the CU prediction mode decoding unit 1011", "the binarization information storage unit 1012", and "decode (decoding)" in the description of the example configuration [1-2] should be substituted with "the encoded data generation unit 29", "the configuration corresponding to the binarization information storage unit 1012", and "encode (encoding)", respectively.

[1-3]' Configuration for Encoding Short Code of Intra CU in Small Size CU

The encoded data generation unit 29 may be configured to encode a short code of an intra CU in a small size CU.

A specific configuration of the encoded data generation unit 29 is similar to that described in, for example, the example configuration [1-3] of the video decoding device 1, and a description thereof is thus omitted here. Note that "the CU prediction mode decoding unit 1011", "the context storage unit 1013", "the binarization information storage unit 1012", and "decode (decoding)" in the description of the example configuration [1-3] should be substituted with "the encoded data generation unit 29", "the configuration corresponding to the context storage unit 1013", "the configuration corresponding to the binarization information storage unit 1012", and "encode (encoding)", respectively.

[1-4]' Configuration for Modifying Interpretation of Bin Sequence in Accordance with Neighboring Prediction Parameters The encoded data generation unit 29 may be configured to modify the interpretation of a bin sequence by referring to prediction parameters allocated to neighboring regions.

A specific configuration of the encoded data generation unit 29 is similar to that described in, for example, the example configuration [1-4] of the video decoding device 1, and a description thereof is thus omitted here. Note that "the CU prediction mode decoding unit 1011", "the binarization information storage unit 1012", and "decode (decoding)" in the description of the example configuration [1-4] should be substituted with "the encoded data generation unit 29", "the configuration corresponding to the binarization information storage unit 1012", and "encode (encoding)", respectively.

[2]' Prediction Image Generation Unit and Encoded Data Generation Unit

[2-1]' Example of Positions and Priorities of Merge Candidates

In a case that the PU partition type is asymmetric, the PU information generation unit 30 may be configured to determine the priorities of merge candidates using a method different from that in a case that the PU partition type is symmetric.

A specific configuration of the PU information generation unit 30 is similar to that described in, for example, the example configuration [2-1] of the video decoding device 1, and a description thereof is thus omitted here. Note that "the motion compensation parameter derivation unit 121" and "the merge candidate priority information storage unit 122" in the description of the example configuration [2-1] should be substituted with "the motion compensation parameter generation unit 301" and "the configuration corresponding to the merge candidate priority information storage unit 122", respectively.

[2-2]' Change of Merge Candidates Using Combination of CU Size and Skip/Merge

The prediction image generation unit 23 may be configured to change merge candidates in accordance with a combination of a CU size and a CU type, namely, whether or not the CU of interest is a CU for skipping/merging.

A specific configuration of the prediction image generation unit 23 is similar to that described in, for example, the example configuration [2-2] of the video decoding device 1, and a description thereof is thus omitted here. Note that "the motion compensation parameter derivation unit 121" and "the merge candidate priority information storage unit 122" in the description of the example configuration [2-2] should be substituted with "the configuration corresponding to the merge candidate priority information storage unit 122", respectively.

[2-3]' Determination of Number of Reference Frames

The prediction image generation unit 23 may determine which prediction scheme out of uni-prediction and bi-prediction to apply in inter prediction, by referring to the reference frame setting information.

A specific configuration of the prediction image generation unit 23 is similar to that described in, for example, the example configuration [2-3] of the video decoding device 1, and a description thereof is thus omitted here. Note that "the motion compensation parameter derivation unit 121" and "the reference frame setting information storage unit 123" in the description of the example configuration [2-3] should be substituted with "the configuration corresponding to the reference frame setting information storage unit 123", respectively.

[3]' Transform/Quantization Unit and Encoded Data Generation Unit

[3-1]' Example of Configuration for Derivation of Sub-Region Size when PU Partition Type is Asymmetric If the PU partition type is asymmetric, the transform/quantization unit 27 may be configured to apply rectangular (non-square) transform to a smaller PU and to apply square transform to a larger PU.

A specific configuration of the transform/quantization unit 27 is similar to that described in, for example, the example configuration [3-1] of the video decoding device 1, and a description thereof is thus omitted here. Note that "the target region setting unit 1311", "the split determination unit 1312", and "the sub-region setting unit 1313" in the description of the example configuration [3-1] should be substituted with "the transform/quantization unit 27". In addition, "the transform size determination information storage unit 1314" in the description of the example configuration [3-1] should be substituted with "the configuration corresponding to the transform size determination information storage unit 1314".

[3-2]' Example of Configuration for Applying Non-Rectangular Transform when Some PU Partition Types are Square Partition If the PU partition type is a square partition, the transform/quantization unit 27 may be configured to split the target node into non-square regions. In addition to the configuration described above, if the CU size is 16×16 size and the PU partition type is 2N×2N, the transform/quantization unit 27 may be configured to perform splitting so that uniform scan order is used for the respective partition depths.

A specific configuration of the transform/quantization unit 27 is similar to that described in, for example, in the example configuration [3-2] of the video decoding device 1, and a description thereof is thus omitted here. Note that "the sub-region setting unit 1313" and "the transform size determination information storage unit 1314" in the description of the example configuration [3-2] should be substituted with "the transform/quantization unit 27" and "the configuration corresponding to the transform size determination information storage unit 1314", respectively.

[3-3]' Specific Configuration for Referring to Contexts for Encoding of Transform Coefficients If the PU partition type is asymmetric, the encoded data generation unit 29 may be configured to encode at least one of non-zero transform coefficient presence or absence information and transform coefficient using different contexts for TUs included in a smaller PU and TUs included in a larger PU.

A specific configuration of the encoded data generation unit 29 is similar to that described in, for example, the example configuration [3-3] of the video decoding device 1, and a description thereof is thus omitted here. Note that "the determination information decoding unit 1032" and "the transform coefficient decoding unit 1033" in the description of the example configuration [3-3] should be substituted with "the encoded data generation unit 29". In addition, "decode (decoding)" and "the context storage unit 1034" in the description of the example configuration [3-3-] should be substituted with "encode (encoding)" and "the configuration corresponding to the context storage unit 1034", respectively.

(Processing Flow)

The CU encoding process of the video encoding device 2 will be described hereinafter with reference to FIG. 26. In the following, it is assumed that a target CU is an inter CU or a skip CU. FIG. 26 is a flowchart illustrating an example of the flow of the CU encoding process (inter/skip CU) of the video encoding device 2.

When the CU encoding process starts, the encoding setting unit 21 determines CU prediction information on the target CU, and the encoded data generation unit 29 encodes the CU prediction information determined by the encoding setting unit 21 (S21). This process is performed on a per-CU basis.

Specifically, the encoding setting unit 21 determines whether or not the target CU is a skip CU. If the target CU is a skip CU, the encoding setting unit 21 causes the encoded data generation unit 29 to encode the skip flag SKIP. If the target CU is not a skip CU, the encoding setting unit 21 causes the encoded data generation unit 29 to encode the CU prediction type information Pred_type.

Then, processing is performed on a per-PU basis. Specifically, the prediction image generation unit 23 derives motion information, and the encoded data generation unit 29 encodes the motion information derived by the prediction image generation unit 23 (S22). Further, the prediction image generation unit 14 generates a prediction image using inter prediction on the basis of the derived motion information (S23).

Then, the transform/quantization unit 27 performs a TU partition encoding process (S24). Specifically, the transform/quantization unit 27 sets a TU partitioning scheme on the basis of the CU size of the target CU and the PU partition type. This process is performed on a per-CU basis.

Then, processing is performed on a per-TU basis. Specifically, the transform/quantization unit 27 transforms a prediction residual into a transform coefficient, and quantizes the transform coefficient (S25). Then, the encoded data generation unit 29 encodes the transformed and quantized transform coefficient (S26).

Then, the dequantization/inverse transform unit 22 applies dequantization and inverse transform to the transformed and quantized transform coefficient to restore a prediction residual. In addition, the adder 24 adds together the prediction image and the prediction residual to generate a decoded image (S27). This process is performed on a per-CU basis.

Application Examples

The video encoding device 2 and the video decoding device 1, described above, may be mounted in various apparatuses for transmitting, receiving, recording, and reproducing a moving image for use. The moving image may be a natural moving image captured using a camera or the like, or may be an artificial moving image (including CG and GUI) generated using a computer or the like.

First, the use of the video encoding device 2 and the video decoding device 1, described above, for the transmission and reception of moving images will be described with reference to FIG. 27.

Figure 27:
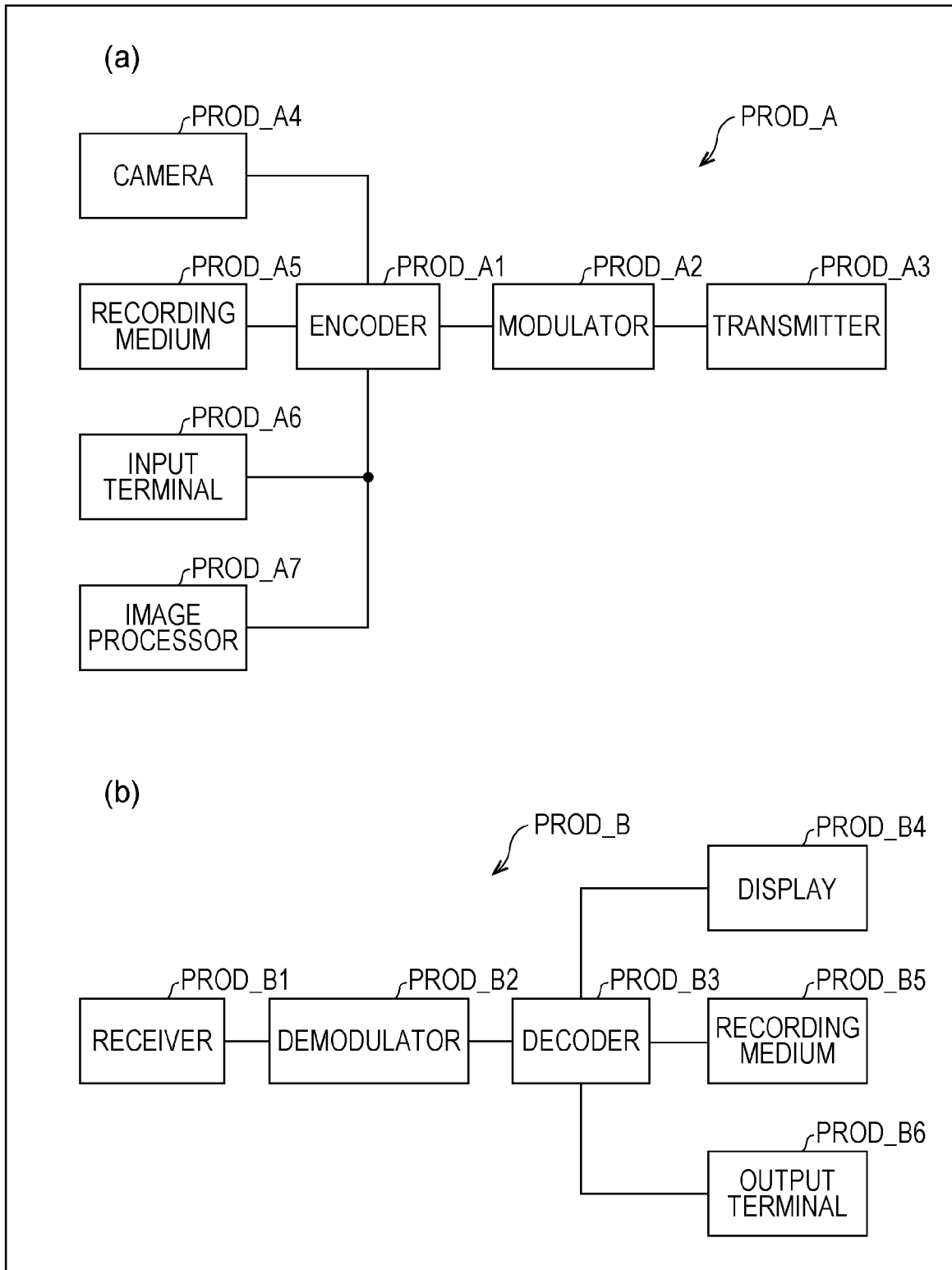
FIG. 27 illustrates a configuration of a transmitting apparatus including the video encoding device and a configuration of a receiving apparatus including the video decoding device. Part (a) of FIG. 27 illustrates the transmitting apparatus including the video encoding device, and part (b) of FIG. 27 illustrates the receiving apparatus including the video decoding device.

Part (a) of FIG. 27 is a block diagram illustrating a configuration of a transmitting apparatus PROD_A including the video encoding device 2. As illustrated in part (a) of FIG. 27, the transmitting apparatus PROD_A includes an encoder PROD_A1 for encoding a moving image to obtain encoded data, a modulator PROD_A2 for modulating a carrier wave using the encoded data obtained by the encoder PROD_A1 to obtain a modulation signal, and a transmitter PROD_A3 for transmitting the modulation signal obtained by the modulator PROD_A2. The video encoding device 2 described above may be used as the encoder PROD_A1.

The transmitting apparatus PROD_A may further include sources from which moving images to be input to the encoder PROD_A1 are supplied, including a camera PROD_A4 for capturing a moving image, a recording medium PROD_A5 having a moving image recorded thereon, an input terminal PROD_A6 through which a moving image is input from outside, and an image processor A7 for generating or modifying an image. In part (a) of FIG. 27, all of them are included in the transmitting apparatus PROD_A, by way of example. However, some of them may be omitted.

The recording medium PROD_A5 may have recorded thereon a moving image that has not been encoded, or may have recorded thereon a moving image that has been encoded using a recording coding scheme different from a transmission coding scheme. In the latter case, a decoder (not illustrated) may be disposed between the recording medium PROD_A5 and the encoder PROD_A1 to decode encoded data read from the recording medium PROD_A5 in accordance with a recording coding scheme.

Part (b) of FIG. 27 is a block diagram illustrating a configuration a receiving apparatus PROD_B including the video decoding device 1. As illustrated in part (b) of FIG. 27, the receiving apparatus PROD_B includes a receiver PROD_B1 for receiving a modulation signal, a demodulator PROD_B2 for demodulating the modulation signal received by the receiver PROD_B1 to obtain encoded data, and a decoder PROD_B3 for decoding the encoded data obtained by the demodulator PROD_B2 to obtain a moving image. The video decoding device 1 described above may be used as the decoder PROD_B3.

The receiving apparatus PROD_B may further include destinations to which a moving image output from the decoder PROD_B3 is to be supplied, including a display PROD_B4 on which the moving image is displayed, a recording medium PROD_B5 on which the moving image is recorded, and an output terminal PROD_B6 through which the moving image is output to outside. In part (b) of FIG. 27, all of them are included in the receiving apparatus PROD_B, by way of example. However, some of them may be omitted.

The recording medium PROD_B5 may be configured to have recorded thereon a moving image that has not been encoded, or may have recorded thereon a moving image that has been encoded using a recording coding scheme different from a transmission coding scheme. In the latter case, an encoder (not illustrated) may be disposed between the decoder PROD_B3 and the recording medium PROD_B5 to encode a moving image acquired from the decoder PROD_B3 in accordance with a recording coding scheme.

A transmission medium on which modulation signals travel may be wireless or wired. A transmission form in which modulation signals are transmitted may be broadcasting (here, a transmission form in which no destinations are specified in advance) or communication (here, a transmission form in which destinations are specified in advance). That is, the transmission of modulation signals may be implemented by any of radio broadcasting, wire broadcasting, wireless communication, and wired communication.

For example, a broadcasting station (such as a broadcasting facility)/receiving station (such as a television receiver) of terrestrial digital broadcasting is an example of the transmitting apparatus PROD_A/the receiving apparatus PROD_B for transmitting/receiving a modulation signal via radio broadcasting. A broadcasting station (such as a broadcasting facility)/receiving station (such as a television receiver) of cable television broadcasting is an example of the transmitting apparatus PROD_A/the receiving apparatus PROD_B for transmitting/receiving a modulation signal via wire broadcasting.

A server (such as a workstation)/client (such as a television receiver, a personal computer, or a smartphone) for VOD (Video On Demand) services, video sharing services, and the like over the Internet is an example of the transmitting apparatus PROD_A/the receiving apparatus PROD_B for transmitting/receiving a modulation signal via communication (in general, wireless or wired transmission media may be used for LANs, and wired transmission media are used for WANs). Examples of the personal computer include a desktop PC, a laptop PC, and a tablet PC. Examples of the smartphone also include a multifunctional mobile phone terminal.

A client for video sharing services has a function to decode encoded data downloaded from a server and to display the decoded data on a display, and also has a function to encode a moving image captured using a camera and to upload the encoded image to a server. That is, a client for video sharing services serves as both the transmitting apparatus PROD_A and the receiving apparatus PROD_B.

Next, the use of the video encoding device 2 and the video decoding device 1, described above, for the recording and reproduction of moving images will be described with reference to FIG. 28.

Figure 28:
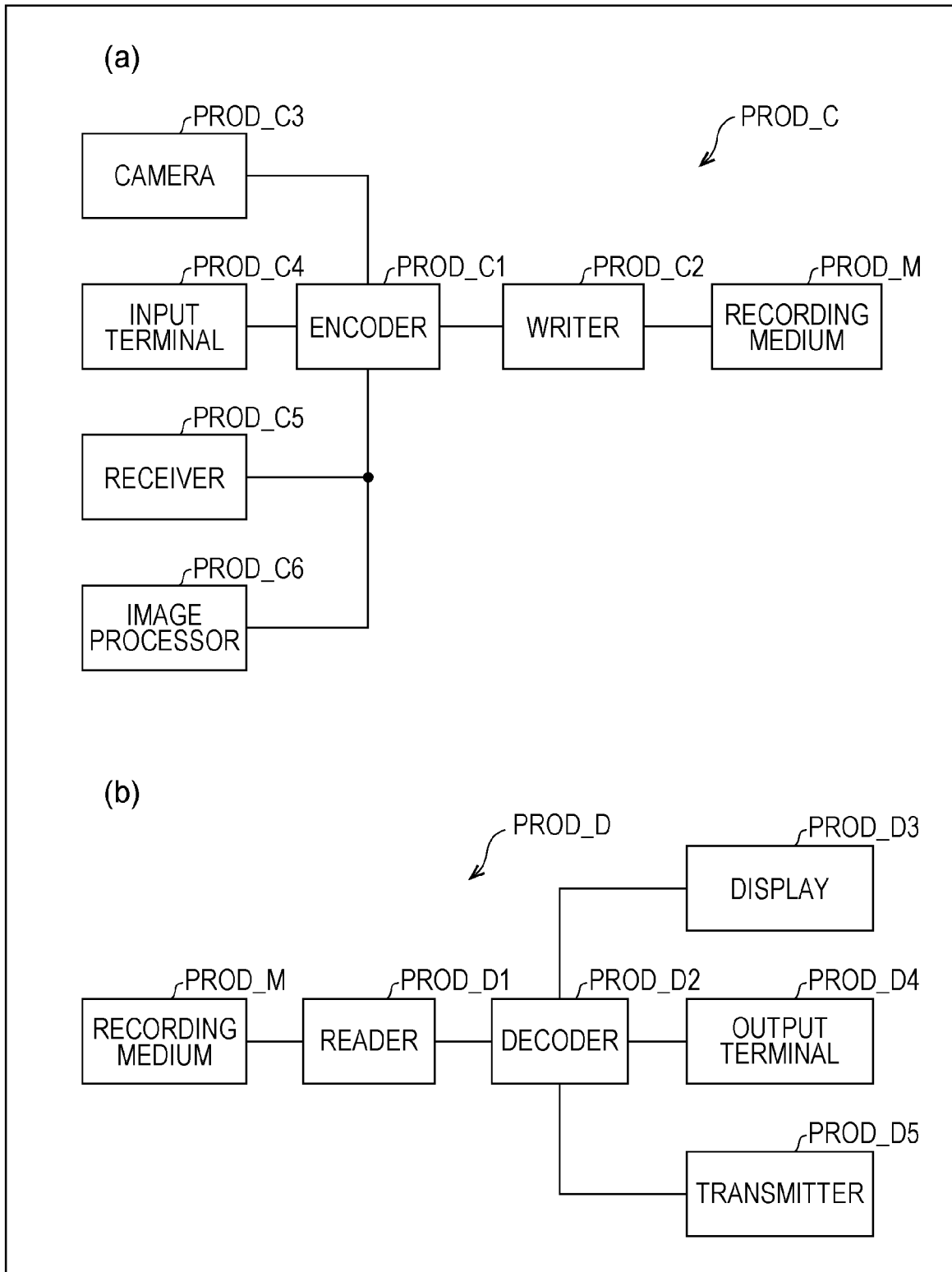
FIG. 28 illustrates a configuration of a recording apparatus including the video encoding device and a configuration of a reproducing apparatus including the video decoding device. Part (a) of FIG. 28 illustrates the recording apparatus including the video encoding device, and part (b) of FIG. 28 illustrates the reproducing apparatus including the video decoding device.

Part (a) of FIG. 28 is a block diagram illustrating a configuration of a recording apparatus PROD_C including the video encoding device 2 described above. As illustrated in part (a) of FIG. 28, the recording apparatus PROD_C include an encoder PROD_C1 for encoding a moving image to obtain encoded data, and a writer PROD_C2 for writing the encoded data obtained by the encoder PROD_C1 to a recording medium t PROD_J. The video encoding device 2 described above may be used as the encoder PROD_C1.

The recording medium PROD_M may be (1) of a type incorporated in the recording apparatus PROD_C, such as an HDD (Hard Disk Drive) or an SSD (Solid State Drive), or (2) of a type connected to the recording apparatus PROD_C, such as an SD memory card or a USB (Universal Serial Bus) flash memory, or may be (3) set in a drive device (not illustrated) incorporated in the recording apparatus PROD_C, such as a DVD (Digital Versatile Disc) or a BD (Blu-ray Disc: registered trademark).

The recording apparatus PROD_C may further include sources from which moving images to be input to the encoder PROD_C1 are supplied, including a camera PROD_C3 for capturing a moving image, an input terminal PROD_C4 through which a moving image is input from outside, a receiver PROD_C5 for receiving a moving image, and an image processor PROD_C6 for generating or modifying an image. In part (a) of FIG. 28, all of them are included in the recording apparatus PROD_C, by way of example. However, some of them may be omitted.

The receiver PROD_C5 may be configured to receive a moving image that has not been encoded, or may be configured to receive encoded data that has been encoded using a transmission coding scheme different from a recording coding scheme. In the latter case, a transmission decoder (not illustrated) may be disposed between the receiver PROD_C5 and the encoder PROD_C1 to decode encoded data encoded using a transmission coding scheme.

Examples of the recording apparatus PROD_C include a DVD recorder, a BD recorder, and an HDD (Hard Disk Drive) recorder (in this case, the input terminal PROD_C4 or the receiver PROD_C5 serve as a main source from which a moving image is supplied). Other examples of the recording apparatus PROD_C include a camcorder (in this case, the camera PROD_C3 serves as a main source from which a moving image is supplied), a personal computer (in this case, the receiver PROD_C5 or the image processor C6 serves as a main source from which a moving image is supplied), and a smartphone (in this case, the camera PROD_C3 or the receiver PROD_C5 serves as a main source from which a moving image is supplied).

Part (b) of FIG. 28 is a block diagram illustrating a configuration of a reproducing apparatus PROD_D including the video decoding device 1 described above. As illustrated in part (b) of FIG. 28, the reproducing apparatus PROD_D includes a reader PROD_D1 for reading encoded data written in a recording medium PROD_M, and a decoder PROD_D2 for decoding the encoded data read by the reader PROD_D1 to obtain a moving image. The video decoding device 1 described above may be used as the decoder PROD_D2.

The recording medium PROD_M may be (1) of a type incorporated in the reproducing apparatus PROD_D, such as an HDD or an SSD, or (2) of a type connected to the reproducing apparatus PROD_D, such as an SD memory card or a USB flash memory, or may be (3) set in a drive device (not illustrated) incorporated in the reproducing apparatus' PROD_D, such as a DVD or a BD.

The reproducing apparatus PROD_D may further include destinations to which a moving image output from the decoder PROD_D2 is to be supplied, including a display PROD_D3 on which the moving image is displayed, an output terminal PROD_D4 through which the moving image is output to outside, and a transmitter PROD_D5 for transmitting the moving image. In part (b) of FIG. 28, all of them are included in the reproducing apparatus PROD_D, by way of example. However, some of them may be omitted.

The transmitter PROD_D5 may be configured to transmit a moving image that has not been encoded, or may be configured to transmit encoded data that has been encoded using a transmission coding scheme different from a recording coding scheme. In the latter case, an encoder (not illustrated) may be disposed between the decoder PROD_D2 and the transmitter PROD_D5 to encode a moving image using a transmission coding scheme.

Examples of the reproducing apparatus PROD_D include a DVD player, a BD player, and an HDD player (in this case, the output terminal PROD_D4, to which a television receiver or the like is connected, serves as a main destination to which a moving image is to be supplied). Other examples of the reproducing apparatus PROD_D include a television receiver (in this case, the display PROD_D3 serves as a main destination to which a moving image is to be supplied), a digital signage (also referred to as an electronic signboard, an electronic bulletin board, or the like, in which case the display PROD_D3 or the transmitter PROD_D5 serves as a main destination to which a moving image is to be supplied), a desktop PC (in this case, the output terminal PROD_D4 or the transmitter PROD_D5 serves as a main destination to which a moving image is to be supplied), a laptop or tablet PC (in this case, the display PROD_D3 or the transmitter PROD_D5 serves as a main destination to which a moving image is to be supplied), and a smartphone (in this case, the display PROD_D3 or the transmitter PROD_D5 serves as a main destination to which a moving image is to be supplied).

[Summation]

An image decoding device for decoding encoded image data for each coding unit generates a decoded image. The image decoding device includes a CU information decoding unit configured to decode information for specifying a partition type in which the coding unit is split, and an arithmetic decoding unit configured to decode binary values from the encoded image data using arithmetic decoding that uses contexts or arithmetic decoding that does not use contexts. In a case that the CU information decoding unit decodes information for specifying an asymmetric partition (AMP; Asymmetric Motion Partition) as the partition type, the arithmetic decoding unit decodes the binary values by switching between the arithmetic decoding that uses contexts and the arithmetic decoding that does not use contexts in accordance with a position of the binary values.

The image decoding device includes in a case that a size of the coding unit is 2N×2N pixels, the partition type at least includes 2N×2N pixels, 2N×N pixels, N×2N pixels, 2N×nU pixels, 2N×nD pixels, nL×2N pixels, and nR×2N, where 2N×2N pixels, 2N×N pixels, and N×2N pixels are symmetric partitions, and 2N×nU pixels, 2N×nD pixels, nL×2N pixels, and nR×2N pixels are asymmetric partitions.

The image decoding device includes in a case that the CU information decoding unit decodes the information for specifying an asymmetric partition (AMP; Asymmetric Motion Partition) as the partition type, the arithmetic decoding unit is configured to decode only a part of binary values among the binary values using the arithmetic decoding that does not use contexts.

The part of binary values includes at least a binary value corresponding to information indicating the asymmetric partition.

An image decoding device for decoding encoded image data for each coding unit generates a decoded image. The image decoding device includes a CU information decoding unit configured to decode information for specifying a partition type in which the coding unit is split, and an arithmetic decoding unit configured to decode binary values from the encoded image data using arithmetic decoding that uses contexts or arithmetic decoding that does not use contexts. In a case that the CU information decoding unit decodes information for specifying a rectangular partition as the partition type, the arithmetic decoding unit is configured to decode the binary values by switching between the arithmetic decoding that uses contexts and the arithmetic decoding that does not use contexts in accordance with a position of the binary values.

An image decoding for an image decoding device for decoding encoded image data for each coding unit generates a decoded image. The image decoding method for the image decoding device includes the steps of: decoding information for specifying a partition type in which the coding unit is split; and decoding binary values from the encoded image data using arithmetic decoding that uses contexts or arithmetic decoding that does not use contexts. In a case that information for specifying an asymmetric partition (AMP; Asymmetric Motion Partition) as the partition type is to be decoded, the binary values are decoded by switching between the arithmetic decoding that uses contexts and the arithmetic decoding that does not use contexts in accordance with a position of the binary values.

An image encoding device for encoding information for restoring an image for each coding unit generates encoded image data. The image encoding device includes an encoding setting unit configured to encode information for specifying a partition type in which the coding unit is split; and an encoded data generation unit configured to generate the encoded image data using an encoding process that uses contexts or an encoding process that does not use contexts. In a case that information for specifying an asymmetric partition (AMP; Asymmetric Motion Partition) as the partition type is to be encoded, the encoded data generation unit is configured to generate the encoded image data by switching between the encoding process that uses contexts and the encoding process that does not use contexts.

An image decoding device decodes an image in a prediction unit using, as an inter-frame prediction scheme, a uni-prediction scheme in which one reference image is referred to or a bi-prediction scheme in which two reference images are referred. The image decoding device includes bi-prediction restriction means for imposing restriction of bi-prediction on the prediction unit in a case that the prediction unit is a prediction unit having a size less than or equal to a predetermined value.

According to the foregoing aspects of the present invention, it is possible to achieve a reduction in the amount of coding taken in the use of an asymmetric partition and to implement efficient encoding/decoding processes exploiting the characteristics of the asymmetric partition.

The present invention may also be expressed in the following form. An image decoding device according to an aspect of the present invention is an image decoding device for decoding information for restoring an image from encoded image data for each coding unit to restore an image. The image decoding device includes decoding means for decoding codes assigned to combinations of sizes of prediction units and prediction schemes to be applied to the coding units, the decoding means decoding a shorter code for a combination of a coding unit with a size less than or equal to a predetermined value and a prediction scheme for intra-frame prediction, than codes assigned to combinations other than the combination.

In the configuration described above, a coding unit having a size less than or equal to a predetermined value is a coding unit having a size that will make inter prediction less reliable in a coding unit having a size greater than the predetermined value.

A coding unit having a size less than or equal to a predetermined value tends to be used in a region where inter prediction is less reliable. In the following, a coding unit having a size greater than a predetermined value is referred to as a "large coding unit".

A coding unit having a size less than or equal to a predetermined value is, by way of example, a coding unit having a minimum size, and is a coding unit having 8×8 pixels.

Such a small coding unit has a larger spatial correlation than a large coding unit. Thus, an intra CU is generally applied to such a small coding unit in order to improve prediction accuracy.

In the configuration described above, a shorter code is assigned to a combination of small coding size and intra-frame prediction scheme than codes to be assigned to other combinations.

According to the configuration described above, accordingly, a short code may be assigned to a combination having a high probability of occurrence in a coding unit having a size less than or equal to a predetermined value. The advantage of improved coding efficiency is thus achieved.

In the image decoding device according to the aspect of the present invention, preferably, the decoding means described above decodes a shorter code for the combination described above than a code assigned to a combination of a coding unit with a size larger than the predetermined value and a prediction scheme for intra-frame prediction.

According to the configuration described above, a shorter code is decoded in a case that a prediction scheme for intra-frame prediction is applied to a small coding unit in which intra-frame prediction is more reliable than in a case that a prediction scheme for intra-frame prediction is applied to a large coding unit in which intra-frame prediction is less reliable.

Accordingly, a shorter code may be decoded for a combination having a higher frequency of occurrence. As a result, coding efficiency may be improved.

In the image decoding device according to the aspect of the present invention, preferably, the decoding means described above decodes a shorter code for the combination described above than a code assigned to a combination of a coding unit with a size equal to the predetermined value and a prediction scheme other than intra-frame prediction.

According to the configuration described above, a shorter code may be decoded for intra-frame prediction that is more reliable in a small coding unit than inter-frame prediction that is less reliable.

Accordingly, a shorter code may be decoded for a combination having a higher frequency of occurrence. As a result, coding efficiency may be improved.

An image decoding device according to an aspect of the present invention is an image decoding device for restoring an image in a prediction unit using a prediction scheme for any inter-frame prediction out of uni-prediction in which one reference image is referred to and bi-prediction in which two reference images are referred to. The image decoding device includes bi-prediction restriction means for imposing restriction of bi-prediction on a target prediction unit to which the inter-frame prediction is to be applied, the target prediction unit being a prediction unit having a size less than or equal to a predetermined value.

Bi-prediction requires a larger amount of processing than uni-prediction. Bi-prediction is a prediction scheme that uses two images to be referred to in inter-frame prediction. The images to be referred to may be previous or future frames in time with respect to the target frame.

A small prediction unit having a size less than or equal to a predetermined value requires a larger amount of processing per unit area than a large prediction unit having a size greater than the predetermined value.

Accordingly, bi-prediction in a small prediction unit will be likely to create a bottleneck in decoding processing because both require a large amount of processing.

According to the configuration described above, restriction of bi-prediction is imposed on a small prediction unit. The term "restriction" is used to include omitting some of the processes involved in bi-prediction and not-performing the processing of bi-prediction.

The restriction described above may achieve the advantage of reducing the amount of processing that can be a bottleneck in decoding processing.

In the image decoding device according to the aspect of the present invention, preferably, the bi-prediction restriction means described above imposes the restriction described above on the target prediction unit that is a prediction unit in which decoding of at least some of motion vectors used for generation of a prediction image in the target prediction unit is not omitted and that is a prediction unit in which a prediction parameter to be allocated to the target prediction unit is not estimated from a prediction parameter allocated to a neighboring prediction unit of the target prediction unit.

According to the configuration described above, the restriction of bi-prediction is imposed in a case that a prediction parameter is actually derived in a target prediction unit without the so-called skip process and merge process being performed.

If the skip process or the merge process is not performed, all motion vectors need to be decoded, resulting in an increase in the amount of processing. The restriction described above may reduce the amount of processing that can be a bottleneck in decoding processing.

In the image decoding device according to the aspect of the present invention, preferably, the bi-prediction restriction means described above performs uni-prediction r without decoding information indicating which of bi-prediction and uni-prediction to perform.

According to the configuration described above, the decoding process for a target prediction unit on which restriction of bi-prediction is imposed may be simplified. In addition, the overhead caused by the decoding of information indicating which of bi-prediction and uni-prediction to perform although the execution of uni-prediction has been determined in advance may be avoided.

In the image decoding device according to the aspect of the present invention, preferably, the bi-prediction restriction means described above omits the processing of information concerning weighted prediction in bi-prediction.

According to the configuration described above, the omission of the processing of information concerning weighted prediction in bi-prediction may reduce the amount of processing in bi-prediction. As a result, the amount of processing that can be a bottleneck in decoding processing, such as the processing of information concerning weighted prediction, may be reduced.

An image decoding device according to an aspect of the present invention is an image decoding device for restoring an image by generating a prediction image for each of prediction units obtained by splitting a coding unit into one or more partitions. The image decoding device includes changing means for changing a plurality of codes associated with a plurality of combinations of partition types and prediction schemes, the partition types being types in which a target coding unit that is a coding unit to be decoded is split into the prediction units, in accordance with a decoded parameter allocated to a decoded prediction unit near a target prediction unit that is a prediction unit to be decoded.

The unit of generating a prediction image is based on a coding unit that is a unit of the coding process. Specifically, the same region as the coding unit or a region obtained by dividing the coding unit is used as a prediction unit.

In the configuration described above, the partition type in which a coding unit is split into prediction units may include a split into square partitions and a split into non-square partitions. The split into square partitions is obtained in a case that the prediction unit obtained by splitting is square.

This applies, for example, in a case that a square coding unit is split into four square partitions. This also applies in the case of non-split where a region having the same size as a square coding unit is used as the prediction unit. The partition type in the case of non-split is generally represented by 2N×2N.

A split into non-square partitions is obtained in a case that the prediction unit obtained by splitting is non-square. This applies, for example, in a case that the region of the coding unit is split into a large rectangle and a small rectangle.

The term "code" refers to a binary (bin) sequence of coded parameter values. The binary sequence may be directly coded or arithmetically coded. The prediction scheme is that either for inter-frame prediction or intra-frame prediction. A combination of prediction scheme and partition type is, for example, (intra-frame prediction, non-split), and may be represented by a parameter value called pred_type.

In the configuration described above, furthermore, codes and combinations of prediction schemes and partition types are associated with each other in one-to-one correspondence.

According to the configuration described above, the association is changed in accordance with a decoded parameter. In other words, even for the same code, the interpretation of which combination of prediction scheme and partition type is indicated is changed in accordance with a decoded parameter.

Accordingly, a shorter code may be assigned to a combination of prediction scheme and partition type having a higher probability of occurrence.

Specifically, if a neighboring coding unit of a target coding unit is a coding unit for intra-frame prediction, it is probable that the target coding unit will also be predicted using intra-frame prediction.

In this case, preferably, a short code is assigned to a combination including intra-frame prediction.

According to the configuration described above, a shorter code is assigned to a combination of prediction scheme and partition type having a higher probability of occurrence in accordance with a decoded parameter allocated to a neighboring decoded prediction unit. Thus, coding efficiency may be improved.

In the image decoding device according to the aspect of the present invention, preferably, the changing means described above changes a code associated with a combination including a prediction scheme for intra-frame prediction to a short code in a case that a prediction scheme for intra-frame prediction is allocated to a neighboring decoded coding unit of the target coding unit.

According to the configuration described above, in a case that a prediction scheme for intra-frame prediction is allocated to a neighboring decoded coding unit of a target coding unit, a code associated with a combination including a prediction scheme for intra-frame prediction is changed to a short code.

A plurality of neighboring coding units may be used. The neighboring coding units may include, for example, an upper adjacent coding unit and a left adjacent coding unit.

In this case, it is only required that one or both of a prediction scheme for intra-frame prediction be allocated to the upper adjacent coding unit and the left adjacent coding unit.

If a prediction scheme for intra-frame prediction is allocated to a neighboring decoded coding unit of a target coding unit, it is probable that intra-frame prediction will also be allocated to the target coding unit.

Thus, the code associated with a combination having a high frequency of occurrence may be short, leading to improved coding efficiency.

In the image decoding device according to the aspect of the present invention, preferably, the changing means described above changes a code associated with a combination including a partition type that involves a split in a neighboring direction to a short code in a case that a neighboring decoded coding unit of the target coding unit is smaller than the target coding unit.

According to the configuration described above, in a case that a neighboring decoded coding unit of the target coding unit is smaller than the target coding unit, a code associated with a combination including a partition type that involves a split in a neighboring direction is changed to a short code.

In a case that a neighboring decoded coding unit of the target coding unit is smaller than the target coding unit, it is probable that an edge will be present in a direction perpendicular to a boundary between the target coding unit and the neighboring decoded coding unit. That is, an edge often appears in a direction in which the target coding unit is adjacent to the decoded coding unit.

In this case, a partition type that involves a split in the adjacent direction is more likely to be selected.

Thus, the code associated with a combination having a high frequency of occurrence may be short, leading to improved coding efficiency.

An image decoding device according to an aspect of the present invention is an image decoding device for restoring an image by generating a prediction image using an inter-frame prediction scheme for each of prediction units obtained by splitting a coding unit into one or more partitions. The image decoding device includes candidate determining means for determining a candidate in a region to be used for estimation in accordance with a size of a target prediction unit, which is a prediction unit to be decoded, in a case that the target prediction unit is a prediction unit in which a prediction parameter of the target prediction unit is estimated from a prediction parameter allocated to a neighboring region of the target prediction unit.

According to the configuration described above, a candidate of a region to be used for the so-called skip or merge is determined in accordance with the size of the target prediction unit. Alternatively, a candidate of a region to be used for the derivation of an estimated motion vector to be used to restore a motion vector together with a decoded differential motion vector is set.

The correlation of motion vectors for inter-frame prediction varies depends on the size of the target prediction unit. For example, a region where a small prediction unit having a size less than or equal to a predetermined value is selected generally includes complex motion of an object, and the correlation of motion vectors is low in such a region.

According to the configuration described above, therefore, for example, the number of candidates may be reduced in accordance with the degree of complexity of motion. Accordingly, side information may be reduced, resulting in improvement in coding efficiency.

In the image decoding device according to the aspect of the present invention, preferably, the candidate determining means described above performs an operation so that the number of candidates for the small prediction unit having a size less than or equal to the predetermined value is less than the number of candidates for a prediction unit larger than the small prediction unit.

According to the configuration described above, the number of candidates for a small prediction unit having a size less than or equal to a predetermined value is less than the number of candidates for a prediction unit larger than the small prediction unit.

As described above, a region where a small prediction unit having a size less than or equal to a predetermined value generally includes complex motion of an object, and the correlation of motion vectors is low in such a region.

For this reason, the number of candidates in such a region is reduced to reduce side information, which is preferable.

In the image decoding device according to the aspect of the present invention, preferably, the candidate determining means described above performs an operation so that, in a small prediction unit having a size less than or equal to a predetermined value, candidates for temporal prediction are not included in the candidates.

According to the configuration described above, in a small prediction unit having a size less than or equal to a predetermined value, candidates for temporal prediction are not included in the candidates.

In a region with complex motion where a small prediction unit is selected, the correlation between a relevant prediction unit (collocated PU) used for temporal prediction and a target prediction unit is low. Thus, it is less probable that temporal prediction will be selected for such a region. In such a region, accordingly, it is preferable that merge candidates for temporal prediction are not included.

An image decoding device according to an aspect of the present invention is an image decoding device for restoring an image by generating a prediction image for each of prediction units obtained by splitting a coding unit into one or more partitions. Partition types in which a coding unit is split into the prediction units include a partition into rectangular prediction units, and codes for identifying a partition into the rectangular prediction units include a code indicating whether each of the rectangular prediction units is portrait-oriented or landscape-oriented, and a code indicating a type of rectangular prediction unit. The image decoding device includes decoding means for decoding the code indicating a type of rectangular prediction unit without using a context.

According to the configuration described above, in a case that the partition type in which a coding unit is split into prediction units is a split into rectangular prediction units, a code indicating a type of rectangular partition is decoded using a context.

The term "type of rectangular partition" is used to include, for example, the following three types if the partition types are landscape-oriented rectangular partitions: 2N×N, 2N×nU, 2N×nD.

A split into prediction units is generally performed so that no prediction units lie across an edge present in the region of the coding unit. If an edge having an inclination is present in a region, the same type of rectangular partition may not necessarily be sequentially selected. In such a region, a decoding process using contexts might not improve coding efficiency.

In such a region, conversely, a decoding process without using contexts would not cause a reduction in coding efficiency.

According to the configuration described above, in the region described above, it is possible to simplify processing because of no reference to contexts while maintaining coding efficiency.

An image decoding device according to an aspect of the present invention is an image decoding device for restoring an image by generating a prediction image using an inter-frame prediction scheme for each of prediction units obtained by splitting a coding unit into one or more partitions. Partition types in which a coding unit is split into the prediction units include an asymmetric partition in which a coding unit is split into a plurality of prediction units having different sizes or a symmetric partition in which a coding unit is split into a plurality of prediction units having the same size. The image decoding device includes estimating means for estimating a prediction parameter for inter-frame prediction using, in a case that the partition type is an asymmetric partition, an estimation method different from an estimation method in a case that the partition type is a symmetric partition.

According to the configuration described above, in a case that the partition type is an asymmetric partition, a prediction parameter for inter-frame prediction is estimated using an estimation method different from that in a case that the partition type is a symmetric partition.

A coding unit in which asymmetric partition is selected is asymmetrically split into a small prediction unit and a large prediction unit in order to obtain prediction units.

In a coding unit in which asymmetric partition is selected, furthermore, it is probable that an edge crossing the small prediction unit in the longitudinal direction will be present.

It is also probable that accurate motion vectors will have been derived in a region where an edge is present. That is, the region where motion vectors having high accuracy have been derived in a case that the partition type is an asymmetric partition is different from that in a case that the partition type is a symmetric partition.

Thus, the following advantage may be achieved: different estimation methods are used for the case that the partition type is an asymmetric partition and the case that the partition type is a symmetric partition, allowing prediction parameters for inter-frame prediction to be estimated using a desired estimation method in accordance with the partition type.

An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partition types in which a coding unit is split into the prediction units include an asymmetric partition in which a coding unit is split into a plurality of prediction units having different sizes or a symmetric partition in which a coding unit is split into a plurality of prediction units having the same size. The image decoding device includes transform unit splitting means for determining, in a case that a partition type of a target coding unit, which is a coding unit to be decoded, is the asymmetric partition, a partitioning scheme for a transform unit in accordance with a size of a prediction unit included in the target coding unit.

According to the configuration described above, in a case that a partition type of a target coding unit, which is a coding unit to be decoded, is an asymmetric partition, a partitioning scheme for a transform unit is determined in accordance with a size of a prediction unit included in the target coding unit.

When an asymmetric partition is applied, where as it is probable that an edge will be included in a smaller prediction unit, it is less probable that an edge will be included in a larger prediction unit.

If prediction residuals have no directionality, the application of square transform may more efficiently remove correlations than with the application of rectangular transform as a partitioning scheme for a transform unit.

According to the configuration described above, in a case that the partition type is an asymmetric partition, a partitioning scheme for a transform unit that will efficiently remove correlations may be selected in accordance with the size of a prediction unit included in the target coding unit. As a result, coding efficiency may be improved.

An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partitioning schemes in which a coding unit is split into the transform units include square partitioning and rectangular partitioning. The image decoding device includes splitting means for splitting a target transform unit using a rectangular partitioning scheme in a case that a target prediction unit, which is a prediction unit to be decoded, has a square shape.

In some cases, square prediction units may be selected even though edges are present in a region and an image has directionality. For example, in a case that an object including a large number of horizontal edges is moving, motion is uniform over the entire object. Thus, square prediction units are selected. In the transform process, however, preferably, transform units having a shape that is long in the horizontal direction and extending in the horizontal edges are applied.

According to the configuration described above, in a case that a target prediction unit, which is a prediction unit to be decoded, has a square shape, the target transform unit is split using a rectangular partitioning scheme.

Accordingly, a rectangular transform unit may also be selected in a square coding unit, resulting in improved coding efficiency for the region described above.

In the image decoding device according to the aspect of the present invention, preferably, in a case that a transform unit at a partition depth of 2 in a coding unit having a predetermined size has a square shape, the splitting means described above further performs an operation so that a target transform unit at a partition depth of 1 in the coding unit having a predetermined size is rectangular.

According to the configuration described above, in a case that the target prediction unit has a square shape, the target transform unit is split using a rectangular partitioning scheme.

A transform unit is recursively split twice using square quadtree partitioning, that is, the partition depth is increased up to 2, yielding 16 square transform units. In this case, the recursive z-scan order is used. Conventionally, the above-described partitioning scheme is applied in a case that the partition type of the target coding unit is a square partitioning.

In a case that a transform unit is split using a landscape-oriented quadtree partitioning scheme, in contrast, each node is split into square transform units at a partition depth of 2. That is, 16 square transform units are finally obtained at a partition depth of 2. In this case, the raster scan order is used for the 16 square transform units. Conventionally, the above-described partitioning scheme is applied in a case that the partition type of the target coding unit is a non-square partition.

The scan order is thus different for square partition and non-square partition as partition types of the target coding unit.

According to the configuration described above, in contrast, in a case that the partition type of the coding unit is a square partition, that is, in a case that the target prediction unit has a square shape, the target transform unit is split using a rectangular partitioning scheme.

Accordingly, the advantage of uniform scan order for square partition and non-square partition may be achieved.

An image decoding device according to an aspect of the present invention is an image decoding device for restoring an image by generating a prediction image for each of prediction units obtained by splitting a coding unit into one or more partitions, decoding a prediction residual for each of transform units obtained by splitting a coding unit into one or more partitions, and adding the prediction residual to the prediction image. Partition types in which a coding unit is split into the prediction units include a split into asymmetric partitions that are prediction units, having different sizes and a split into symmetric partitions that are prediction units having the same size. The image, decoding device includes coefficient decoding means for decoding, in a case that a partition type of a target prediction unit, which is a prediction unit to be decoded, is a split into asymmetric partitions, transform coefficients by referring to different contexts for small and large prediction units obtained by the split.

A small prediction unit obtained by asymmetric partitioning may possibly include an edge, and is likely to include a transform coefficient. On the other hand, a large prediction unit is less likely to include a transform coefficient. A different context is used for the target transform unit depending on whether the target transform unit is included in the small prediction unit or the large prediction unit. Accordingly, variable length decoding may be performed in accordance with the probability of occurrence of the transform coefficient in each region.

An image encoding device according to an aspect of the present invention is an image encoding device for encoding information for restoring an image for each coding unit to generate encoded image data. The image encoding device includes encoding means for encoding codes assigned to combinations of sizes of prediction units and prediction schemes to be applied to the coding units, the encoding means encoding a shorter code for a combination of a coding unit with a size less than or equal to a predetermined value and a prediction scheme for intra-frame prediction, than codes assigned to combinations other than the combination.

An image encoding device including each of the configurations corresponding to the image decoding devices described above also falls within the scope of the present invention. An image encoding device having the configuration described above may achieve advantages similar to those of an image decoding device according to an aspect of the present invention.

(Hardware-Based Implementation and Software-Based Implementation)

The respective blocks of the video decoding device 1 and the video encoding device 2 described above may be implemented in hardware as a logic circuit formed on an integrated circuit (IC chip) or may be implemented in software using a CPU (Central Processing Unit).

In the latter case, each of the devices includes a CPU for executing instructions in a program that implements individual functions, a ROM (Read Only Memory) having the program stored therein, a RAM (Random Access Memory) into which the program is loaded, a storage device (recording medium), such as a memory, for storing the program and various types of data, and so on. The object of the present invention may also be achieved by supplying to each of the devices described above a recording medium on which program code (execute form program, intermediate code program, source program) of a control program for each of the devices described above, which is software implementing the functions described above, is recorded in a computer-readable form, and by reading and executing the program code recorded on the recording medium using a computer (or a CPU or an MPU).

Examples of the recording medium include tapes such as a magnetic tape and a cassette tape, disks including magnetic disks such as a floppy (registered trademark) disk and a hard disk, and optical disks such as a CD-ROM (Compact Disc Read-Only Memory), an MO disc (Magneto-Optical disc), an MD (Mini Disc), a DVD (Digital Versatile Disc), a CD-R (CD Recordable), and a blu-ray disc (Blu-ray Disc: registered trademark), cards such as an IC card (including a memory card) and an optical card, semiconductor memories such as a mask ROM, an EPROM (Erasable Programmable Read-Only Memory), an EEPROM (registered trademark) (Electrically Erasable and Programmable Read-Only Memory), and a flash ROM, and logic circuits such as a PLD (Programmable logic device) and an FPGA (Field Programmable Gate Array).

In addition, each of the devices described above may be configured to be connectable to a communication network, and may be supplied with the program code described above via the communication network. The communication network is not particularly limited so long as it can transmit program code. For example, the Internet, an intranet, an extranet, a LAN (Local Area Network), an ISDN (Integrated Services Digital Network), a VAN (Value-Added Network), a CATV (Community Antenna television/Cable Television) communication network, a virtual private network, a telephone network, a mobile communication network, a satellite communication network, or the like may be used. A transmission medium forming the communication network may be a medium capable of transmitting program code, and is not limited to any specific configuration or type. A wired transmission medium, such as IEEE (Institute of Electrical and Electronic Engineers) 1394, USB, power line carrier, cable TV lines, telephone lines, or ADSL (Asymmetric Digital Subscriber Line) lines, or a wireless transmission medium, such as infrared type, for example, IrDA (Infrared Data Association) or a remote control, Bluetooth (registered trademark), IEEE 802.11 radio, HDR (High Data Rate), NFC (Near Field Communication), DLNA (Digital Living Network Alliance), a mobile phone network, a satellite network, or a terrestrial digital network, may be used. The present invention may also be implemented in the form of a computer data signal embodied in a carrier wave in which the program code described above is implemented by electronic transmission.

The present invention is not limited to the foregoing embodiments, and a variety of changes may be made within the scope defined by the claims. Embodiments which can be achieved by combinations of technical means modified as appropriate within the scope defined by the claims are also included in the technical scope of the present invention.

INDUSTRIAL APPLICABILITY

The present invention is suitable for use in image decoding devices for decoding encoded data obtained by encoding image data, and image encoding devices for generating encoded data by encoding image data. The present invention is also suitable for use in data structures of encoded data generated by image encoding devices and referred to by image decoding devices.

REFERENCE SIGNS LIST 1 video decoding device
10 decoding module
11 CU information decoding unit
12 PU information decoding unit
13 TU information decoding unit
16 frame memory
111 CU prediction mode determination unit
112 PU size determination unit
121 motion compensation parameter derivation unit (bi-prediction restriction means, candidate determining means, estimating means)
122 merge candidate priority information storage unit
123 reference frame setting information storage unit
131 TU partition setting unit
132 transform coefficient restoration unit
1011 CU prediction mode decoding unit (decoding means, changing means)
1012 binarization information storage unit
1013 context storage unit
1014 probability setting storage unit
1021 motion information decoding unit (restriction information decoding means)
1031 region split flag decoding unit
1032 determination information decoding unit (coefficient decoding means)
1033 transform coefficient decoding unit (coefficient decoding means)
1311 target region setting unit
1312 split determination unit
1313 sub-region setting unit (transform unit splitting means, splitting means)
1314 transform size determination information storage unit
2 video encoding device
21 encoding setting unit
23 prediction image generation unit
25 frame memory
27 transform/quantization unit
29 encoded data generation unit (encoding means)

The invention claimed is:

1. An image decoding device for decoding encoded image data, the image decoding device comprising:
an arithmetic decoding circuitry that decodes a binary sequence for a partition type of a coding unit specified by using a coding unit size and a coding unit prediction type, which is set to one of an intra type and an inter type; and
a prediction image generation circuitry that generates a prediction image using the partition type,
wherein
in a case that the coding unit size is larger than 8×8 size,
the prediction image generation circuitry generates two partition types being comprised of a 2N×2N type and a N×N type, when the coding unit prediction type is set to the intra type, and that generates eight partition types being comprised of a 2N×2N type, a 2N×N type, a N×2N type, a N×N type, a 2N×nU type, a 2N×nD type, a nL×2N type and a nR×2N type, when the coding unit prediction type is set to the inter type, and
the arithmetic decoding circuitry decodes a first binary in the binary sequence for the partition type by using an arithmetic decoding process that uses contexts, wherein the first binary indicates whether or not an Asymmetric Motion Partition mode is applied, and when the first binary indicates the Asymmetric Motion Partition mode is applied, decodes a second binary in the binary sequence for the partition type by using a bypass decoding process, in a case that (i) the coding unit prediction type indicates the inter type and (ii) the coding unit size is greater than 8×8 size, wherein the second binary indicates a positional relationship between a smaller partition and a larger partition of the asymmetric partition,
the arithmetic decoding circuitry decodes the binary sequence for the partition type indicating the 2N×2N type or the N×N type by using the arithmetic decoding process, in a case that (i) the coding unit prediction type indicates the intra type and (ii) the coding unit size is equal to 8×8 size, and
the arithmetic decoding circuitry decodes the binary sequence for the partition type indicating one of the 2N×2N type, the 2N×N type and the N×2N type by using the arithmetic decoding process, in a case that (i) the coding unit prediction type indicates the inter type and (ii) the coding unit size is equal to 8×8 size.

2. An image decoding method for decoding encoded image data, the method including:
decoding a binary sequence for a partition type of a coding unit specified by using a coding unit size and a coding unit prediction type, which is set to one of an intra type and an inter type; and
generating a prediction image using the partition type,
wherein
in a case that the coding unit size is larger than 8×8 size, generating two partition types being comprises of a 2N×2N type and a N×N type, when the coding unit prediction type is set to the intra type,
in a case that the coding unit size is larger than 8×8 size, generating eight partition types being comprised of a 2N×2N type, a 2N×N type, a N×2N type, a N×N type, a 2N×nU type, a 2N×nD type, a nL×2N type and a nR×2N type, when the coding unit prediction type is set to the inter type,
decoding a first binary in the binary sequence for the partition type by using an arithmetic decoding process that uses contexts, wherein the first binary indicates whether or not an Asymmetric Motion Partition mode is applied, and when the first binary indicates the Asymmetric Motion Partition mode is applied, decoding a second binary in the binary sequence for the partition type by using a bypass decoding process, in a case that (i) the coding unit prediction type indicates the inter type and (ii) the coding unit size is greater than 8×8 size, wherein the second binary indicates a positional relationship between a smaller partition and a larger partition of the asymmetric partition, decoding the binary sequence for the partition type indicating the 2N×2N type or the N×N type by using the arithmetic decoding process, in a case that (i) the coding unit prediction type indicates the intra type and (ii) the coding unit size is equal to 8×8 size, and decoding the binary sequence for the partition type indicating one of the 2N×2N type, the 2N×N type and the N×2N type by using the arithmetic decoding process, in a case that (i) the coding unit prediction type indicates the inter type and (ii) the coding unit size is equal to 8×8 size.

3. An image encoding device for encoding an image, the image encoding device comprising:

an arithmetic encoding circuitry that encodes a binary sequence for a partition type of a coding unit specified by using a coding unit size and a coding unit prediction type, which is set to one of an intra type and an inter type; and a prediction image generation circuitry that generates a prediction image using the partition type, wherein in a case that the coding unit size is larger than 8×8 size, the prediction image generation circuitry generates two partition types being comprised of a 2N×2N type and a N×N type, when the coding unit prediction type is set to the intra type, and that generates eight partition types being comprised of a 2N×2N type, a 2N×N type, a N×2N type, a N×N type, a 2N×nU type, a 2N×nD type, a nL×2N type and a nR×2N type, when the coding unit prediction type is set to the inter type, and the arithmetic encoding circuitry encodes a first binary in the binary sequence for the partition type by using an arithmetic encoding process that uses contexts, wherein the first binary indicates whether or not an Asymmetric Motion Partition mode is applied, and when the first binary indicates the Asymmetric Motion Partition mode is applied, encodes a second binary in the binary sequence for the partition type by using a bypass encoding process, in a case that (i) the coding unit prediction type indicates the inter type, and (ii) the coding unit size is greater than 8×8 size, wherein the second binary indicates a positional relationship between a smaller partition and a larger partition of the asymmetric partition, the arithmetic encoding circuitry encodes the binary sequence for the partition type indicating the 2N×2N type or the N×N type by using the arithmetic encoding process, in a case that (i) the coding unit prediction type indicates the intra type and (ii) the coding unit size is equal to 8×8 size, and the arithmetic encoding circuitry encodes the binary sequence for the partition type indicating one of the 2N×2N type, the 2N×N type and the N×2N type by using the arithmetic encoding process, in a case that (i) the coding unit prediction type indicates the inter type and (ii) the coding unit size is equal to 8×8 size.

* * * * *